US010438387B2

United States Patent
Daems et al.

(10) Patent No.: US 10,438,387 B2
(45) Date of Patent: Oct. 8, 2019

(54) WHATIF ONE-PAGE MULTI-Y AXIS GRAPHING SYSTEM

(71) Applicants: Hugo Daems, Lafayette, CA (US); Joe Brisbin, San Jose, CA (US)

(72) Inventors: Hugo Daems, Lafayette, CA (US); Joe Brisbin, San Jose, CA (US)

( * ) Notice: Subject to any disclaimer, the term of this patent is extended or adjusted under 35 U.S.C. 154(b) by 0 days.

(21) Appl. No.: 15/967,550

(22) Filed: Apr. 30, 2018

(65) Prior Publication Data

US 2018/0286093 A1    Oct. 4, 2018

Related U.S. Application Data

(63) Continuation of application No. 15/371,179, filed on Dec. 6, 2016, now abandoned.

(51) Int. Cl.
*G06T 11/20* (2006.01)

(52) U.S. Cl.
CPC ........ *G06T 11/206* (2013.01); *G06T 2200/24* (2013.01)

(58) Field of Classification Search
CPC ............... G06T 11/206; G06T 2200/24; G06T 2207/20092; G06Q 40/02; G06Q 40/12; G06Q 40/06; G06Q 50/22; G06Q 10/06; G06Q 10/06313; G06F 17/246;
(Continued)

(56) References Cited

U.S. PATENT DOCUMENTS

| 2008/0183639 | A1* | 7/2008 | DiSalvo | G06Q 40/02 705/36 R |
| 2009/0150440 | A1* | 6/2009 | Buck | G06F 19/3456 |

(Continued)

OTHER PUBLICATIONS

Saunderson, Dynamic Scenario Analysis for Excel, 2015, URL: https://www.youtube.com/watch?v=X0wZazOWbDc, pp. 2 (Year: 2015).*

(Continued)

*Primary Examiner* — Phuc N Doan
(74) *Attorney, Agent, or Firm* — Pasadena Legal Group; Norman R. Van Treeck

(57) ABSTRACT

A graphing system (FIG. 2) and method (200) for generating a one-page multi-Y axis graph (207) for analyzing alternate scenarios. The WHATIF SYSTEM can generate a one-page multi-Y axis graph using input from a spreadsheet file (208). The WHATIF SYSTEM can also generate a one-page multi-Y axis graph using input from one or more sets of financial project profitability measures (203). The WHATIF SYSTEM allows the user to generate a BASE CASE file (201) of a projects financial description. The BASE CASE file is simulated by the SIMULATE function (202) producing a set of profitability measures (203): Internal Rate of Return on Investment (IRROI) before taxes, IRROI after taxes, Internal Rate of Return on Equity (IRROE) after taxes, payback period, minimum equity, minimum loan, and minimum period required to repay debt. A file named WHATIF (204) defines percentage adjustments to be automatically applied to the BASE CASE file by the AUTOMATE function (205). The GRAPH function (206) generates a one-page multi-Y axis graph (207) displaying a graph of a spreadsheet file or a graph of financial metrics and profitability measures.

9 Claims, 54 Drawing Sheets

(58) Field of Classification Search
CPC ............ G06F 19/3406; G06F 19/3487; G06F 19/3456; G06N 5/048
See application file for complete search history.

(56) References Cited

U.S. PATENT DOCUMENTS

| | | | | |
|---|---|---|---|---|
| 2010/0188427 | A1* | 7/2010 | Chuang | G06Q 10/00 345/660 |
| 2012/0311044 | A1* | 12/2012 | Beaven | G06Q 10/0637 709/204 |
| 2013/0159242 | A1* | 6/2013 | Rahmouni | G06N 5/048 706/52 |
| 2014/0022256 | A1* | 1/2014 | Carnes | A61B 5/02416 345/440.1 |
| 2018/0286500 | A1* | 10/2018 | Sole Guerra | G16H 10/60 |
| 2018/0300914 | A1* | 10/2018 | Mikhailov | G06T 11/206 |

OTHER PUBLICATIONS

Origin Lab, Graphing: Origin 8: How to make a Multi-Y Plot using pre-installed templates, 2009, URL: https://www.youtube.com/watch?v=ZLfvogWX A, pp. 1 (Year: 2009).*

Hui, Data Tables & Monte Carlo Simulations in Excel—A Comprehensive Guide, May 2010, URL: https://chandoo.org/wp/data-tables-monte-carlo-simulations-in-excel-a-comprehensive-guide/, pp. 1-21 (Year: 2010).*

EHowTech, How to Create a Baseline With Excel: Using Excel & Spreadsheets, Oct. 20, 2013, URL: https://www.youtube.com/watch?v=Oi1QfTxSCgl, pp. 1 (Year: 2013).*

* cited by examiner

RUN DATE 6/18/18
DATA DATE 10/22/16
PROJECTS
NO CHANGES MADE

IN YEARS
IN $1000

THE PERFORMANCE OF MY COMPANY
STUDY OF POSSIBLE "WHAT IF" CHANGES

==================================
FINANCIAL SYNOPSIS REPORT
==================================

PAY BACK PERIOD IS 0 & 11/12 (0.87) PERIODS.

IRROI B.T. = 133.85 %

IRROI A.T. = 114.07 %

IRROE A.T.   NO ROOT

MIN EQUITY = 448

MIN DEBT = 682

MIN. PERIODS NEEDED TO REPAY DEBT = 0.53

IN YEARS

SENSITIVITY RESULTS OF
UNIT VARIABLE COST

THE PERFORMANCE OF MY COMPANY
STUDY OF POSSIBLE "WHAT IF" CHANGES

| | BASIC PROFITABILITY MEASURES(*) | | | 0 % ASSUMED INFLATION | | | % ASSUMED INFLATION | | |
|---|---|---|---|---|---|---|---|---|---|
| UNIT<br>VAR.COST<br>2010 | PAYBACK<br>PERIOD<br>2020 | %IRR<br>ON INVESTMENT<br>BEF.TAX AFT.TAX | %IRR ON<br>EQUITY<br>AFT.TAX | MINIMUM<br>EQUITY | MINIMUM<br>LOAN | MINIMUM<br>LOAN<br>TERM | MINIMUM<br>EQUITY | MINIMUM<br>LOAN | MINIMUM<br>LOAN<br>TERM |
| 5.95 | .470 | NO ROOT NO ROOT | NO ROOT | 448 | 682 | .28 | | | |
| 6.375 | .509 | NO ROOT NO ROOT | NO ROOT | 448 | 682 | .31 | | | |
| 6.8 | .555 | NO ROOT 179.140 | NO ROOT | 448 | 682 | .34 | | | |
| 7.225 | .610 | NO ROOT 162.070 | NO ROOT | 448 | 682 | .37 | | | |
| 7.65 | .678 | 172.200 146.610 | NO ROOT | 448 | 682 | .41 | | | |
| 8.075 | .762 | 153.030 130.340 | NO ROOT | 448 | 682 | .46 | | | |
| 8.5 | .870 | 133.850 114.070 | NO ROOT | 448 | 682 | .53 | | | |  ← 2030
| 8.925 | 1.023 | 114.580 97.810 | 151.680 | 448 | 682 | .62 | | | |
| 9.35 | 1.225 | 95.490 81.550 | 119.430 | 448 | 682 | .74 | | | |
| 9.775 | 1.525 | 76.300 65.290 | 102.470 | 448 | 682 | 1.02 | | | |
| 10.2 | 2.040 | 57.090 49.030 | 69.580 | 448 | 682 | 1.36 | | | |
| 10.625 | 3.051 | 37.860 32.750 | 44.190 | 448 | 682 | 2.18 | | | |
| 11.05 | 5.999 | 18.410 16.160 | 19.730 | 448 | 682 | 5.29 | | | |

(*) BASED ON LOWEST ASSUMED INFLATION RATE SHOWN (0 %).

IN YEARS

SENSITIVITY RESULTS OF
UNIT PRICE

THE PERFORMANCE OF MY COMPANY
STUDY OF POSSIBLE "WHAT IF" CHANGES

BASIC PROFITABILITY MEASURES(*)   0 % ASSUMED INFLATION                    % ASSUMED INFLATION

| | | | | | @ 0% ASSUMED INFLATION | | | % ASSUMED INFLATION | |
|---|---|---|---|---|---|---|---|---|---|
| UNIT PRICE | PAYBACK PERIOD | %IRR ON INVESTMENT BEF.TAX | %IRR ON INVESTMENT AFT.TAX | %IRR ON EQUITY AFT.TAX | MINIMUM EQUITY | MINIMUM LOAN | MINIMUM LOAN TERM | MINIMUM MINIMUM EQUITY LOAN | MINIMUM LOAN TERM |
| 12.19 | .707 | 164.980 | 140.480 | NO ROOT | 448 | 682 | .43 | | |
| 11.96 | .754 | 154.610 | 131.680 | NO ROOT | 448 | 682 | .46 | | |
| 11.73 | .808 | 144.230 | 122.880 | NO ROOT | 448 | 682 | .49 | | |
| 11.5  | .870 | 133.850 | 114.070 | NO ROOT | 448 | 682 | .53 | | |
| 11.27 | .942 | 123.480 | 105.270 | 167.120 | 448 | 682 | .57 | | |
| 11.04 | 1.037 | 113.100 | 96.470 | 148.940 | 448 | 682 | .63 | | |
| 10.81 | 1.140 | 102.710 | 87.670 | 131.320 | 448 | 682 | .69 | | |

2110  2120                                          2130

(*) BASED ON LOWEST ASSUMED INFLATION RATE SHOWN (0 %).

FIG. 21

06/18/18
IN YEARS

THE PERFORMANCE OF MY COMPANY
STUDY OF POSSIBLE "WHAT IF" CHANGES

SENSITIVITY RESULTS OF
EXPECTED VOLUME PER PERIOD

| | BASIC PROFITABILITY MEASURES(*) | | | | @ % ASSUMED INFLATION | | | % ASSUMED INFLATION | |
|---|---|---|---|---|---|---|---|---|---|
| VOLUME PER PERIOD | PAYBACK PERIOD | %IRR ON INVESTMENT BEF.TAX AFT.TAX | | %IRR ON EQUITY AFT.TAX | MINIMUM EQUITY | MINIMUM LOAN | MINIMUM LOAN TERM | MINIMUM MINIMUM EQUITY LOAN | MINIMUM LOAN TERM |
| 850. | .512 | NO ROOT | NO ROOT | NO ROOT | 448 | 682 | .31 | | |
| 800. | .544 | NO ROOT | NO ROOT | NO ROOT | 448 | 682 | .33 | | |
| 750. | .580 | NO ROOT | 171.480 | NO ROOT | 448 | 682 | .35 | | |
| 700. | .621 | NO ROOT | 160.000 | NO ROOT | 448 | 682 | .38 | | |
| 650. | .669 | 174.450 | 148.520 | NO ROOT | 448 | 682 | .41 | | |
| 600. | .725 | 160.920 | 137.040 | NO ROOT | 448 | 682 | .44 | | |
| 550. | .791 | 147.390 | 125.560 | NO ROOT | 448 | 682 | .48 | | |
| 500. | .870 | 133.850 | 114.070 | NO ROOT | 448 | 682 | .53 | | |
| 450. | .967 | 120.320 | 102.590 | 161.540 | 448 | 682 | .59 | | |
| 400. | 1.097 | 106.780 | 91.110 | 138.150 | 448 | 682 | .66 | | |
| 350. | 1.254 | 93.230 | 79.630 | 115.780 | 448 | 682 | .76 | | |

2210 2220    2230

(*) BASED ON LOWEST ASSUMED INFLATION RATE SHOWN ( 0 %).

FIG. 22

```
     2410 2420  2430      2440                2450
       |    |    |         |                   |
NNNN R K <<<COLUMN-ONE TITLES>>  <<<<SENSITIVITY REPORT TITLE>>>>>>>>>>>>>>>>>>>>>>>
==== = = 1234567890 1234567890  1234567890123456789012345678901234567890123456789
  10 A A    TOTAL INVESTMENT    TOTAL INVESTMENT
  20 A A    REPLACEMENT         ALL REPLACEMENTS
  30 A A    OTHER INVESTMTS     OTHER INVESTMENTS
  40 A E    WORKING CAPITAL     WORKING CAPITAL AND INVENTORIES
  50 A E    MINIMUM CASH        MINIMUM CASH RESERVE
 100 D B    VOLUME PER PERIOD   EXPECTED VOLUME PER PERIOD
 210 D B    UNIT PRICE          UNIT PRICE
 310 A B    UNIT VAR.COST       UNIT VARIABLE COST
 200 D B    TOTAL REVENUE       TOTAL REVENUE
 300 A B    VARIABLE COST       TOTAL VARIABLE COST
 400 A B    FIXED COST          FIXED COSTS
 600 A B    TAXES IN %          TAX RATE
 650 A B    TAXES PER PERIOD    TAX AMOUNT PER PERIOD
  90 D B    EQUITY IN %         EQUITY PARTICIPATION IN %
  95 D A    EQUITY IN CURRENCY  EQUITY IN CURRENCY
  60 A A    TOTAL LOANS         TOTAL LOAN AMOUNT
  70 D D    REPAYMENT TERM      LOAN REPAYMENT TERM
  80 A B    INTEREST RATE       INTEREST RATES
  82 A B    INITIATION FEE      INITIATION FEE
  81 A B    COMMITMENT FEE      COMMITMENT FEE
 700 A B    ESCALATION          ESCALATION RATE ON ASSETS
 720 D B    ESCALATION          ESCALATION RATE ON REVENUES
 730 A B    ESCALATION          ESCALATION RATE ON VARIABLE COSTS
 740 A B    ESCALATION          ESCALATION RATE ON FIXED COSTS
 510 D C    HIGHEST DEPREC.     RATE OF ASSET DEPRECIATION
  65 A A    CAPIT. FIN. COST    CAPITALIZED FINANCING COST
 580 D C    HIGHEST AMORT.      RATE OF AMORTIZATION OF CAPITALIZED INTEREST
 581 D C    HIGHEST AMORT.      RATE OF AMORT. OF OTHER CAPIT. FIN. COSTS
==== = = ================== =================================================

(NNNN) SENSITIVITY NUMERIC - IDENTIFIES WHICH PARAMETER IS BEING STUDIED.

(R) RANKING - EITHER "A" OR "D" TO CHOOSE ASCENDING OR DESCENDING SORT.

(K) KEY - EITHER "A","B","C","D",OR"E" TO DEFINE METHOD TO BE USED TO CALCULATE
          THE COLUMN-ONE VALUE FOR THE SENSITIVITY REPORT.
          A - SUM OF ALL INPUTS ON THAT ROW.
          B - LAST INPUT IN ROW OTHER THAN 0.
          C - SELECT HIGHEST INPUT ON THAT ROW.
          D - NUMBER OF LAST NON ZERO PERIOD IN THAT ROW.
          E - LARGEST ABSOLUTE SUM OF THAT ROW; POSITIVE AND NEGATIVE.

COLUMN-ONE TITLES - PRINTED ON TWO ROWS (10 COLUMNS EACH) ABOVE COLUMN-ONE OF
     THE SENSITIVITY REPORT.

SENSITIVITY REPORT TITLE - (49 CHARACTERS MAX.) PRINTED ON LINE IMMEDIATELY
     FOLLOWING "SENSITIVITY RESULTS OF" IN THE SENSITIVITY REPORT.
```

FIG. 24

```
FILE: GRAPH1
3r LOAN PARAMETERS
10/22/16
THE PERFORMANCE OF MY COMPANY
STUDY OF POSSIBLE "WHAT IF" CHANGES
GRAPH1
NO CHANGES MADE
IN YEARS
IN $1000
25
                              1, -100, 5, 0, 1, 15, 0, 0, 0, 0, 0, 1, 1, 1, 1, 1, 1, 1, 1, 1, 1, 1
PROJECT LIFE
PARAMETERS  A thru S
TOTAL INVESTMENT              1, 1500        2, 0
ALL REPLACEMENTS              1, 0
OTHER INVESTMENTS             1, 100         2, 0
WORKING CAPITAL               1, 10
MINIMUM CASH                  1, 20
INTEREST RATES                1, 10
COMMITMENT FEE                1, 0
INITIATION FEE                1, 0
EQUITY IN %                   1, 25
VOLUME PER PERIOD             1, 0           2, 100
UNIT PRICE                    1, 10
UNIT VAR. COST                1, 0           2, 7.5
FIXED COSTS                   1, 0           2, 10
TAXES IN %                    1, 15
INFLATION                     1, 0
DIVIDENDS                     1, 0
```

```
RUN DATE 6/19/18
DATA DATE
GRAPH1
NO CHANGES MADE

IN YEARS
IN $1000
```

```
        THE PERFORMANCE OF MY COMPANY
   STUDY OF POSSIBLE "WHAT  IF" CHANGES
          ==============================
              FINANCIAL SYNOPSIS REPORT
          ==============================

PAY BACK PERIOD IS 8 & 9/12 (8.68) PERIODS.

IRROI B.T. =  11.97 %

IRROI A.T. =  10.72 %

IRROE A.T. =  13.27 %

MIN  EQUITY =  448

MIN  DEBT   =  1344

MIN. PERIODS NEEDED TO REPAY DEBT = 11.53
```

FIG. 35B

RUN DATE 6/19/18
DATA DATE
GRAPH1
NO CHANGES MADE

THE PERFORMANCE OF MY COMPANY
STUDY OF POSSIBLE "WHAT IF" CHANGES

==================
FUNDS FLOW REPORT
==================

IN YEARS
IN $1000

| PERIOD | UNINFLATED INVESTMENT | INFLATN | CAPITALIZD FINANCING COSTS | LOAN REPAYMENT | OPERATING LOSSES | DIVIDENDS | TOTAL USES | CASH FROM OPERATION | EQUITY INVESTMT | LOAN DRAW OUT | TOTAL SOURCES | CASH BALANCE | CUMUL. CASH BALANCE |
|---|---|---|---|---|---|---|---|---|---|---|---|---|---|
| 1 | 1610 | 0 | 132 | 0 | 0 | 0 | 1742 | 0 | 441 | 1322 | 1762 | 20 | 20 |
| 2 | 10 | 0 | 0 | 81 | 0 | 0 | 91 | 109 | 7 | 22 | 139 | 47 | 67 |
| 3 | 10 | 0 | 0 | 90 | 0 | 0 | 100 | 117 | 0 | 0 | 117 | 17 | 85 |
| 4 | 10 | 0 | 0 | 99 | 0 | 0 | 109 | 126 | 0 | 0 | 126 | 17 | 102 |
| 5 | 10 | 0 | 0 | 109 | 0 | 0 | 119 | 137 | 0 | 0 | 137 | 17 | 119 |
| 6 | 10 | 0 | 0 | 121 | 0 | 0 | 131 | 148 | 0 | 0 | 148 | 17 | 137 |
| 7 | 10 | 0 | 0 | 133 | 0 | 0 | 143 | 157 | 0 | 0 | 157 | 14 | 150 |
| 8 | 10 | 0 | 0 | 116 | 0 | 0 | 126 | 163 | 0 | 0 | 163 | 38 | 188 |
| 9 | 10 | 0 | 0 | 128 | 0 | 0 | 138 | 173 | 0 | 0 | 173 | 36 | 224 |
| 10 | 10 | 0 | 0 | 141 | 0 | 0 | 151 | 185 | 0 | 0 | 185 | 34 | 258 |
| 11 | 10 | 0 | 0 | 155 | 0 | 0 | 165 | 197 | 0 | 0 | 197 | 32 | 289 |
| 12 | 10 | 0 | 0 | 172 | 0 | 0 | 182 | 211 | 0 | 0 | 211 | 29 | 319 |
| 13 | 10 | 0 | 0 | 0 | 0 | 0 | 10 | 220 | 0 | 0 | 220 | 210 | 529 |
| 14 | 10 | 0 | 0 | 0 | 0 | 0 | 10 | 220 | 0 | 0 | 220 | 210 | 739 |
| 15 | 10 | 0 | 0 | 0 | 0 | 0 | 10 | 220 | 0 | 0 | 220 | 210 | 949 |
| 16 | 10 | 0 | 0 | 0 | 0 | 0 | 10 | 220 | 0 | 0 | 220 | 210 | 1159 |
| 17 | 10 | 0 | 0 | 0 | 0 | 0 | 10 | 204 | 0 | 0 | 204 | 194 | 1353 |
| 18 | 10 | 0 | 0 | 0 | 0 | 0 | 10 | 204 | 0 | 0 | 204 | 194 | 1547 |
| 19 | 10 | 0 | 0 | 0 | 0 | 0 | 10 | 204 | 0 | 0 | 204 | 194 | 1741 |
| 20 | 10 | 0 | 0 | 0 | 0 | 0 | 10 | 204 | 0 | 0 | 204 | 194 | 1935 |
| 21 | 10 | 0 | 0 | 0 | 0 | 0 | 10 | 204 | 0 | 0 | 204 | 194 | 2129 |
| 22 | 10 | 0 | 0 | 0 | 0 | 0 | 10 | 204 | 0 | 0 | 204 | 194 | 2323 |
| 23 | 10 | 0 | 0 | 0 | 0 | 0 | 10 | 204 | 0 | 0 | 204 | 194 | 2517 |
| 24 | 10 | 0 | 0 | 0 | 0 | 0 | 10 | 204 | 0 | 0 | 204 | 194 | 2711 |
| 25 | -240 | 0 | 0 | 0 | 0 | 0 | -240 | 204 | 0 | 0 | 204 | 444 | 3155 |
| TOTAL | 1600 | 0 | 132 | 1344 | 0 | 0 | 3076 | 4439 | 448 | 1344 | 623 | | |

FIG. 35C

RUN DATE 6/19/18
DATA DATE
GRAPH1
NO CHANGES MADE

THE PERFORMANCE OF MY COMPANY
STUDY OF POSSIBLE "WHAT IF" CHANGES

================
INCOME REPORT
================

IN YEARS
IN $1000

| PERIOD | PRODUCTION VOLUME | REVENUE | VARIABLE COSTS | GROSS PROFIT | FIXED COSTS | FINANCE & INTEREST EXPENSE | DEPRECTN FIXED ASSETS | AMORTIZN CAPITALD INTEREST | AMORTIZN FINANCG FEES | INCOME BEFORE TAXES | TAXES | INCOME AFTER TAXES |
|---|---|---|---|---|---|---|---|---|---|---|---|---|
| 1 | 0 | 0 | 0 | 0 | 0 | 0 | 0 | 0 | 0 | 0 | 0 | 0 |
| 2 | 100 | 1000 | 750 | 250 | 10 | 131 | 107 | 26 | 0 | -24 | 0 | -24 |
| 3 | 100 | 1000 | 750 | 250 | 10 | 123 | 107 | 26 | 0 | -16 | 0 | -16 |
| 4 | 100 | 1000 | 750 | 250 | 10 | 114 | 107 | 26 | 0 | -7 | 0 | -7 |
| 5 | 100 | 1000 | 750 | 250 | 10 | 103 | 107 | 26 | 0 | 4 | 0 | 4 |
| 6 | 100 | 1000 | 750 | 250 | 10 | 92 | 107 | 26 | 0 | 15 | 0 | 15 |
| 7 | 100 | 1000 | 750 | 250 | 10 | 80 | 107 | 0 | 0 | 54 | 4 | 50 |
| 8 | 100 | 1000 | 750 | 250 | 10 | 67 | 107 | 0 | 0 | 67 | 10 | 57 |
| 9 | 100 | 1000 | 750 | 250 | 10 | 55 | 107 | 0 | 0 | 79 | 12 | 67 |
| 10 | 100 | 1000 | 750 | 250 | 10 | 42 | 107 | 0 | 0 | 92 | 14 | 78 |
| 11 | 100 | 1000 | 750 | 250 | 10 | 27 | 107 | 0 | 0 | 106 | 16 | 90 |
| 12 | 100 | 1000 | 750 | 250 | 10 | 11 | 107 | 0 | 0 | 123 | 18 | 104 |
| 13 | 100 | 1000 | 750 | 250 | 10 | 0 | 107 | 0 | 0 | 133 | 20 | 113 |
| 14 | 100 | 1000 | 750 | 250 | 10 | 0 | 107 | 0 | 0 | 133 | 20 | 113 |
| 15 | 100 | 1000 | 750 | 250 | 10 | 0 | 107 | 0 | 0 | 133 | 20 | 113 |
| 16 | 100 | 1000 | 750 | 250 | 10 | 0 | 107 | 0 | 0 | 133 | 20 | 113 |
| 17 | 100 | 1000 | 750 | 250 | 10 | 0 | 0 | 0 | 0 | 240 | 36 | 204 |
| 18 | 100 | 1000 | 750 | 250 | 10 | 0 | 0 | 0 | 0 | 240 | 36 | 204 |
| 19 | 100 | 1000 | 750 | 250 | 10 | 0 | 0 | 0 | 0 | 240 | 36 | 204 |
| 20 | 100 | 1000 | 750 | 250 | 10 | 0 | 0 | 0 | 0 | 240 | 36 | 204 |
| 21 | 100 | 1000 | 750 | 250 | 10 | 0 | 0 | 0 | 0 | 240 | 36 | 204 |
| 22 | 100 | 1000 | 750 | 250 | 10 | 0 | 0 | 0 | 0 | 240 | 36 | 204 |
| 23 | 100 | 1000 | 750 | 250 | 10 | 0 | 0 | 0 | 0 | 240 | 36 | 204 |
| 24 | 100 | 1000 | 750 | 250 | 10 | 0 | 0 | 0 | 0 | 240 | 36 | 204 |
| 25 | 100 | 1000 | 750 | 250 | 10 | 0 | 0 | 0 | 0 | 240 | 36 | 204 |
| TOTAL | 2400 | 24000 | 18000 | 6000 | 240 | 844 | 1600 | 132 | 0 | 3185 | 478 | 2707 |

FIG. 35D

RUN DATE 6/19/18
DATA DATE
GRAPH1
NO CHANGES MADE

THE PERFORMANCE OF MY COMPANY
STUDY OF POSSIBLE "WHAT IF" CHANGES

====================
BALANCE SHEET
====================

IN YEARS
IN $1000

| | | | | ASSETS | | | | | | LIABILITIES | | |
|---|---|---|---|---|---|---|---|---|---|---|---|---|
| PERIOD | CASH | WORKING CAPITAL | FIXED ASSETS | LESS ACC DEPRECTN | NET FIXED ASSETS | CAPITALZD FINANCING COSTS | LESS ACC AMORTIZN | NET CAPITLZD FIN.COST | TOTAL ASSETS | LOANS | EQUITY | RETAINED EARNINGS | TOTAL LIABILITS |
| 1 | 20 | 10 | 1600 | 0 | 1600 | 132 | 0 | 132 | 1762 | 1322 | 441 | 0 | 1762 |
| 2 | 67 | 20 | 1600 | 107 | 1493 | 132 | 26 | 106 | 1686 | 1263 | 448 | -24 | 1686 |
| 3 | 85 | 30 | 1600 | 213 | 1387 | 132 | 53 | 79 | 1581 | 1173 | 448 | -40 | 1581 |
| 4 | 102 | 40 | 1600 | 320 | 1280 | 132 | 79 | 53 | 1475 | 1074 | 448 | -47 | 1475 |
| 5 | 119 | 50 | 1600 | 427 | 1173 | 132 | 106 | 26 | 1369 | 965 | 448 | -44 | 1369 |
| 6 | 137 | 60 | 1600 | 533 | 1067 | 132 | 132 | 0 | 1263 | 844 | 448 | -29 | 1263 |
| 7 | 150 | 70 | 1600 | 640 | 960 | 132 | 132 | 0 | 1180 | 711 | 448 | 21 | 1180 |
| 8 | 188 | 80 | 1600 | 747 | 853 | 132 | 132 | 0 | 1121 | 595 | 448 | 78 | 1121 |
| 9 | 224 | 90 | 1600 | 853 | 747 | 132 | 132 | 0 | 1061 | 468 | 448 | 145 | 1061 |
| 10 | 258 | 100 | 1600 | 960 | 640 | 132 | 132 | 0 | 998 | 327 | 448 | 223 | 998 |
| 11 | 289 | 110 | 1600 | 1067 | 533 | 132 | 132 | 0 | 933 | 172 | 448 | 313 | 933 |
| 12 | 319 | 120 | 1600 | 1173 | 427 | 132 | 132 | 0 | 865 | 0 | 448 | 417 | 865 |
| 13 | 529 | 130 | 1600 | 1280 | 320 | 132 | 132 | 0 | 979 | 0 | 448 | 531 | 979 |
| 14 | 739 | 140 | 1600 | 1387 | 213 | 132 | 132 | 0 | 1092 | 0 | 448 | 644 | 1092 |
| 15 | 949 | 150 | 1600 | 1493 | 107 | 132 | 132 | 0 | 1205 | 0 | 448 | 757 | 1205 |
| 16 | 1159 | 160 | 1600 | 1600 | 0 | 132 | 132 | 0 | 1319 | 0 | 448 | 871 | 1319 |
| 17 | 1353 | 170 | 1600 | 1600 | 0 | 132 | 132 | 0 | 1523 | 0 | 448 | 1075 | 1523 |
| 18 | 1547 | 180 | 1600 | 1600 | 0 | 132 | 132 | 0 | 1727 | 0 | 448 | 1279 | 1727 |
| 19 | 1741 | 190 | 1600 | 1600 | 0 | 132 | 132 | 0 | 1931 | 0 | 448 | 1483 | 1931 |
| 20 | 1935 | 200 | 1600 | 1600 | 0 | 132 | 132 | 0 | 2135 | 0 | 448 | 1687 | 2135 |
| 21 | 2129 | 210 | 1600 | 1600 | 0 | 132 | 132 | 0 | 2339 | 0 | 448 | 1891 | 2339 |
| 22 | 2323 | 220 | 1600 | 1600 | 0 | 132 | 132 | 0 | 2543 | 0 | 448 | 2095 | 2543 |
| 23 | 2517 | 230 | 1600 | 1600 | 0 | 132 | 132 | 0 | 2747 | 0 | 448 | 2299 | 2747 |
| 24 | 2711 | 240 | 1600 | 1600 | 0 | 132 | 132 | 0 | 2951 | 0 | 448 | 2503 | 2951 |
| 25 | 3155 | 0 | 1600 | 1600 | 0 | 132 | 132 | 0 | 3155 | 0 | 448 | 2707 | 3155 |

FIG. 35E

RUN DATE 6/19/18
DATA DATE
GRAPH1
NO CHANGES MADE

THE PERFORMANCE OF MY COMPANY
STUDY OF POSSIBLE "WHAT IF" CHANGES

==============
DETAIL REPORT
==============

IN YEARS
IN $1000

| PERIOD | INFLATD UNIT PRICE | INFLATD UNIT COST | LOAN INITIATION FEE | COMMITMNT FEE | INFLATED INVESTMENT IN ASSETS | INFLATED REPLACMT | INFLATED OTHER INVESTMTS | INFLATED WORKG CAP | WASTED DEPREC |
|---|---|---|---|---|---|---|---|---|---|
| 1 | 10.000 | 0.000 | 0 | 0 | 1500 | 0 | 100 | 10 | 0 |
| 2 | 10.000 | 7.500 | 0 | 0 | 0 | 0 | 0 | 10 | 0 |
| 3 | 10.000 | 7.500 | 0 | 0 | 0 | 0 | 0 | 10 | 0 |
| 4 | 10.000 | 7.500 | 0 | 0 | 0 | 0 | 0 | 10 | 0 |
| 5 | 10.000 | 7.500 | 0 | 0 | 0 | 0 | 0 | 10 | 0 |
| 6 | 10.000 | 7.500 | 0 | 0 | 0 | 0 | 0 | 10 | 0 |
| 7 | 10.000 | 7.500 | 0 | 0 | 0 | 0 | 0 | 10 | 0 |
| 8 | 10.000 | 7.500 | 0 | 0 | 0 | 0 | 0 | 10 | 0 |
| 9 | 10.000 | 7.500 | 0 | 0 | 0 | 0 | 0 | 10 | 0 |
| 10 | 10.000 | 7.500 | 0 | 0 | 0 | 0 | 0 | 10 | 0 |
| 11 | 10.000 | 7.500 | 0 | 0 | 0 | 0 | 0 | 10 | 0 |
| 12 | 10.000 | 7.500 | 0 | 0 | 0 | 0 | 0 | 10 | 0 |
| 13 | 10.000 | 7.500 | 0 | 0 | 0 | 0 | 0 | 10 | 0 |
| 14 | 10.000 | 7.500 | 0 | 0 | 0 | 0 | 0 | 10 | 0 |
| 15 | 10.000 | 7.500 | 0 | 0 | 0 | 0 | 0 | 10 | 0 |
| 16 | 10.000 | 7.500 | 0 | 0 | 0 | 0 | 0 | 10 | 0 |
| 17 | 10.000 | 7.500 | 0 | 0 | 0 | 0 | 0 | 10 | 0 |
| 18 | 10.000 | 7.500 | 0 | 0 | 0 | 0 | 0 | 10 | 0 |
| 19 | 10.000 | 7.500 | 0 | 0 | 0 | 0 | 0 | 10 | 0 |
| 20 | 10.000 | 7.500 | 0 | 0 | 0 | 0 | 0 | 10 | 0 |
| 21 | 10.000 | 7.500 | 0 | 0 | 0 | 0 | 0 | 10 | 0 |
| 22 | 10.000 | 7.500 | 0 | 0 | 0 | 0 | 0 | 10 | 0 |
| 23 | 10.000 | 7.500 | 0 | 0 | 0 | 0 | 0 | 10 | 0 |
| 24 | 10.000 | 7.500 | 0 | 0 | 0 | 0 | 0 | 10 | 0 |
| 25 | 10.000 | 7.500 | 0 | 0 | 0 | 0 | 0 | -240 | 0 |
| TOTAL | | | | 0 | 1500 | 0 | 100 | | |

FIG. 35F

RUN DATE 5/19/18
DATA DATE 10/22/16
PROJECTS
NO CHANGES MADE

THE PERFORMANCE OF MY COMPANY
STUDY OF POSSIBLE "WHAT IF" CHANGES

IN YEARS
IN $1000

======================================
SENIOR / JUNIOR FINANCING DATA
======================================

SENIOR BORROWING — 361

JUNIOR LOAN — 362

| PERIOD | LOAN DRAW OUT | LOAN REPAYMENT | CAPITALZD FINANCING COSTS | FINANCE & INTEREST EXPENSE | LOAN INITIATN FEE | LOAN COMMITMNT FEE | LOAN DRAW OUT | LOAN REPAYMENT | CAPITALZD FINANCING COSTS | FINANCE & INTEREST EXPENSE | LOAN INITIATN FEE | LOAN COMMITMNT FEE |
|---|---|---|---|---|---|---|---|---|---|---|---|---|
| 1 | 1322 | 0 | 132 | 0  363 | 0 | 0 | 0 | 0 | 0 | 0 | 0 | 0 |
| 2 | 0 | 103 | 0 | 128 | 0 | 0 | 192 | 0 | 0 | 0 | 0 | 0 |
| 3 | 0 | 112 | 0 | 118 | 0 | 0 | 0 | 0 | 0 | 0 | 0 | 0 |
| 4 | 0 | 124 | 0 | 108 | 0 | 0 | 0 | 0 | 0 | 0 | 0 | 0 |
| 5 | 0 | 137 | 0 | 93 | 0 | 0 | 0 | 0 | 0 | 0 | 0 | 0 |
| 6 | 0 | 151 | 0 | 79 | 0 | 0 | 2 | 0 | 0 | 0 | 0 | 0 |
| 7 | 0 | 166 | 0 | 64  364 | 0 | 0 | 6 | 0 | 0 | 0 | 0 | 0 |
| 8 | 0 | 160 | 0 | 47 | 0 | 0 | 12 | 13 | 0 | 0 | 0 | 0 |
| 9 | 0 | 175 | 0 | 32 | 0 | 0 | 0 | 13 | 0 | 0 | 0 | 0 |
| 10 | 0 | 195 | 0 | 12 | 0 | 0 | 0 | 13 | 0 | 0 | 0 | 0 |
| 11 | 0 | 0 | 0 | 0 | 0 | 0 | 0 | 13  365 | 0 | 0 | 0 | 0 |
| 12 | 0 | 0 | 0 | 0 | 0 | 0 | 0 | 13 | 0 | 0 | 0 | 0 |
| 13 | 0 | 0 | 0 | 0 | 0 | 0 | 0 | 13 | 0 | 0 | 0 | 0 |
| 14 | 0 | 0 | 0 | 0 | 0 | 0 | 0 | 134  366 | 0 | 0 | 0 | 0 |
| 15 | 0 | 0 | 0 | 0 | 0 | 0 | 0 | 0 | 0 | 0 | 0 | 0 |
| 16 | 0 | 0 | 0 | 0 | 0 | 0 | 0 | 0 | 0 | 0 | 0 | 0 |
| 17 | 0 | 0 | 0 | 0 | 0 | 0 | 0 | 0 | 0 | 0 | 0 | 0 |
| 18 | 0 | 0 | 0 | 0 | 0 | 0 | 0 | 0 | 0 | 0 | 0 | 0 |
| 19 | 0 | 0 | 0 | 0 | 0 | 0 | 0 | 0 | 0 | 0 | 0 | 0 |
| 20 | 0 | 0 | 0 | 0 | 0 | 0 | 0 | 0 | 0 | 0 | 0 | 0 |
| 21 | 0 | 0 | 0 | 0 | 0 | 0 | 0 | 0 | 0 | 0 | 0 | 0 |
| 22 | 0 | 0 | 0 | 0 | 0 | 0 | 0 | 0 | 0 | 0 | 0 | 0 |
| 23 | 0 | 0 | 0 | 0 | 0 | 0 | 0 | 0 | 0 | 0 | 0 | 0 |
| 24 | 0 | 0 | 0 | 0 | 0 | 0 | 0 | 0 | 0 | 0 | 0 | 0 |
| 25 | 0 | 0 | 0 | 0 | 0 | 0 | 0 | 0 | 0 | 0 | 0 | 0 |
| TOTAL | 1322 | 1322 | 132 | 579 | 0 | 0 | 212 | 212 | 0 | 0 | 0 | 0 |

WHATIF ONE-PAGE MULTI-Y AXIS GRAPHING SYSTEM

FIELD OF THE INVENTION

The invention relates to a system and method for generating a one-page multi-Y axis graph.

BACKGROUND OF THE INVENTION

In the fields of project feasibility analysis, project optimization, and project structuring, a project manager may evaluate likely alternatives and consider the impact of these alternatives on the profitability and potential success of a proposed project. Existing tools can calculate project profitability measures such as return on investment (ROI) and return on equity (ROE) for a single set of project characteristics including data such as price, cost, volume, and taxes. Multiple changes in project characteristics become increasingly difficult to analyze and interpret.

Originally decisions whether to go forward with a project were made by gut feelings about the potential success of the project. This made evaluating single projects and alternative projects difficult. This problem has been partially solved by the implementation of graphs of profitability measures but these had and still have significant problems.

The RETURN ON INVESTMENT (ROI) TOOL in U.S. Pat. No. 7,647,260 to Milleker et al., Jan. 12, 2010 calculates ROI profitability measure.

The DISPLAY OF MULTIPLE VARIABLE RELATIONSHIPS in U.S. Pat. No. 5,307,455 to Higgins et al., Apr. 26, 1994 displays multiple variable relationships.

The PERFORMING WHAT-IF ANALYSIS in U.S. Pat. No. 9,183,506 to Rahmouni et al., Nov. 10, 2015 determines a likelihood of a particular event occurring and a likely impact of the particular event.

The USER INTERFACE FOR REPRESENTING MULTIPLE DATA SETS ON A COMMON GRAPH in U.S. Pat. No. 7,248,263 to Freeman et al., Jul. 24, 2007 displays one or more data sets, having varying scales on a common X-Y graph with one X-axis and one Y-axis.

The METHOD AND SYSTEM FOR DATA SELECTION AND DISPLAY in U.S. Pat. No. 8,132,101 to Buck et al., Mar. 6, 2012 displays two Y-axis on a single graph. The coordinates for the second Y-axis are distinct from the first unit of measure.

The DYNAMIC PRESENTATION GENERATOR in U.S. Pat. No. 7,607,089 to Baker et al., Oct. 20, 2009 creates a multiple slide presentation with common branding and common appearance through multiple slides.

We have found that existing tools fail to resolve the problem of information overflow.

Information overflow occurs when a human operator tries to understand the resultant effect on the feasibility and profitability of a project when multiple simultaneous changes occur in financial characteristics of the project. What is needed is a method, without going back to a computer, for determining the change in profitability measures, dependent variables, of a project caused by both singular and multiple changes in one or more of the project base case financial metrics, independent variables.

SUMMARY OF THE INVENTION

The invention provides a one-page multi-Y axis X-Y graph. The graph allows a user to see the effect of multiple changes in project characteristics on the project's profitability measures. The invention also provides the ability to perform What If analysis of changes in the project characteristics without the need to perform additional computer simulations.

A one-page multi-Y axis plotting system and method is described that allows multiple financial simulations to be compared on a one-page graph. The computer software GRAPH function plots curves of profitability measures on an X-Y graph with multiple financial metrics. Each financial metric is placed on a separate Y-axis on the graph. The graph is displayed on the user's display monitor 110. The graph can be customized, saved, and printed. The graph allows the user to observe the changed outcome on profitability measures that would be caused by changes in one or more of the project financial metrics without the need to run additional computer financial simulations. When used with spreadsheet input, the graph allows the user to observe the changed outcome on dependent variables that would be caused by changing one or more independent variables.

By using a one-page multi-Y axis graph, a user can view the relative impact of changing multiple independent variables, immediately see the resultant effect on dependent variables, avoid the need to resort to additional calculations, and reduce the confusion of information overload.

On each Y-axis on the multi-Y axis graph, one Y-value label is displayed for each independent variable value. All Y-value label positions are determined by one curve drawn on the one-page graph. All Y-value tick mark positions are determined by all curves drawn on the one-page graph The 3-step high level summary of creating a one-page multi-Y axis X-Y graph is
1. One Y-axis is drawn for the first series of independent variable values.
2. One curve drawn for each of the user selected collections of dependent variable values.
3. One additional Y-axis is added to the graph for each of the remaining user selected series of independent variable values.

BRIEF DESCRIPTION OF THE DRAWINGS

Figure 4:
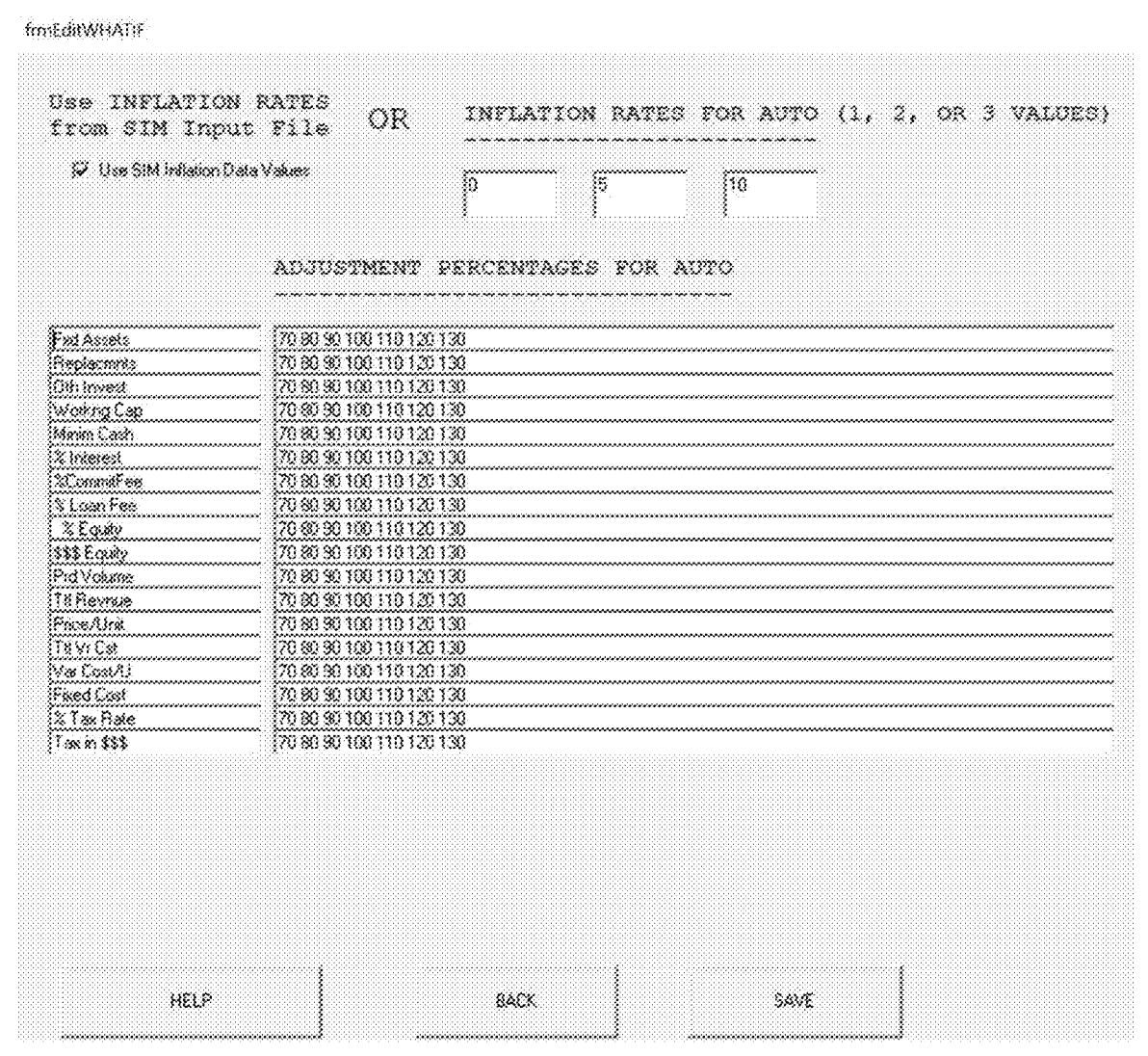

FIG. 4 illustrates the contents of the default automate adjustments file named WHATIF;

FIGS. 5A-5B illustrates the contents of the default simulate input file named SAMPLE;

Figure 6A:
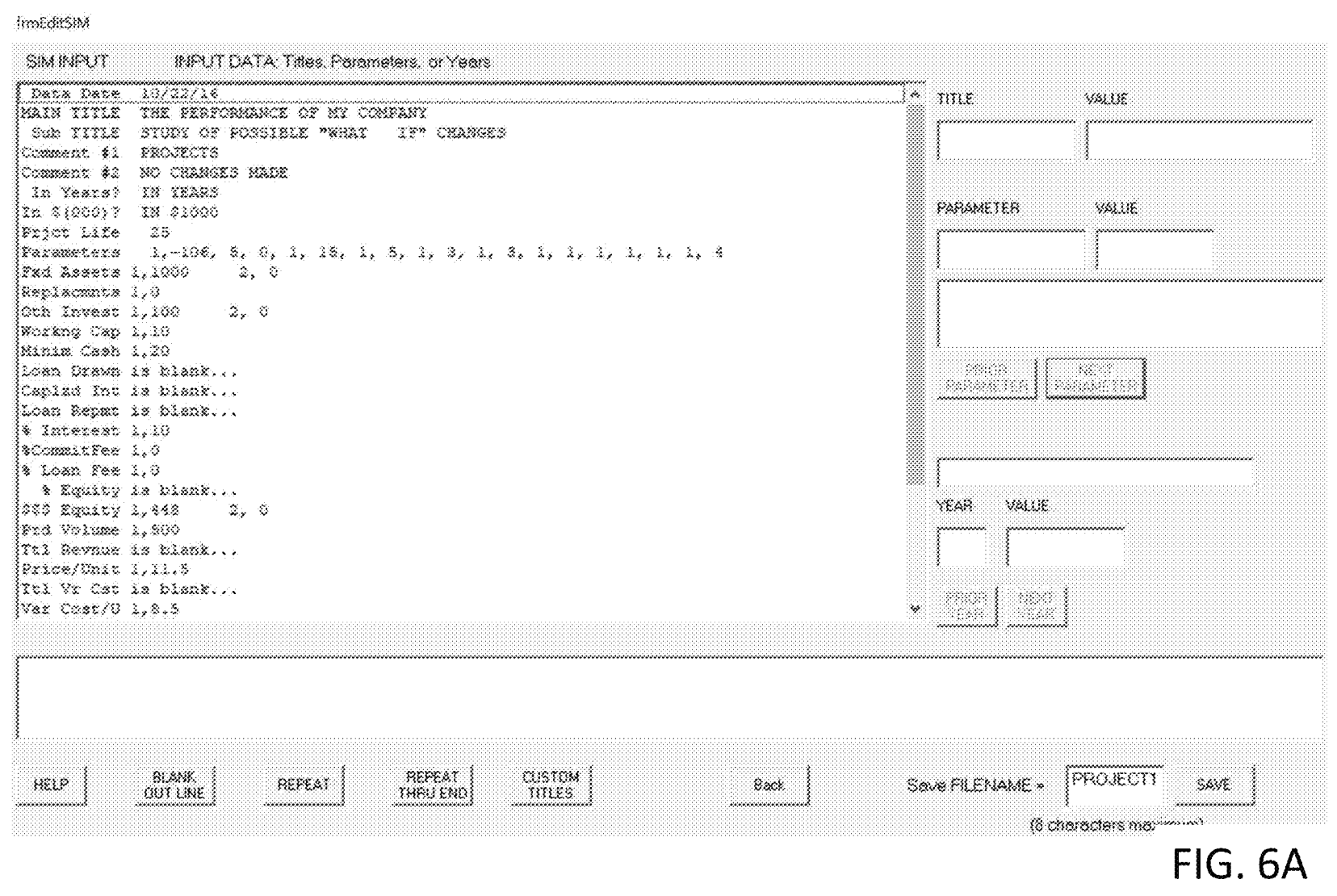
Figure 6B:
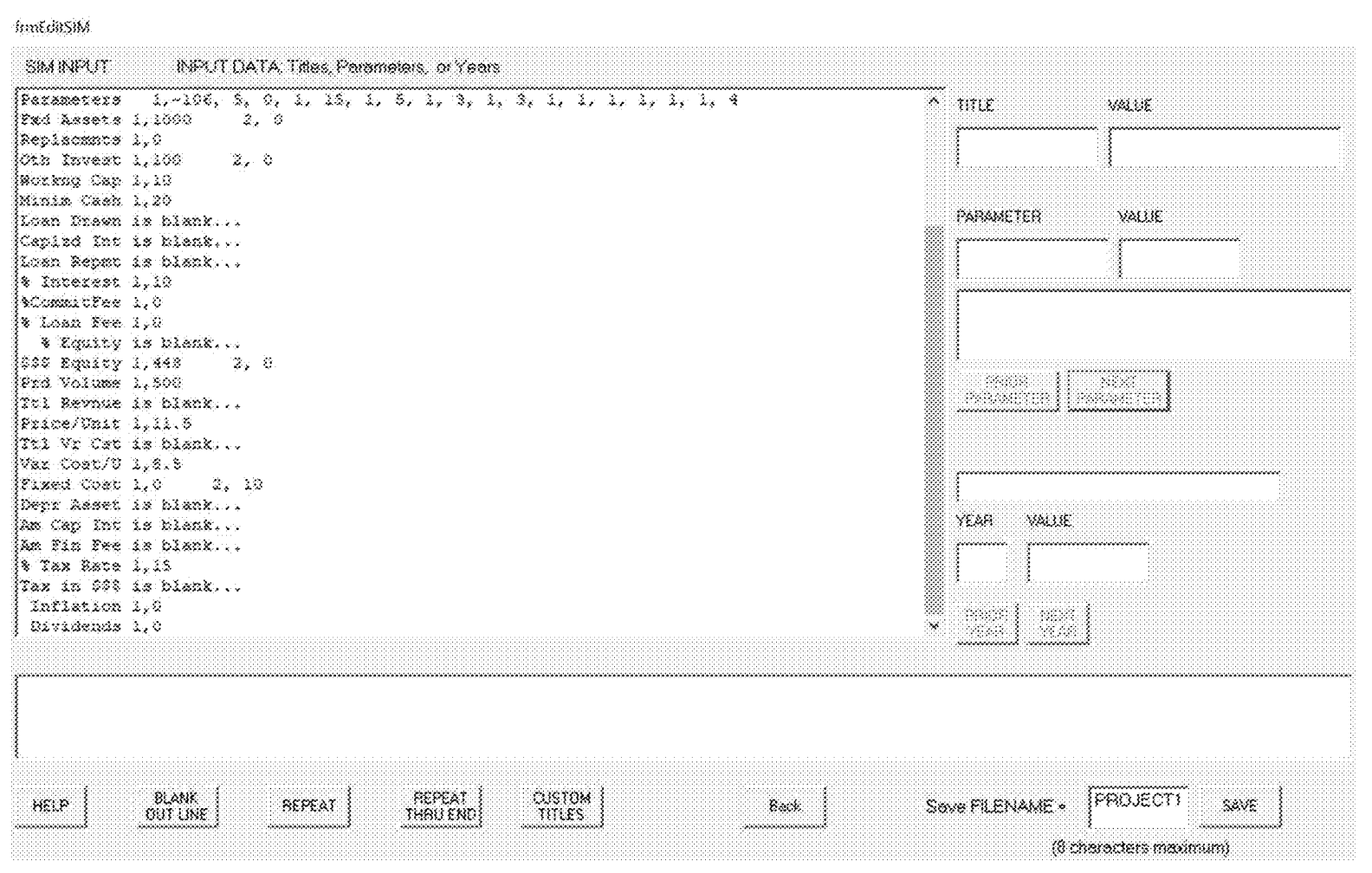

FIGS. 6A-6B illustrates the contents of a tailored base case file named PROJECT1;

FIG. 7 illustrates the profitability measures of PROJECT1 produced by the SIMULATE function;

FIG. 20 illustrates the contents of a sensitivity output file for unit variable cost;

FIG. 21 illustrates the contents of a sensitivity output file for unit price;

FIG. 22 illustrates the contents of a sensitivity output file for volume;

FIG. 24 illustrates the contents of the sensitivity report control file named SYNOP.DAT;

FIGS. 33A-338 is a logic flowchart illustrating a software routine for generating a one-page multi-Y axis graph;

FIGS. 35A-35F illustrates the standard financial reports produced by the SIMULATE function;

FIG. 36 illustrates the senior/junior financing data report produced by the SIMULATE function;

FIG. 37 illustrates a context sensitive HELP page produced during the EDIT function;

DETAILED DESCRIPTION

Figure 1:
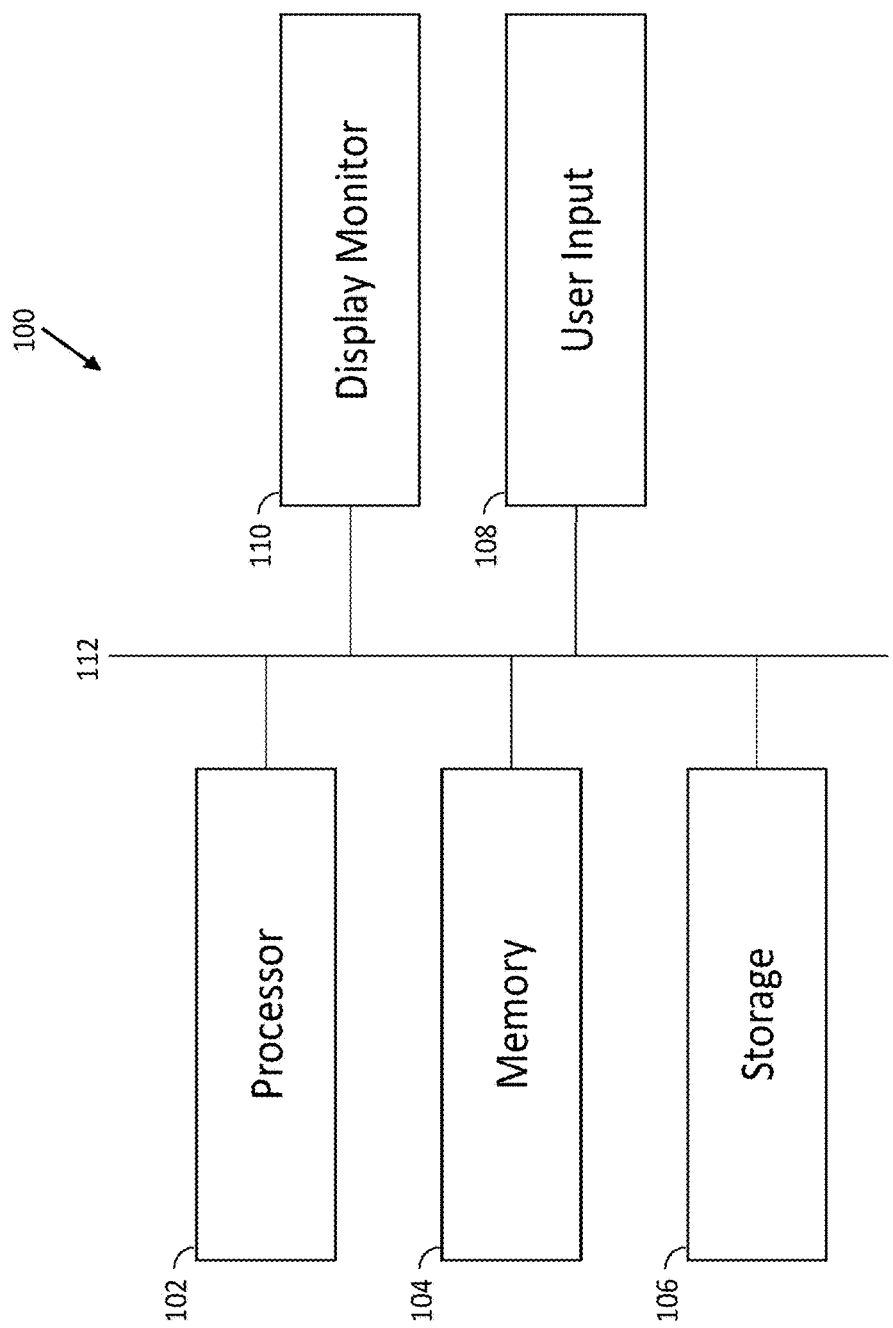
FIG. 1 is a block diagram of a computer system on which the present invention may be implemented.

FIG. 1 is a block diagram of a computer system 100 on which the present invention may be implemented. The computer system 100 includes a processor 102; memory 104; an internal or external storage device 106; a user input device 108, such as a keyboard and mouse; and a display monitor 110. The components 102-110 are interconnected through appropriate interfaces to a bus 112. It will be appreciated that the computer system 100 as illustrated is merely representative and the included components 102-110 are likewise representative and not meant to be exhaustive.

Figure 2:
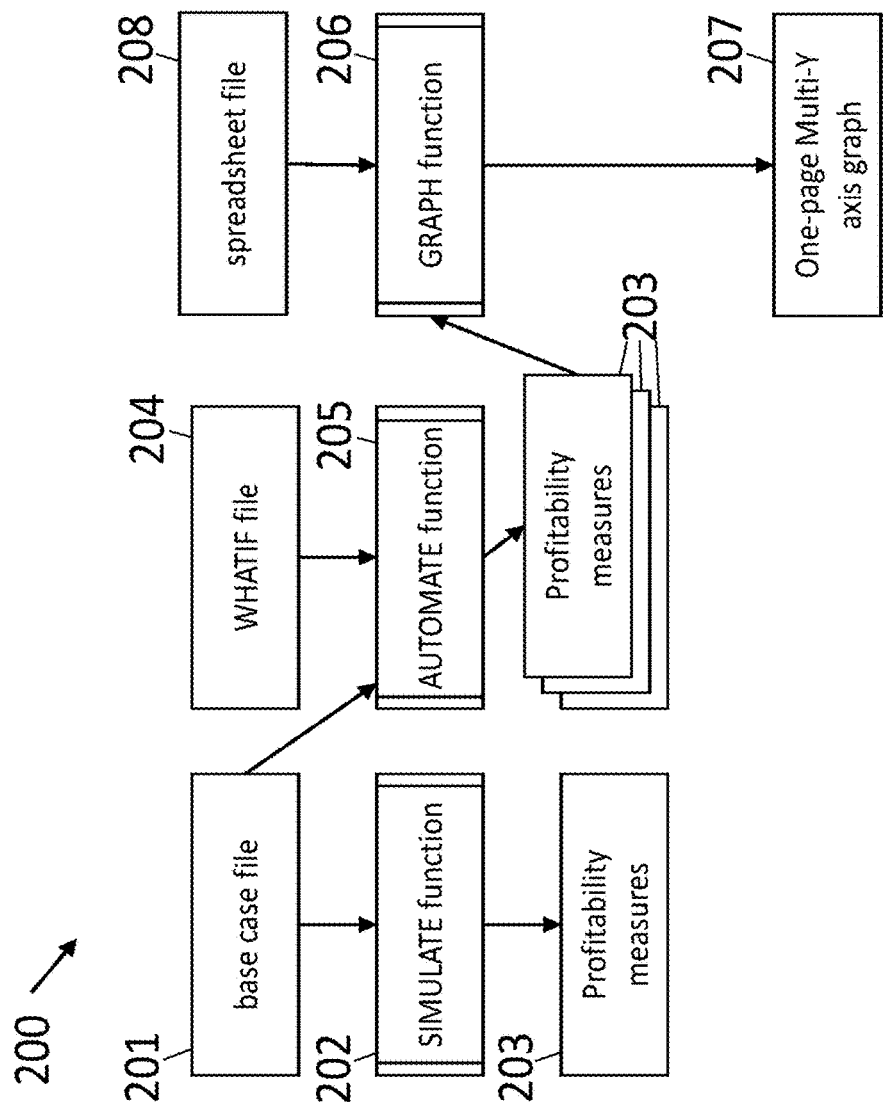
FIG. 2 is a block diagram depicting one embodiment of the present invention.

One embodiment of the invention is the "WHATIF SYSTEM" (FIG. 2). The WHATIF SYSTEM 200 is a computer program that creates a one-page multi-Y axis graph 207 from a data spreadsheet 208 (FIGS. 18A-18C) or data from financial simulation profitability measures 203 (FIGS. 20-23).

The WHATIF SYSTEM provides the ability to 1. Create a financial base case project data file 201. The base case describes the most likely attributes of a project in terms of financial metrics. 2. SIMULATE 202 the base case project and produce profitability measures 203 3. Use the WHATIF file 204 to AUTOMATE 205 the simulation of multiple changes to the base case file and 4. Using the GRAPH function 206, create a one-page multi-Y axis graph 207. The graph allows the user to visualize the change of profitability measures that would be caused by simultaneously changing one or more of the financial metrics of the base case.

In order to facilitate a better understanding of the nature of the invention an embodiment of the one-page multi-Y axis method will now be described in detail, by way of examples, with reference to the accompanying drawings in which:

FIGS. 3 thru 14 illustrate the user interfaces of the WHATIF SYSTEM as it can be used to graph financial metrics and their resulting profitability measures.

Figure 15:
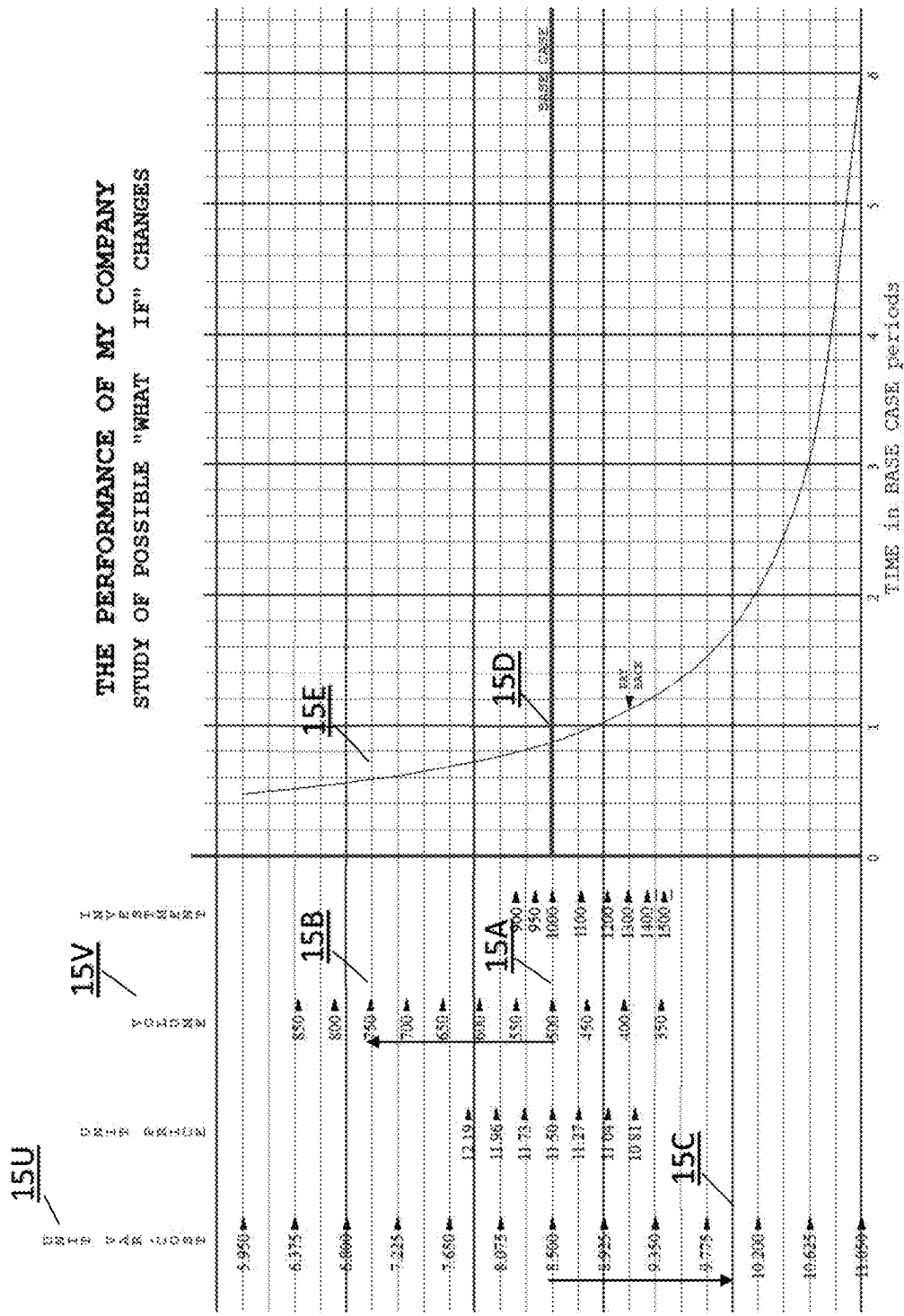
FIG. 15 illustrates the one-page multi-Y axis graph with 4 Y-axis and one curve of payback.

FIG. 15 illustrates how to use the one-page multi-Y axis graph for financial decision making.

Figure 16:
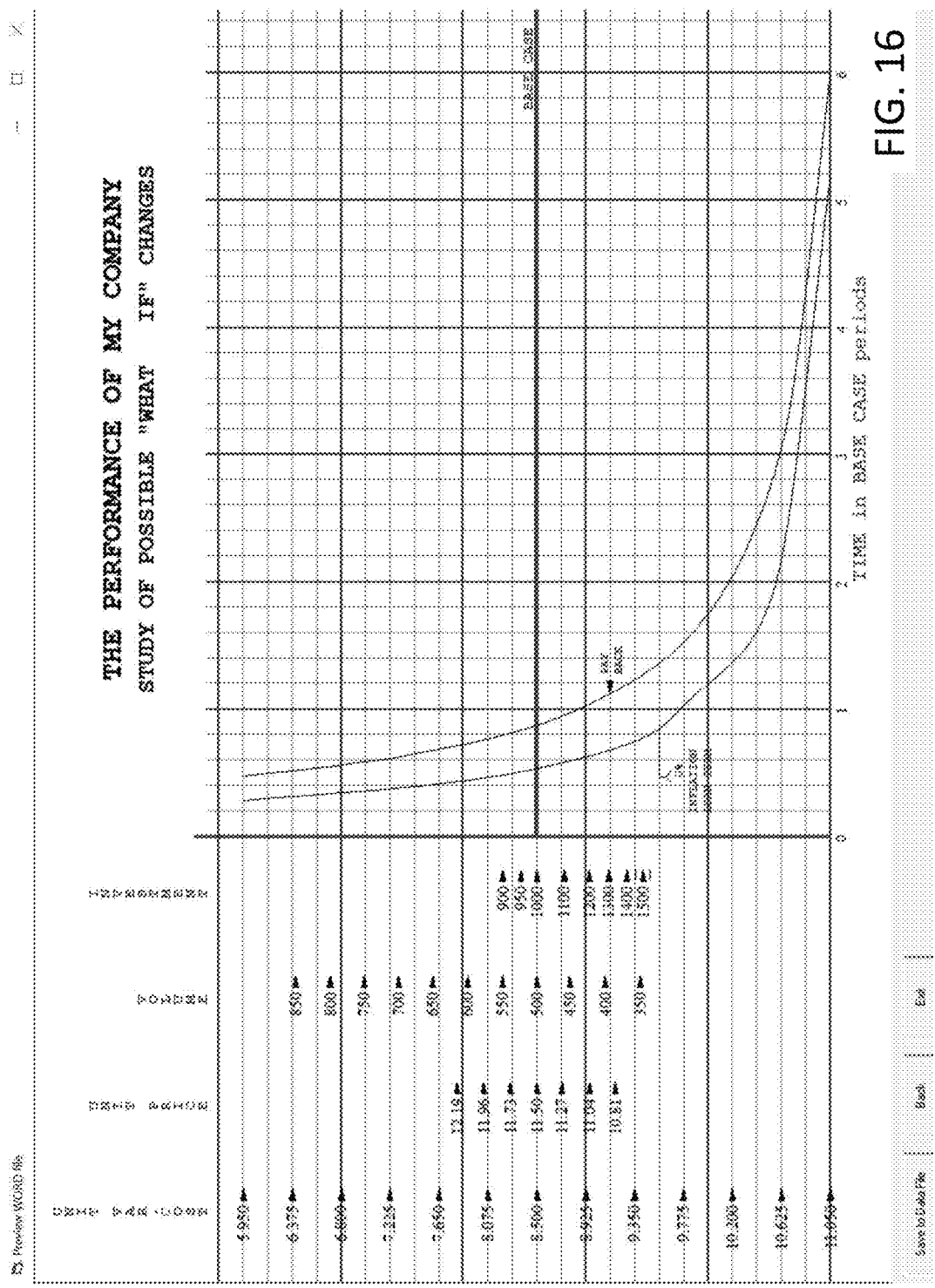
FIG. 16 illustrates a graph produced by the graph function with multiple Y-axis and multiple curves.
Figure 17:
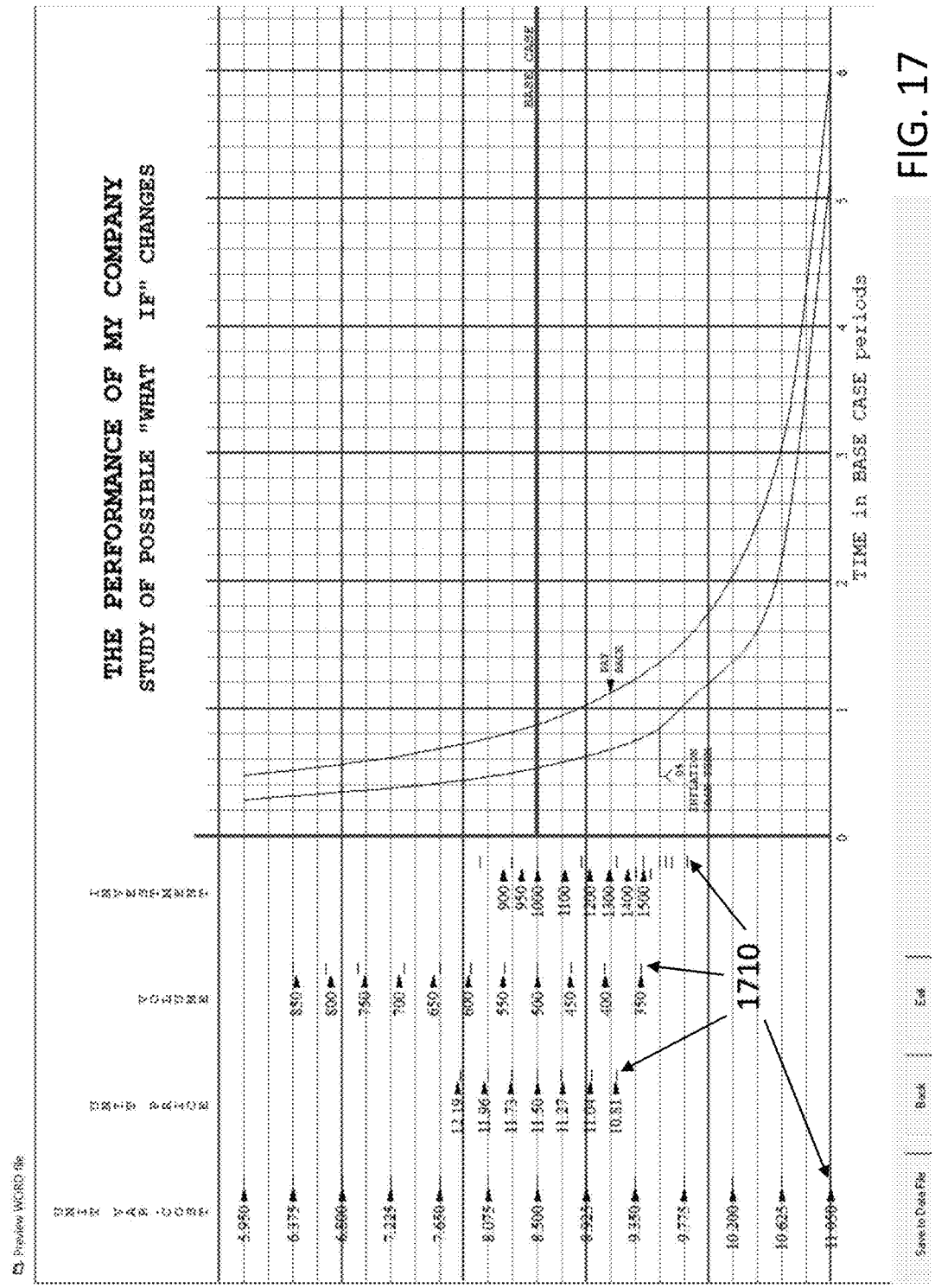
FIG. 17 illustrates a graph produced by the graph function with optional tick marks.

FIGS. 16 thru 17 illustrate a graph of multiple data curves without and with optional tick marks.

Figure 18A:
FIGS. 18A-18C illustrates the contents of the default spreadsheet file named SAMPLE.XLS.
Figure 18B:
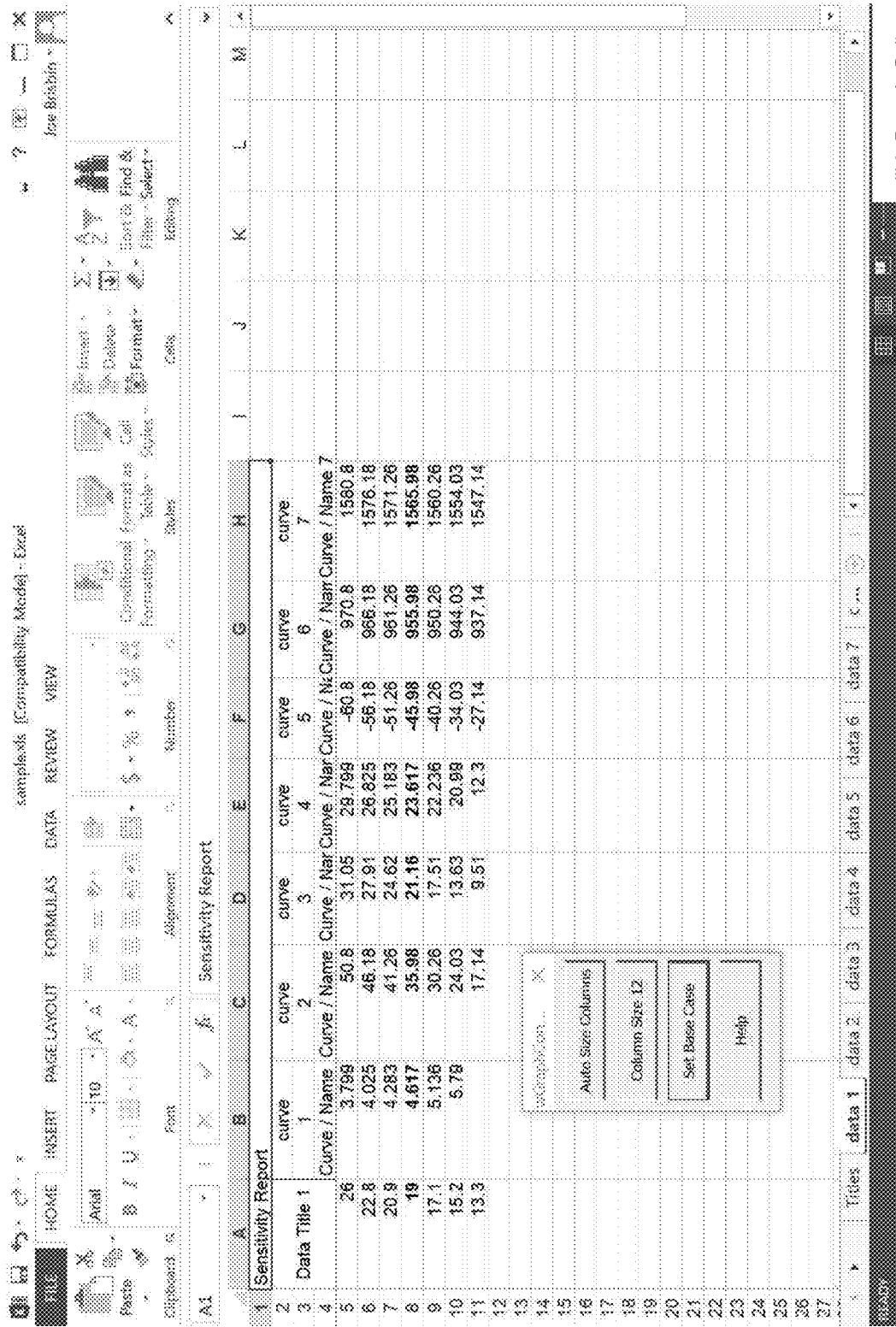
Figure 18C:
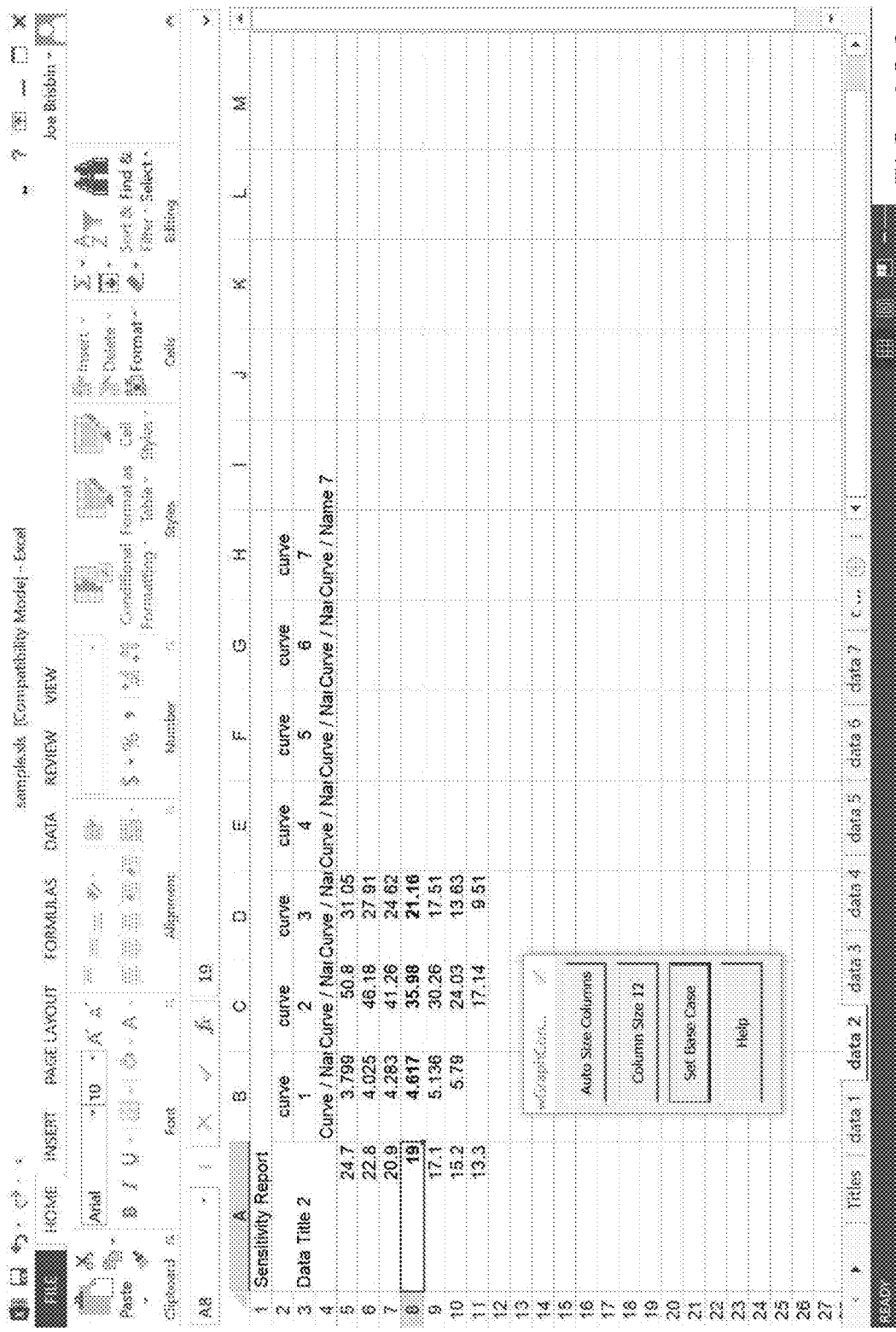
Figure 19:
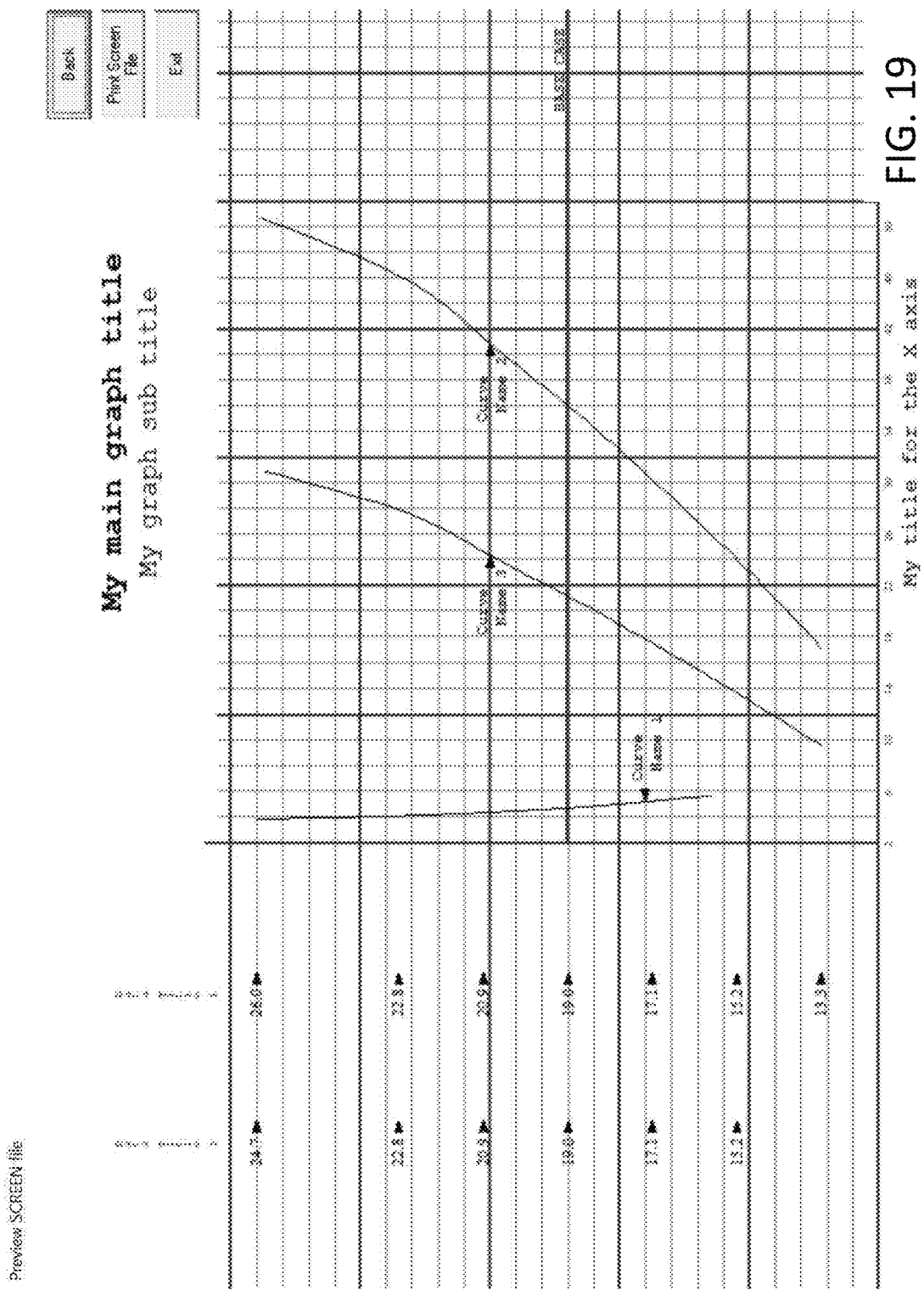
FIG. 19 illustrates a graph produced by the graph module with input from spreadsheet SAMPLE.XLS.
Figure 23:
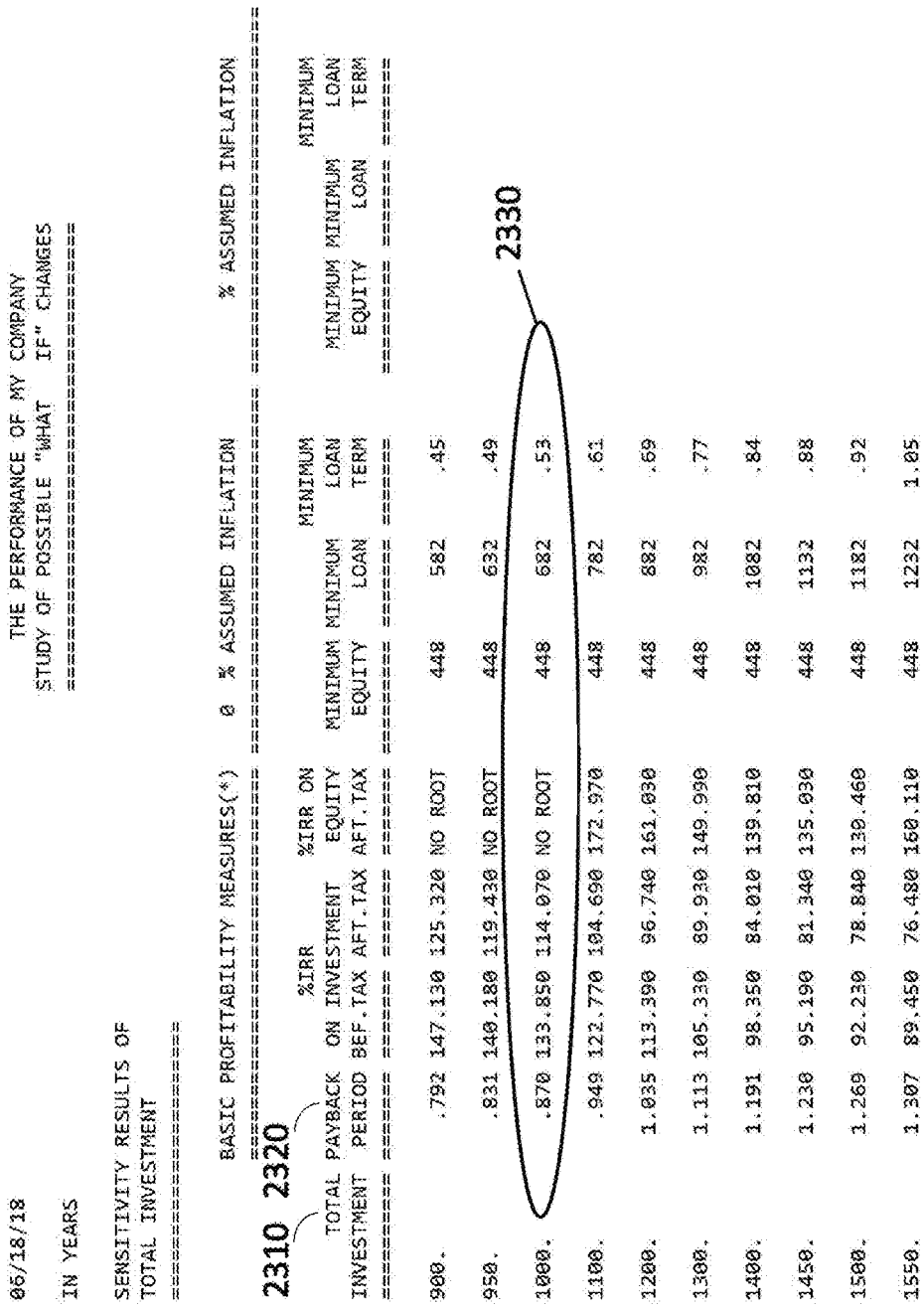
FIG. 23 illustrates the contents of a sensitivity output file for investment.

FIGS. 18A thru 19 illustrate a spreadsheet input file and resulting graph from the spreadsheet.

FIGS. 20 thru 23 illustrate the contents of the example financial sensitivity files.

FIG. 24 illustrates the contents of the sensitivity report control file that is used to build all financial sensitivity output files.

FIGS. 25A thru 34 are logic flowcharts illustrating how one embodiment of the WHATIF SYSTEM is built.

FIGS. 35A thru 35F illustrates the standard financial reports produced by the SIMULATE function.

FIG. 36 illustrates the senior/junior financing data report produced by the SIMULATE function, FIG. 37 illustrates a context sensitive HELP page produced during the EDIT function;

FIGS. 38-43 illustrate the user interfaces listing available files for input to the EDIT, VIEW, DELETE, PRINT, SIMULATE, and AUTOMATE functions;

The Main menu (FIG. 3) of the WHATIF SYSTEM provides several buttons to perform functions for the present invention including:

The HELP function (FIG. 26) displays context sensitive help pages to guide the user of the WHATIF SYSTEM.

The EDIT function (FIG. 27) provides for customized editing of input files for the SIMULATE function and for the AUTOMATE function;

The VIEW function (FIG. 28) provides for viewing data files with prevention of any changes during the viewing of the data files;

The DELETE function (FIG. 29) provides for deleting data files with automatic replacement of deleted WHATIF auto adjustments file and automatic replacement of deleted SAMPLE example project data file;

The PRINT function (FIG. 30) provides for printing text data files;

The SIMULATE function 302 (FIG. 31) provides for SIMULATING a project file and calculating financial profitability measures and generating financial reports resulting from the simulation;

The AUTOMATE function 305 (FIG. 32) automatically applies adjustments to a base case project file and then runs the SIMULATE program on each adjusted base case file;

The GRAPH function 306 (FIGS. 33A-336) produces a one-page multi-Y axis graph from a spreadsheet or from one or more sets of financial profitability measures according to the present invention;

FIG. 4 illustrates the contents of the default automate adjustments file named WHATIF as seen through the EDIT user interface.

Figure 5A:
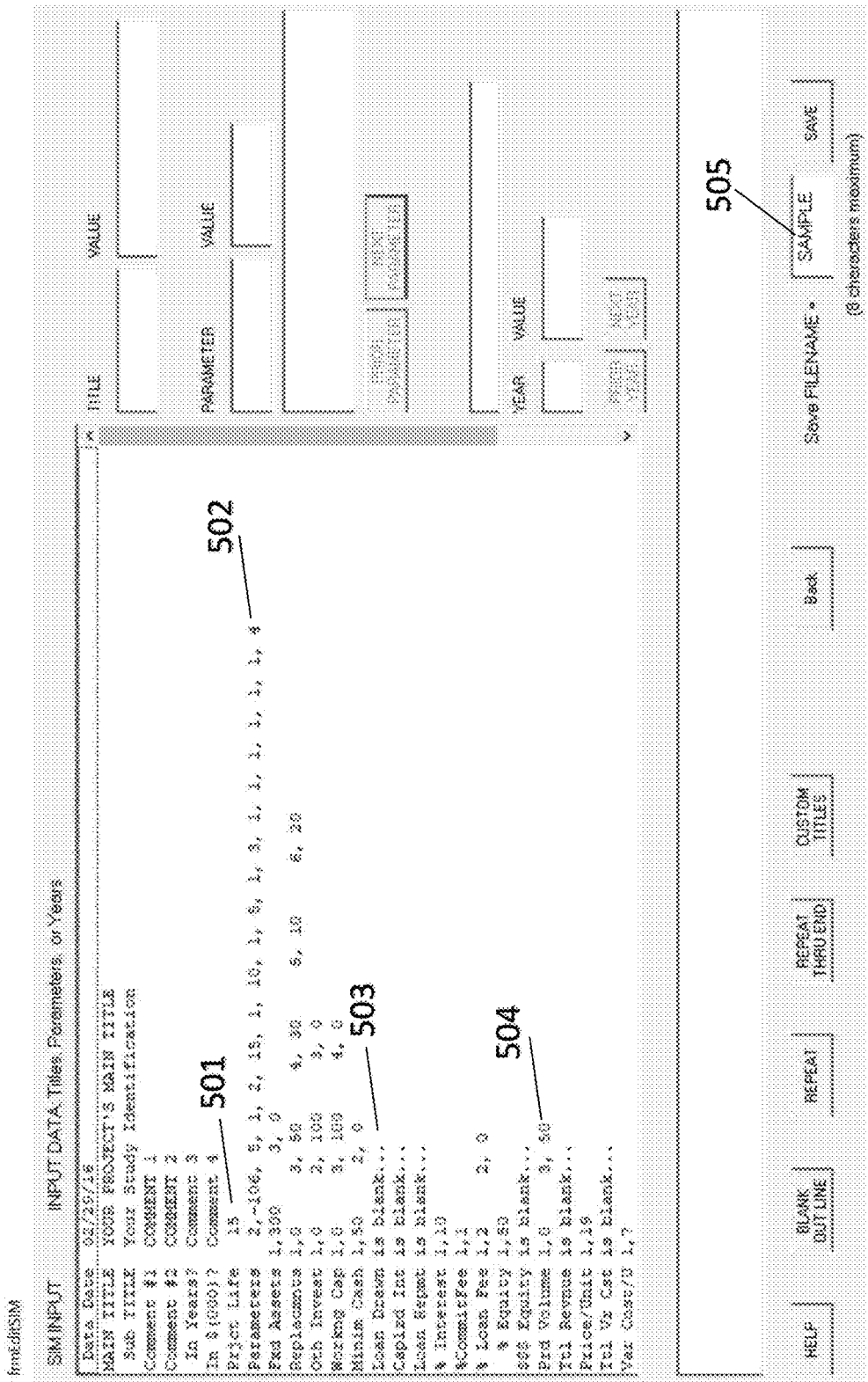
Figure 5B:
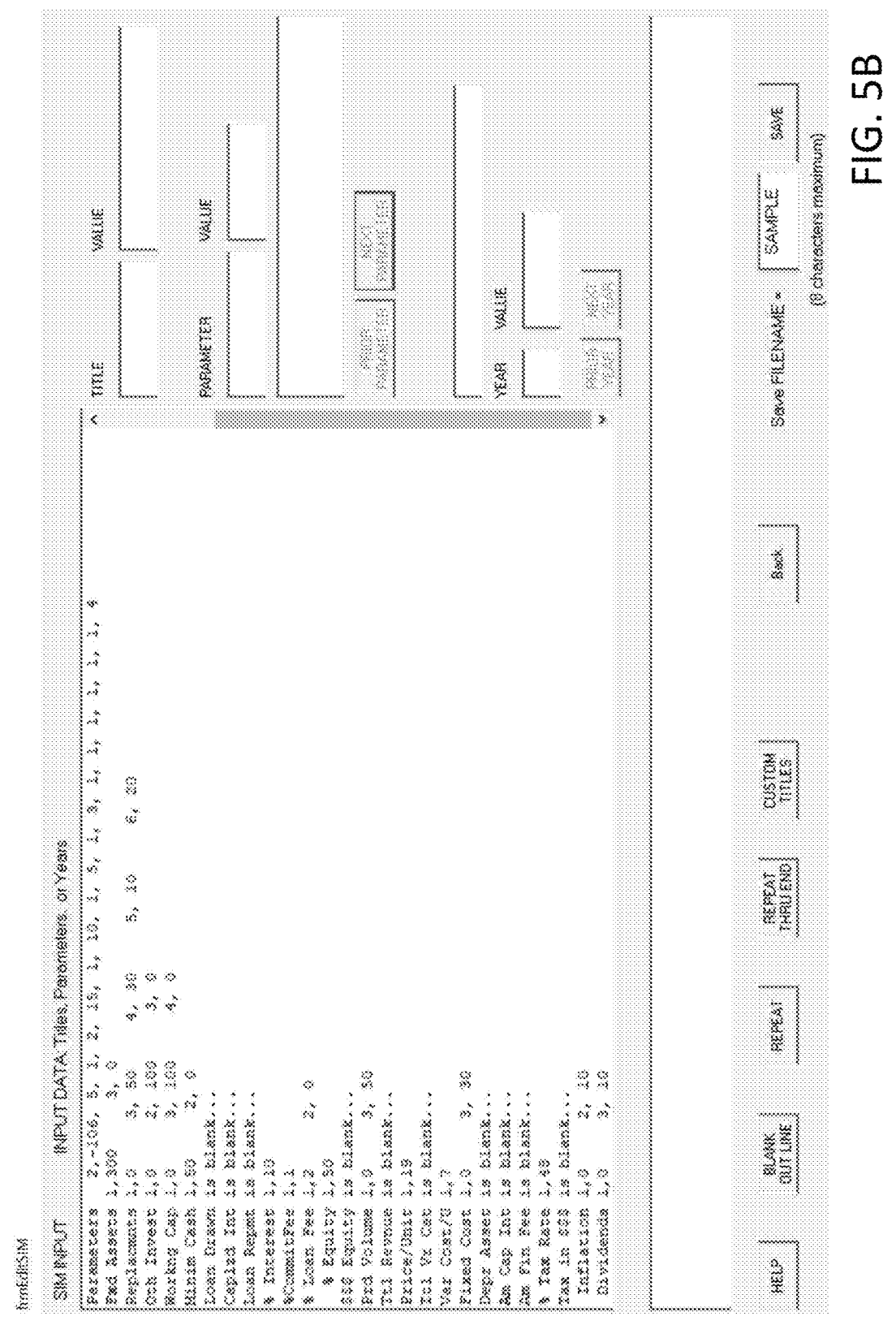
Figure 8:
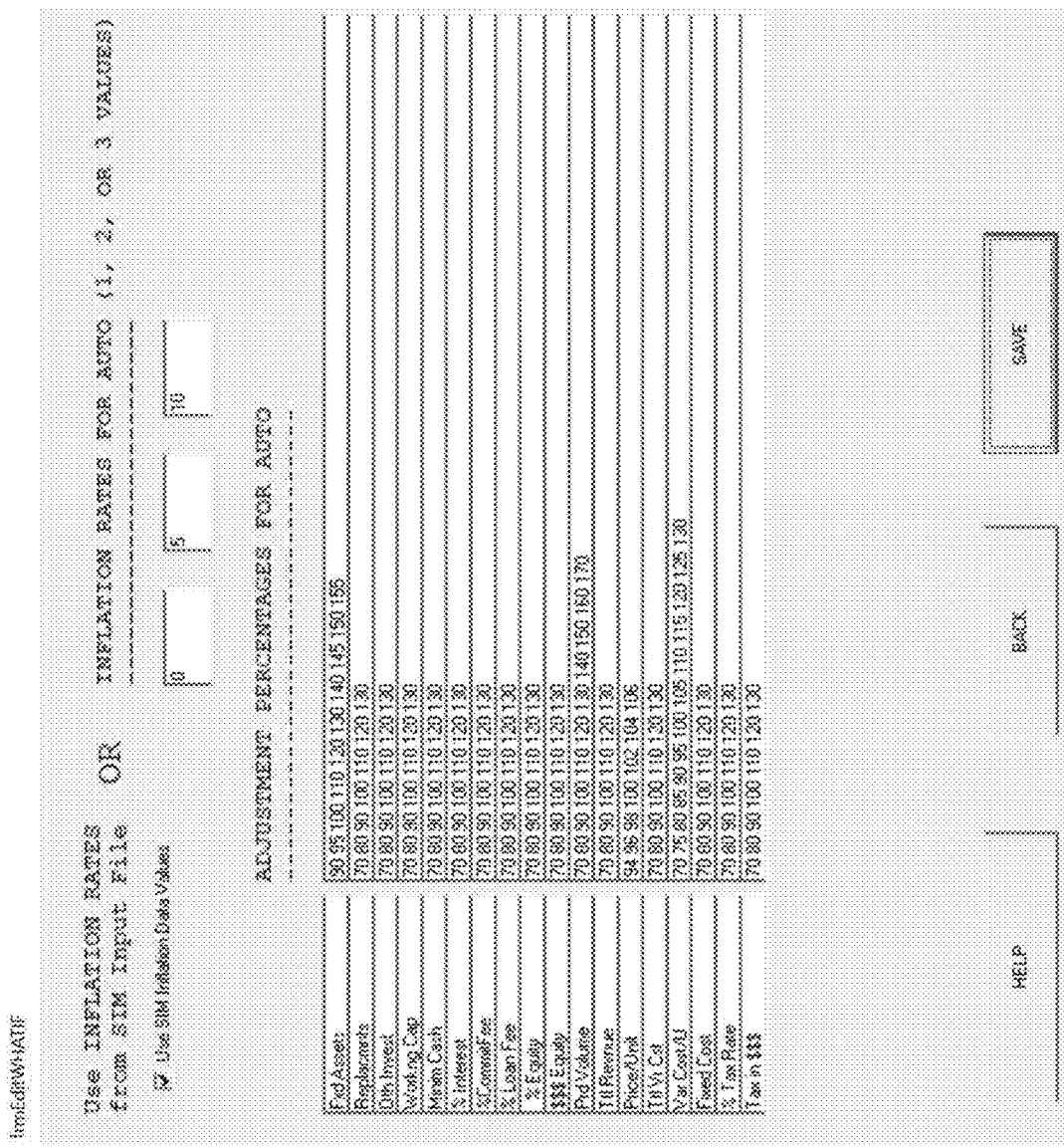
FIG. 8 illustrates the user interface displaying the contents of a tailored automate adjustments file named WHATIF.

FIGS. 5A-5B illustrate the contents of the default simulate input file named SAMPLE as seen through the EDIT user interface. Each line in the input file is a separate modifiable data item. The data items are:
  COMMENTS—seven lines of text that will appear on the reports of the SIMULATE function
  PROJECT LIFE (501)—the number of periods for the life of this project from 1 to 50
  PARAMETERS (502)—the SIMULATE program tailors its financial simulation process based on 19 parameters
  MAIN INPUT LINES—financial categories with values input for each period of the project life The project life 501 is the number of periods (in years or months) to be used for the life span of your study.

The parameters—the SIMULATE function tailors its financial simulation process based on 19 parameters, labeled parameter A thru parameter S, which are adjustable by the user. If there is a Junior Loan then the user can set the junior loan parameters 3502 independently from the senior borrowing parameters 3501.

The default SAMPLE file does not include main input lines for a junior loan. Input lines 'LOAN DRAWN' and '$$$ EQUITY' define the senior financing package. If both of these input lines are 'not blank' then the EDIT function will add input lines for junior loan parameters and junior loan data inputs to the end of the file being currently edited. The junior loan input lines are:
  Junior loan parameters
  Junior loan drawdown
  Junior loan repayment
  Junior loan % Interest
  Junior loan % commitment fee
  Junior loan % loan initiation fee All lines after the parameter line are MAIN INPUT LINES. The main input lines may have values or may be blank 503. If the user puts values on a main input line 504 then the SIMULATE function will use the values. If the user leaves one or more of the main input lines blank, then the SIMULATE function will calculate the value of that data item when necessary. When values are provided for a main input line there must be values for all periods of the study. Repeating values are not shown in order to reduce information overload and to make the project easier to visualize and comprehend. The format of the input line is Period, Value Period, Value Period, Value . . . etc., starting with Period 1 and its value. Any period not shown contains the value of the prior shown period.

For example 504: Production Volume 1,0 3, 50 defines that production volume starting in period 1 has a value of 0, then the value changes in period 3 to 50 through the remainder of the life of the study.

The name of the file being edited appears in the FILENAME box 505. The user can save changes to the current file by pressing the SAVE button. The user can save the file in a different filename by changing the name in the FILENAME box and then pressing the SAVE button.

FIGS. 6A-6B illustrates the contents of a tailored base case file named PROJECT1 as seen through the EDIT user interface.

The WHATIF SYSTEM provides an editable spreadsheet file called SAMPLE.XLS to assist the user in creating a one-page multi-Y axis graph from spreadsheet input.

The WHATIF SYSTEM provides an editable file called SAMPLE to help the user to create a financial Base Case for a new Project.

The WHATIF SYSTEM provides also an editable file called "WHATIF" where a selection of most probable financial metrics can be modified in percentages up or down from the 100% base case values, to reflect What If possibilities.

For each of the percentages in the WHATIF file, the AUTOMATE function will run the SIMULATE function to calculate the following profitability measures:
  1. The PAYBACK period
  2. The Internal Rate of Return on Investment before taxes (IRROI BT)
  3. The Internal Rate of Return on Investment after taxes (IRROI AT)
  4. The Internal Rate of Return on Equity after taxes (IRROE AT)
  5. The MINIMUM EQUITY
  6. The MINIMUM LOAN
  7. and the MINIMUM PERIODS NEEDED TO REPAY DEBT The GRAPH function will produce a one-page multi-Y axis GRAPH.

Figure 13:
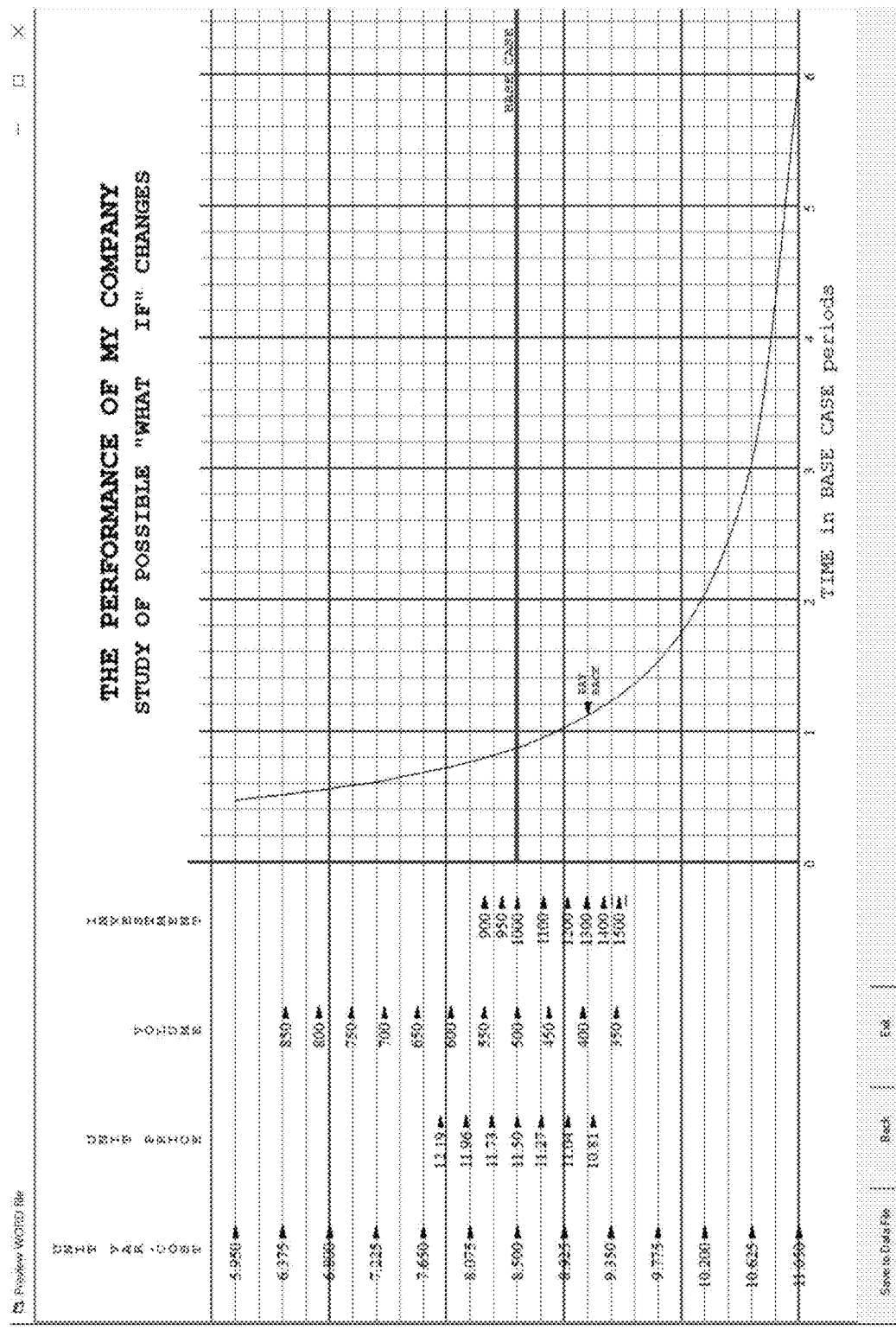
FIG. 13 illustrates the user interface displaying a graph produced by the graph module.
Figure 14:
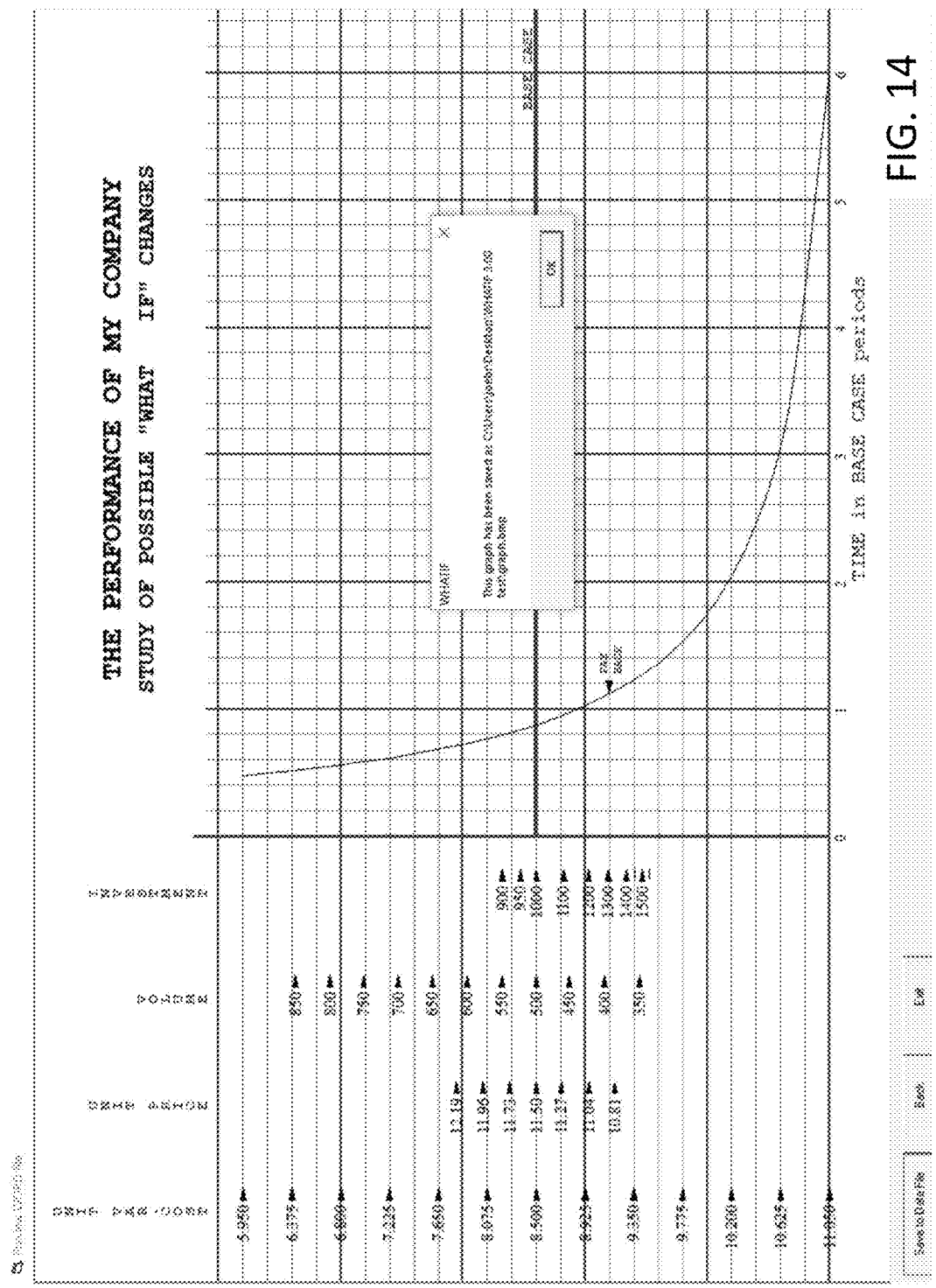
FIG. 14 illustrates the user interface to save a graph on the WHATIF SYSTEM data disk.

The Base Case profitability measures are placed on the graph on a single horizontal line identified as BASE CASE (FIG. 13).

Each sensitivity report must contain a base case row of profitability measures. If the sensitivity report does not contain a base case row then that sensitivity report is not graphable. The base case row in the sensitivity report is where the AUTOMATE function ran the SIMULATE function at a percentage of 100 percent of the financial metric. All sensitivity reports run from the same project file will have the exact same values for the seven base case profitability measures FIGS. 20-23 (2030, 2130, 2230, and 2330). The base case row in all sensitivity reports will differ only in the column one value which represents the 100 percent row of the financial metric of the report.

On the Y axis side of the graph, each of the selected percentages defined in the "WHATIF" file, up or down from the 100% Base Case values, are marked with an arrow and a numeric label. If the next arrow to be drawn on the Y axis is too close to the prior drawn arrow or tick mark then the next arrow is instead plotted as a tick mark without a numeric label as shown on FIG. 15 for the INVESTMENT values of 1450 and 1550.

On the X axis side of the Graph a curve will be drawn for each of the selected profitability measures. Text labels will be placed on each curve (FIG. 34) in a position to minimize overlap on other text labels and overlap on other curves. Shorter text labels are automatically used when necessary to reduce overlaps.

The results of changes from the Base case assumptions can be counted in horizontal graph grid lines, up or down from the Base Case line. Their algebraic total will cross the curves, from where one can read the results, in percentages or in time, on the X axis below.

The SIMULATE function can generate the following financial reports:
1. An INPUT DATA REPORT (FIG. 35A)
2. A FINANCIAL SYNOPSIS REPORT (FIG. 35B)
3. A FUNDS FLOW REPORT (FIG. 35C)
4. AN INCOME REPORT (FIG. 35D)
5. A BALANCE SHEET REPORT (FIG. 35E)
6. A DETAIL REPORT (FIG. 35F)
7. And when needed A SENIOR/JUNIOR FINANCING DATA REPORT (FIG. 36)

The GRAPH function allows the user to override the following default plotting values (FIG. 12):
1. Max X-axis scale value
2. Optional Y-axis tick marks
3. Customer name
4. Graph title
5. Curve line colors
6. Letter or legal size graph The user can display the graph on the display monitor either in a SCREEN optimized output format or in a Microsoft WORD optimized output format.

The present invention provides a method in which an X-Y graph of one financial metric is augmented by adding an additional Y-axis to the graph for each additional financial metric under investigation. The invention further provides a common grid on the X-Y graph. The common grid is automatically scaled for all of the combined X and Y axis data items.

All Y-axis financial metric values from the base case simulation are placed on the graph on one horizontal line identified on the graph as BASE CASE. All Y-axis financial metric values that were simulated above or below the base case values are drawn above or below the base case line on the graph. Changes in financial metric values may be arithmetically added and subtracted by counting the graph grid lines above or below the base case line. The total outcome of multiple changes in the Y-axis data items is the same as the arithmetic sum of each of the individual grid line changes above and below the base case line.

Multiple Y-axis and multiple curves can be placed on one graph (FIG. 16). When multiple curves are placed on one graph then optional tick marks 1710 may be added to the Y-axis arrows (FIG. 17). The Y-axis arrows are accurate positions on the graph for the lead curve only. If only one curve is drawn on the graph then all of the Y-axis arrows are accurate for all the profitability measures shown on the graph. If more than one curve is drawn on the graph then all of the Y-axis arrows are accurate for one curve only, the lead curve. The Y-axis arrows may be used as approximate location for curves other than the lead curve. Optional tick marks are used in order to see accurate locations for all Y-axis arrows for multiple curves. When a graph contains multiple curves, these curves are drawn on the graph based on only one of the Y-axis, this is the lead Y-axis and it contains the biggest spread of arrows vertically on the graph page.

The color of each profitability measure curve can be changed by the user. Optional tick marks are drawn in each Y-axis in the same color as the profitability measure curve is drawn. As shown in FIG. 17, all values for the PAYBACK profitability measure are read by using the arrows and all values for the LOAN TERM are read by using the tick marks. The tick marks in FIG. 17 are so close to the arrows for three of the Y-axis that the arrows may be used for those financial metrics. The tick marks in FIG. 17 would be used mainly for adding and subtracting changes (counting of grid lines) to the INVESTMENT financial metric.

These features of the present invention described above, as well as additional features, will be readily apparent to those skilled in the art upon reference to the following description and the accompanying drawings.

Figure 31:
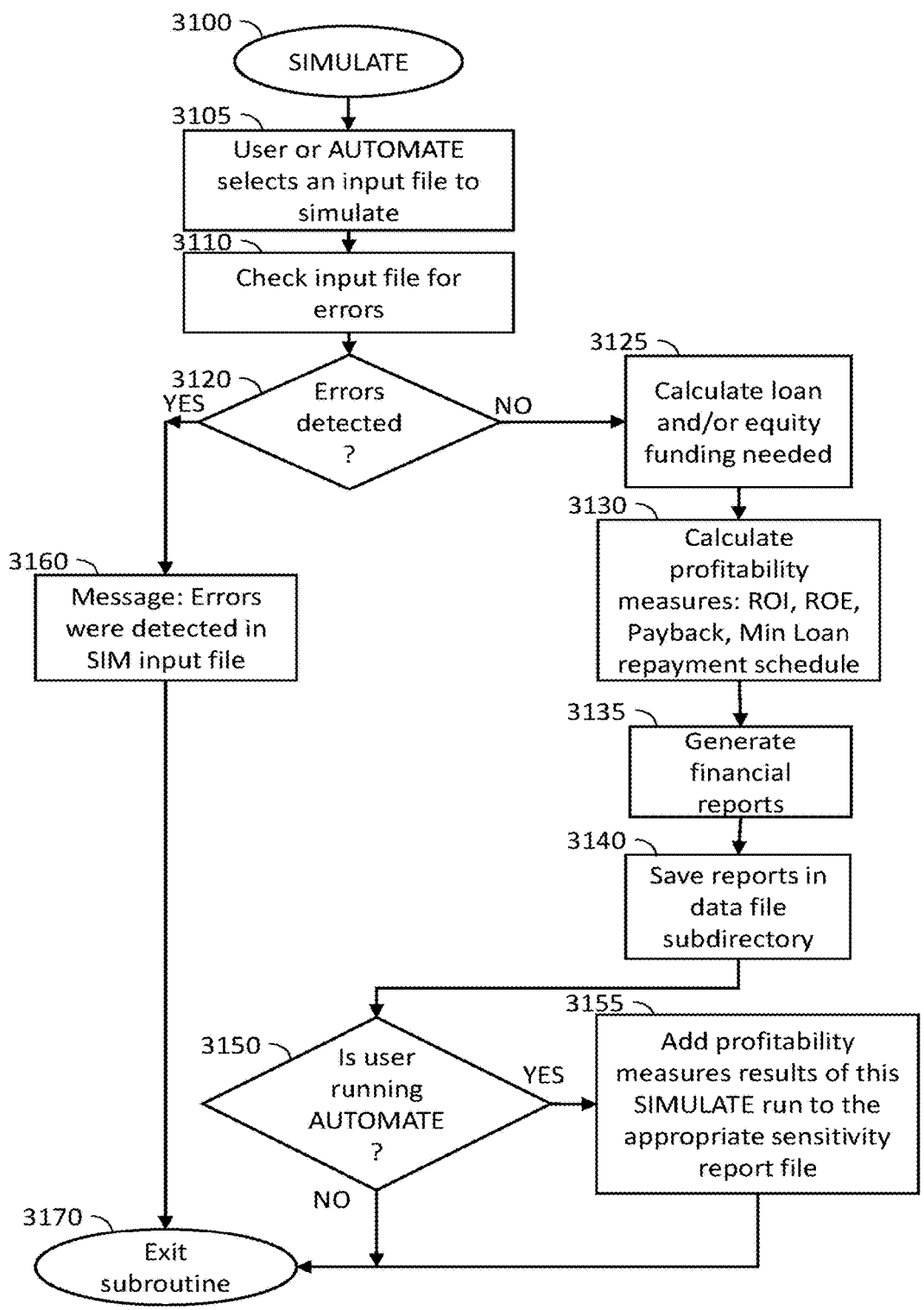
FIG. 31 is a logic flowchart illustrating a software routine for SIMULATING a project file.
Figure 32:
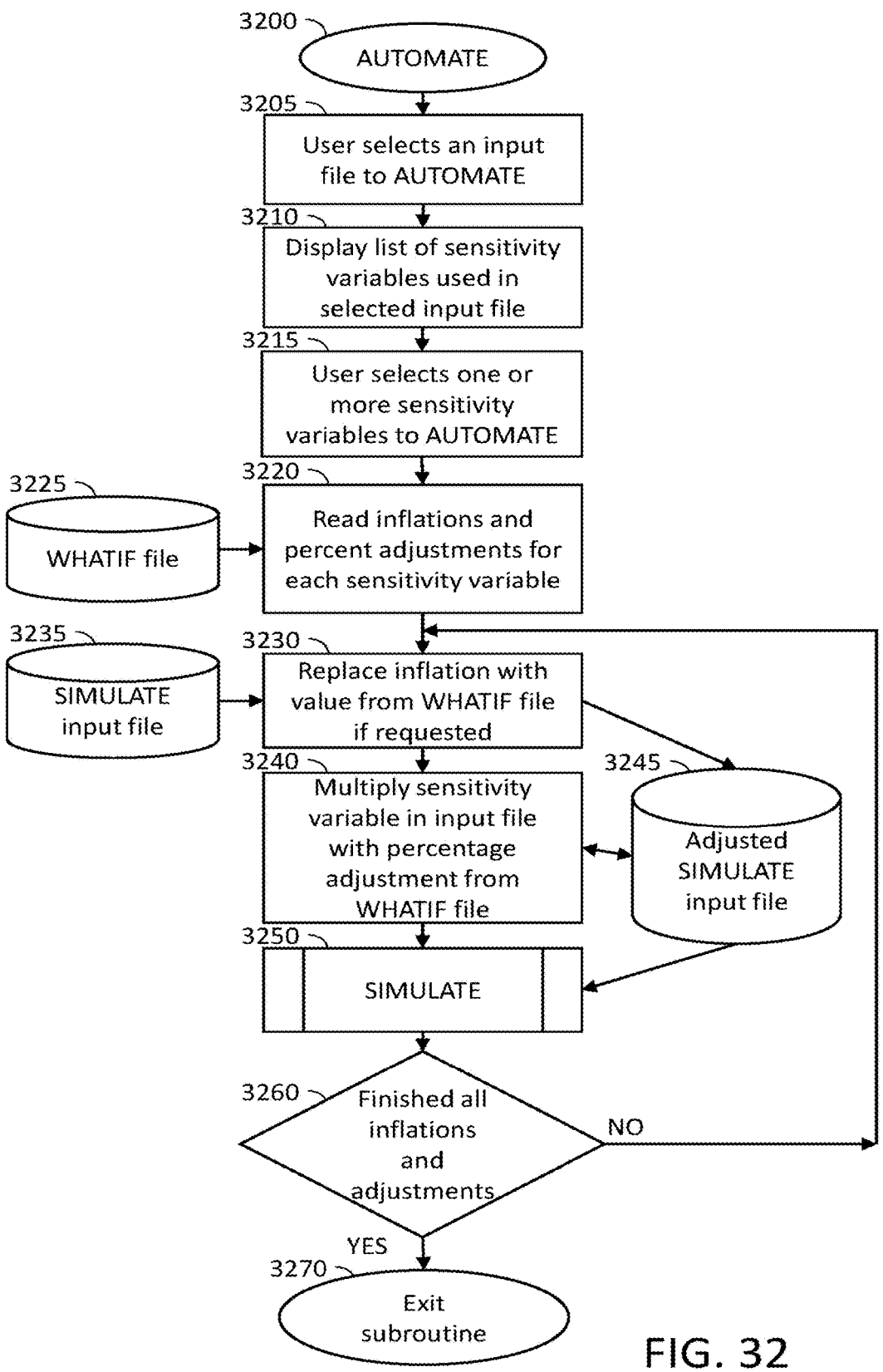
FIG. 32 is a logic flowchart illustrating a software routine that will automatically apply adjustments to a base case project file.
Figure 33A:
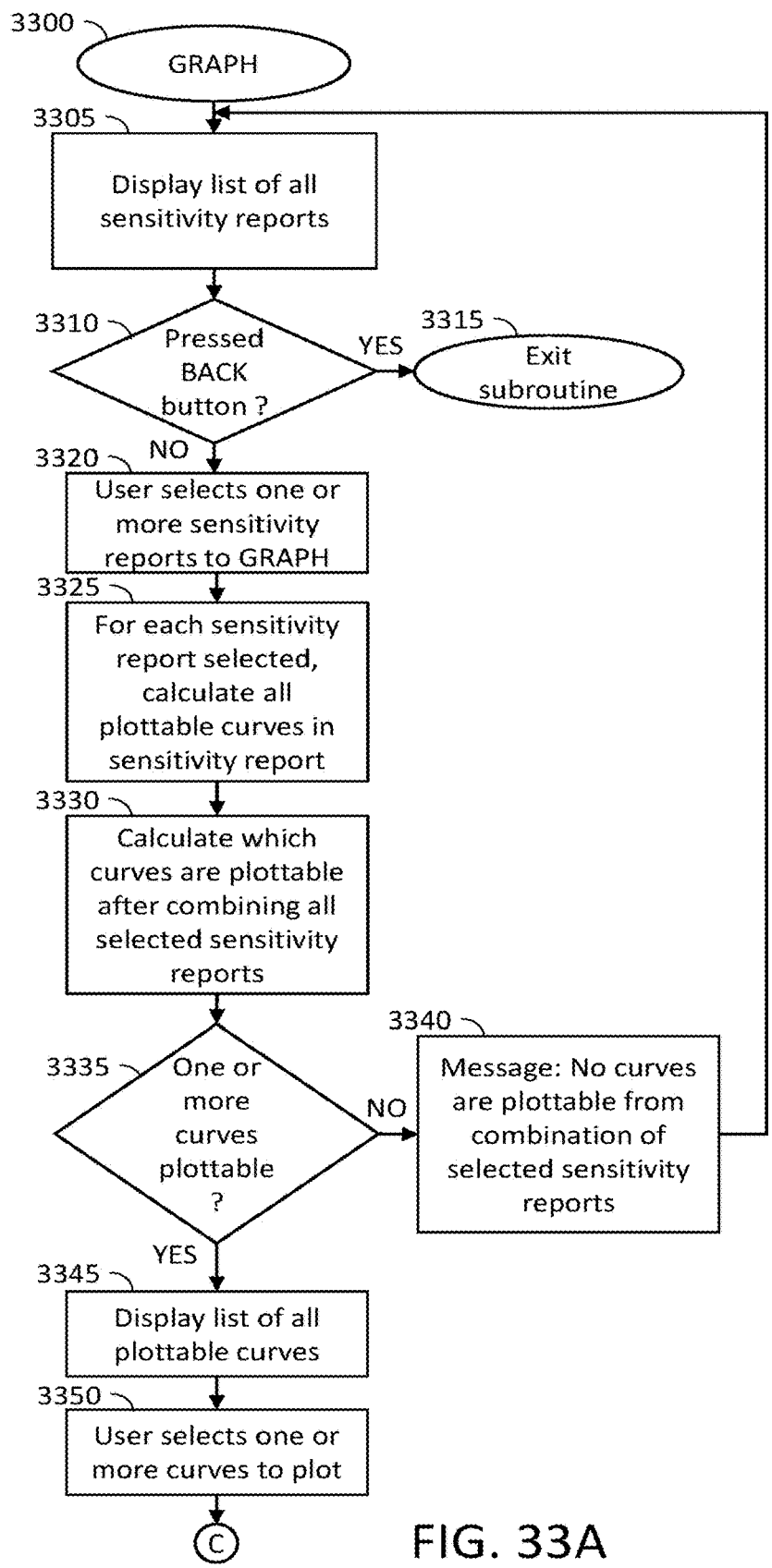
Figure 33B:
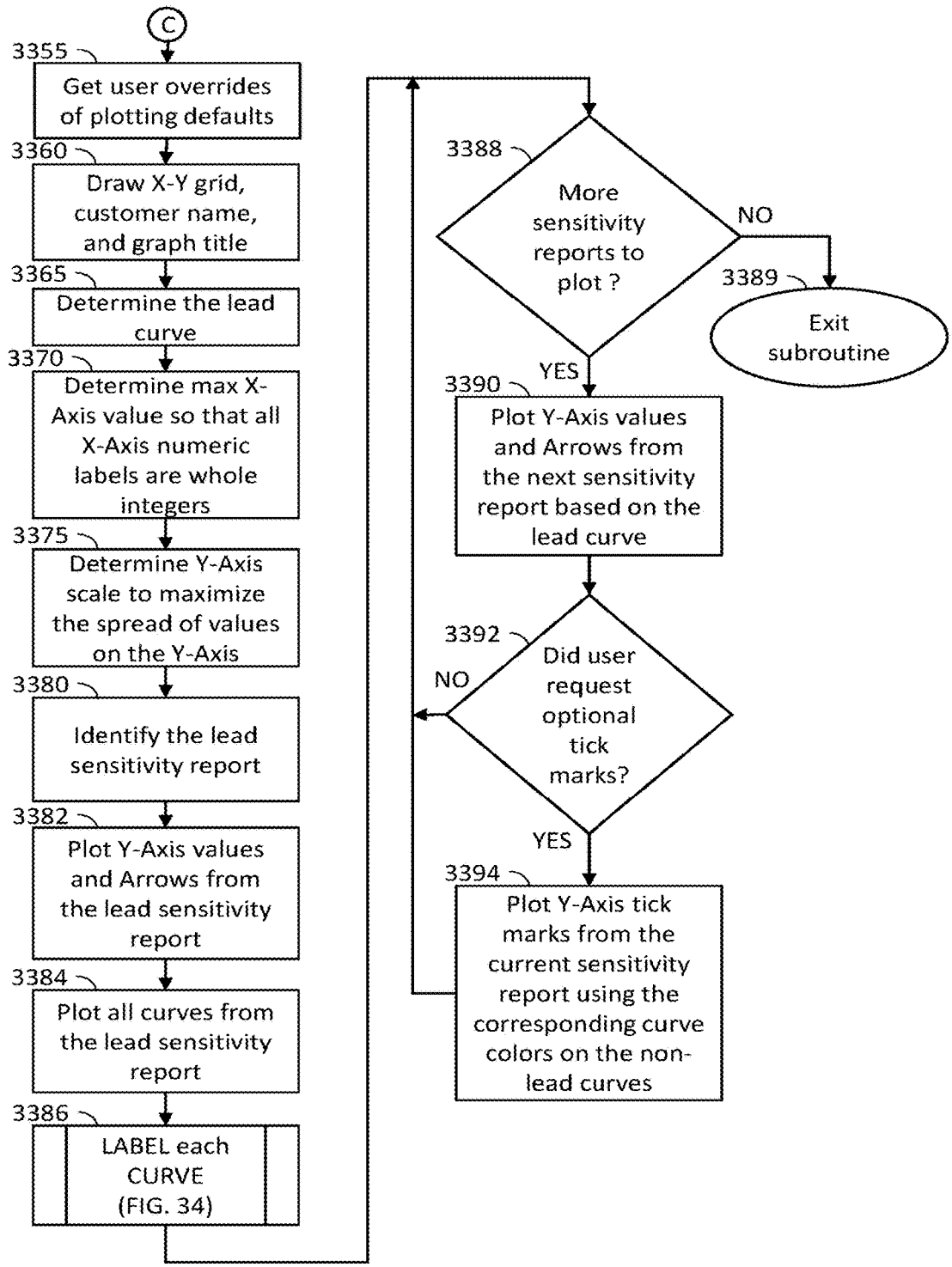
Figure 34:
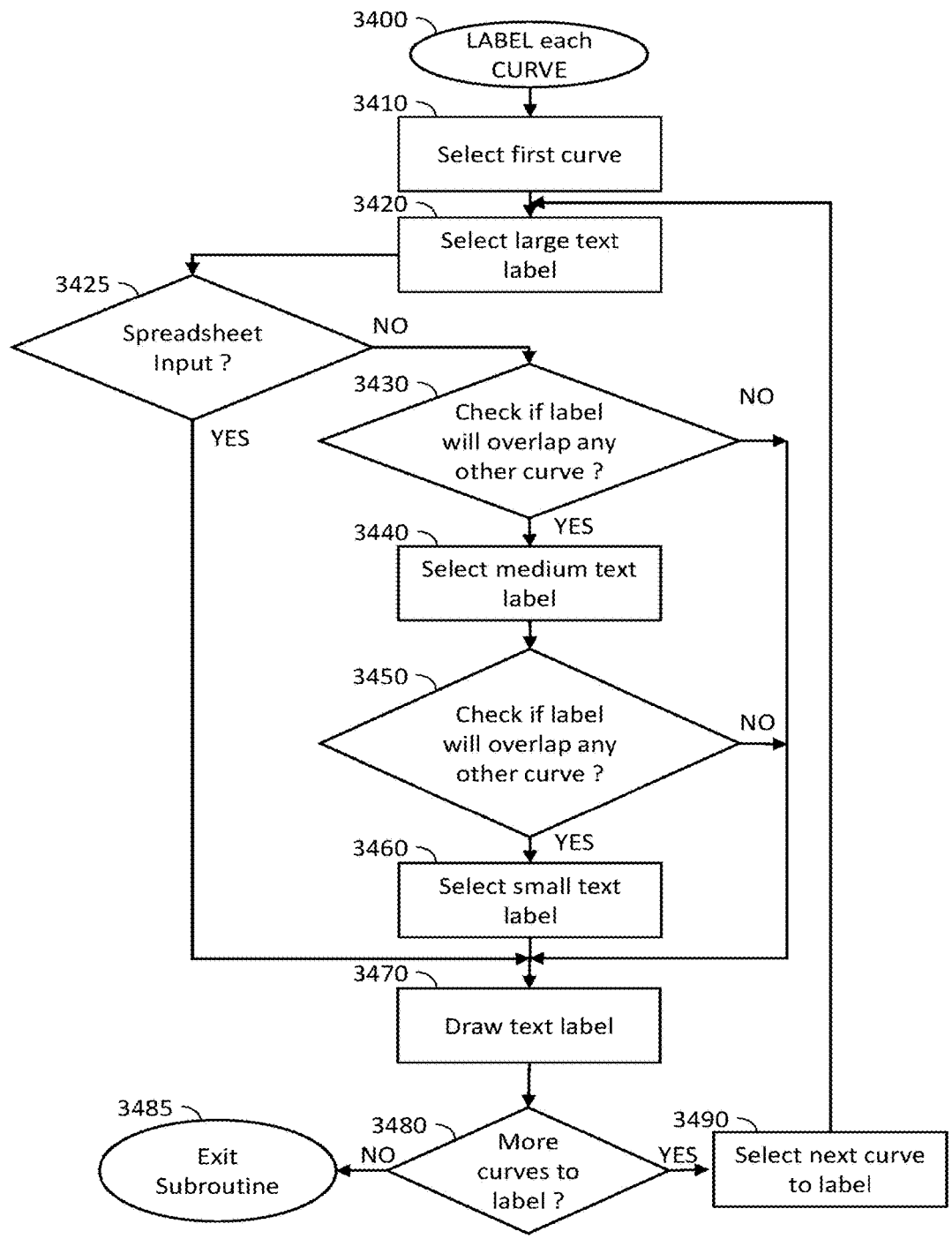
FIG. 34 is a logic flowchart illustrating a software routine for labeling each curve in the graph module.
Figure 38:
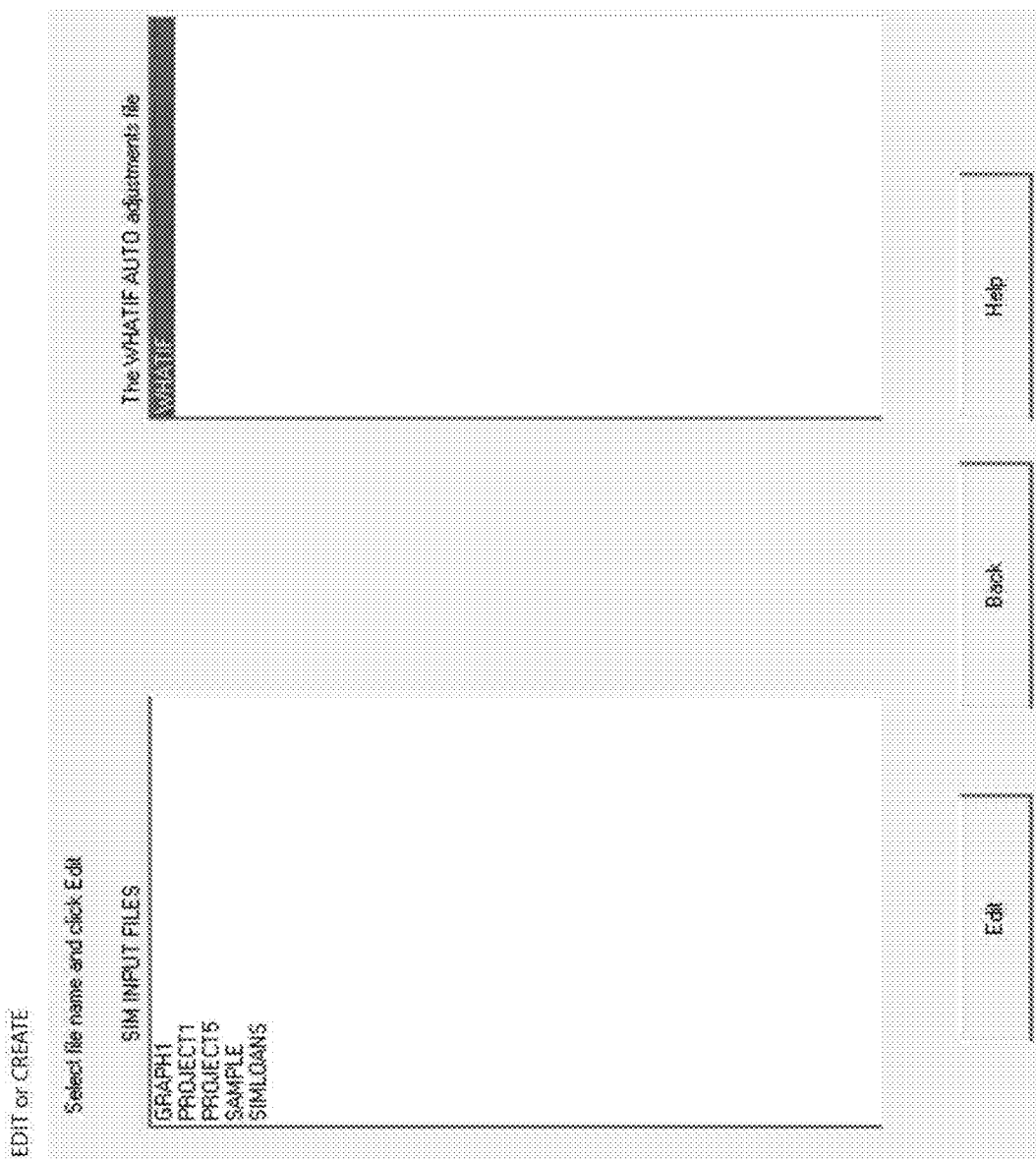
FIG. 38 illustrates the user interface listing available files for input to the EDIT function.

A typical WHATIF SYSTEM session is a single sequence of the following seven steps:
1. Use the EDIT function (FIG. 27) to
   a. Open the SAMPLE (FIGS. SA-5B) example project data file
   b. Tailor the contents of SAMPLE to match the most likely attributes, the base case, of your project
   c. Save this base case file with a new name such as PROJECT1 (FIGS. 6A-6B)
2. Use the SIMULATE function 302 (FIG. 31) to: input PROJECT1 and output financial profitability measures by
   a. Input the data from file PROJECT1
   b. Output a file, PROJECT1.SIM of financial reports which shows the profitability measures (FIG. 7) of the project
3. Use the VIEW function (FIG. 28) to open the PROJECT1.SIM file and see the profitability measures of the project along with the associated financial statements: FINANCIAL SYNOPSIS REPORT (FIG. 7), FUNDS FLOW REPORT, INCOME REPORT, BALANCE SHEET, DETAIL REPORT, and SENIOR/JUNIOR FINANCING DATA REPORT if generated
4. Use the EDIT function (FIG. 27) to open the WHATIF data file (FIG. 4). Or skip this step to use the default WHATIF data file provided by the WHATIF SYSTEM. The WHATIF data file defines the percentage changes to be applied to the base case file, in this example, PROJECT1, when the base case file is processed through the AUTOMATE function (FIG. 32). The WHATIF data file (FIG. 4) identifies 18 different financial metrics, sensitivity variables, which may impact the viability or the profitability of your project. In the PROJECT1 example we will use the following sensitivity variables with the listed percent adjustments:
   a. Unit variable cost 70 75 80 85 90 95 100 105 110 115 120 125 130
   b. Unit price 94 96 98 100 102 104 106
   c. Volume 70 80 90 100 110 120 130 140 150 160 170
   d. Investment 90 95 100 110 120 130 140 145 150 155
      Save the tailored WHATIF file (FIG. 8)
5. Use the AUTOMATE function 305 (FIG. 32) to simulate the PROJECT1 base case project with 1 or more of the 18 sensitivity variables. Example: run AUTOMATE with input file PROJECT1, and choose to study the sensitivity variables (FIG. 9):
   a. Unit variable cost
   b. Unit price
   c. Volume and
   d. Investment
   The AUTOMATE function will create 1 sensitivity output file for each sensitivity variable (financial metric) chosen. The AUTOMATE function is one application for creation and manipulation of graphable data sets

|    | Financial metric    | Sensitivity output file name |
| -- | ------------------- | ---------------------------- |
| i. | Unit variable cost  | SVCOSTPU (FIG. 20)           |
| ii.| Unit price          | SPRICEPU (FIG. 21)           |
| iii.| Volume             | SPRDVLME (FIG. 22)           |
| iv.| Investment          | SFXDASST (FIG. 23)           |

Figure 10:
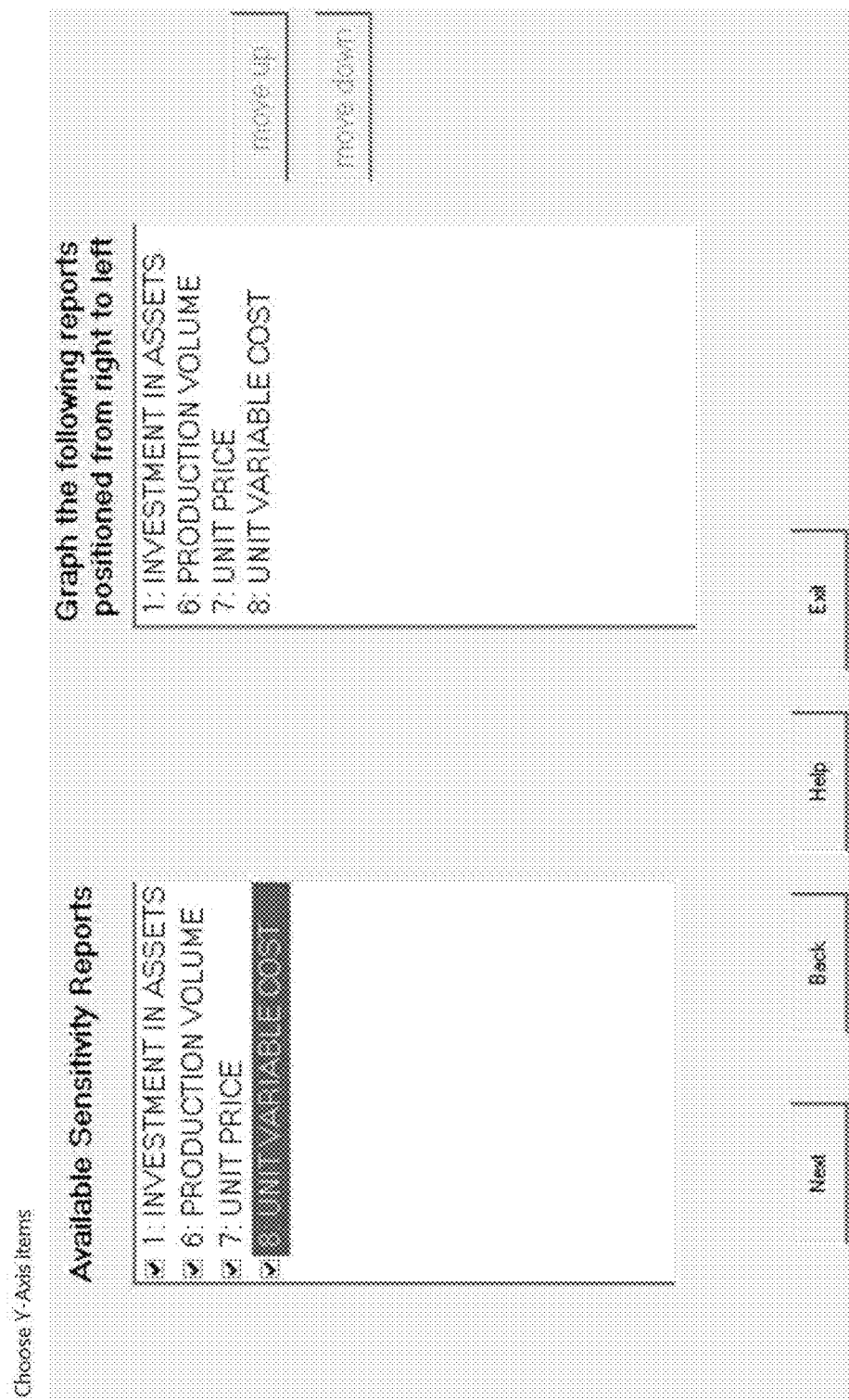
FIG. 10 illustrates the user interface to choose sensitivity reports to be run through the graph function.
Figure 11:
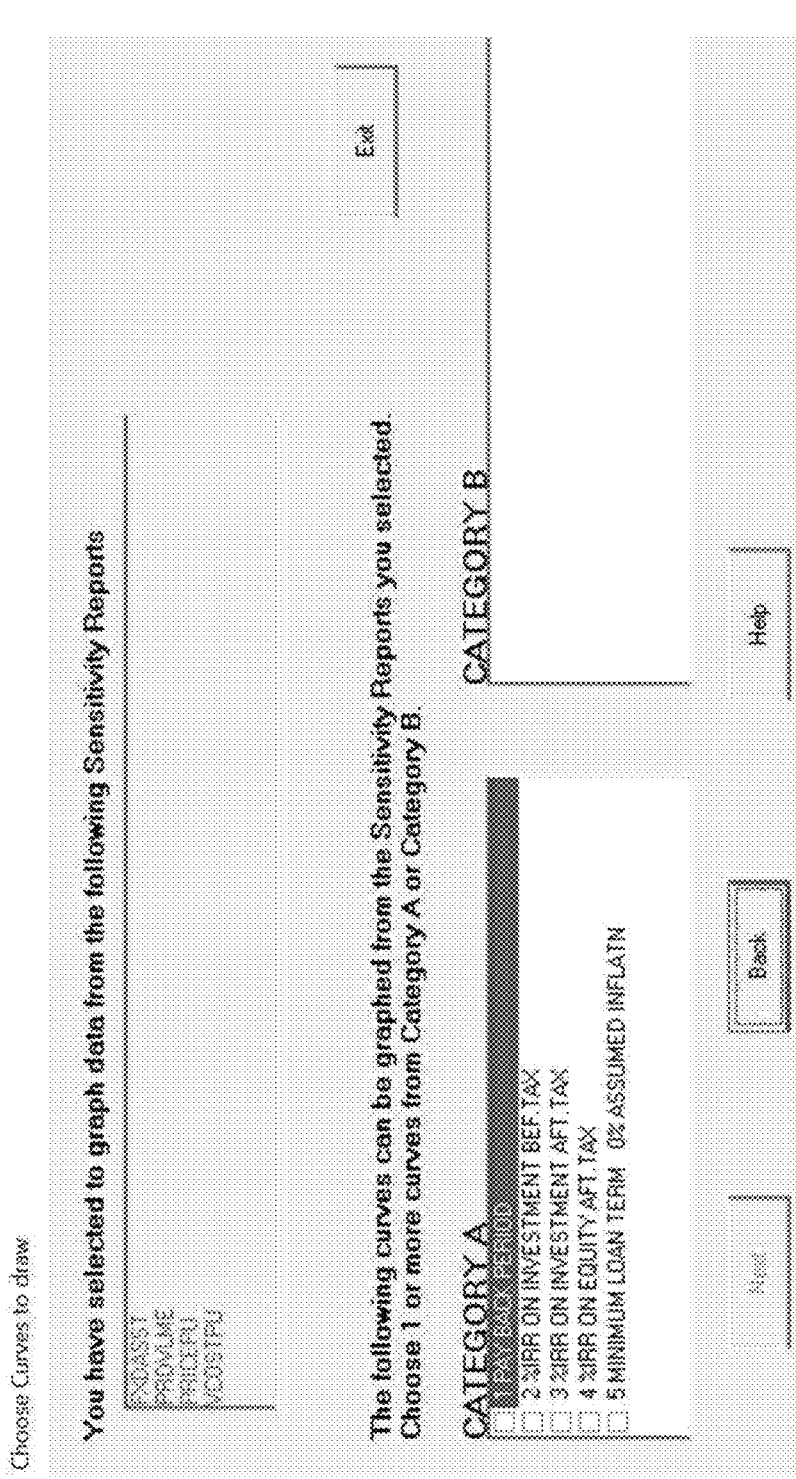
FIG. 11 illustrates the user interface to choose to draw the payback curve using the graph function.
Figure 12:
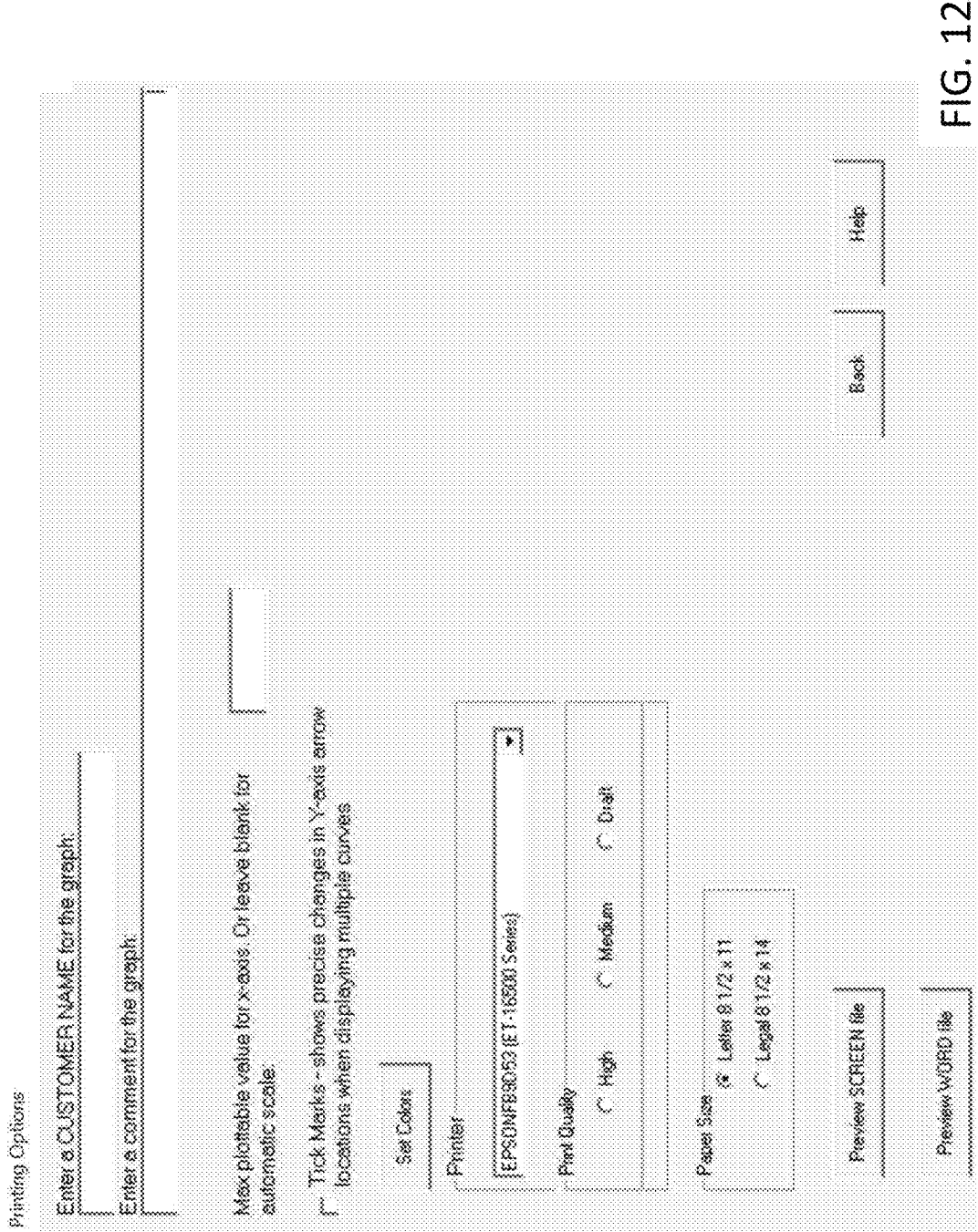
FIG. 12 illustrates the user interface to choose graph formatting and customizing options.

6. Use the GRAPH function 306 (FIGS. 33A-33B) to plot a one-page multi-Y axis graph (FIG. 13) of multiple financial metrics and profitability measures calculated by the AUTOMATE function. Example: run GRAPH with the sensitivity input files for: unit variable cost, unit price, volume, and investment (FIG. 10). Choose to include on the graph the profitability measure PAYBACK (FIG. 11). The GRAPH function will output, on the display monitor, a one-page multi-Y axis graph (FIG. 13). One curve will be drawn for the PAYBACK profitability measures. One Y-axis will be generated for each sensitivity input file. This graph can be printed (FIG. 12). This graph can be saved (FIG. 14) on the WHATIF SYSTEM data disk.

7. Use the one-page multi-Y axis GRAPH to answer your "what if" questions.

The result, on the PAYBACK profitability measure, of changing a Y-axis value up or down can be read from the X-axis. The values on the Y-axis are sensitivity values. Sensitivity values are financial metrics that have been automatically simulated at multiple percentages up and down from their nominal base case values. The WHATIF file defines the percentages to apply to base case financial metrics.

The SYNOP.DAT file (FIG. 24) defines how to sort the sensitivity values into the sensitivity reports files. The SYNOP.DAT file identifies internal codes 2410 to track financial metrics throughout the WHATIF SYSTEM. The file defines RANKING 2420 to control the sorting placement of financial metrics (2010, 2110, 2210, and 2310) into their appropriate sensitivity report either ascending or descending. The file defines KEYs 2430 to control how to calculate a single numeric summary value (2010, 2110, 2210, and 2310) for each run of the SIMULATE function performed by the AUTOMATE function. The column-one titles 2440 are used from the SYNOP.DAT file to define a label over the first column of sensitivity values in each sensitivity report. The sensitivity report titles 2450 are used as titles in the sensitivity report which are inserted in the report following the text stating "SENSITIVITY RESULTS OF".

One or more profitability measures such as PAYBACK (2020, 2120, 2220, and 2320) can be used to draw curves on the X-Y graph.

The effect of a change in a Y-axis value, such as down 2 grid lines, can be offset by changing another Y-axis value up 2 grid lines, resulting to no net change in the X-axis profitability measurement.

When used with profitability measures, the graph allows the user to readily see the financial impact of one or more BASE CASE adjustments. The GRAPH function draws curves thru all the selected profitability measures. The one-page multi-Y axis graph permits the user to estimate the change in profitability measure resulting from one or more changes to the BASE CASE without needing to run further simulations. The one-page multi-Y axis graph can be used to enhance the project optimization process.

When used with spreadsheet input (FIGS. 18A-18C) the graph function can produce a one-page multi-Y axis graph with multiple Y axis and multiple curves (FIG. 19).

Figure 3:
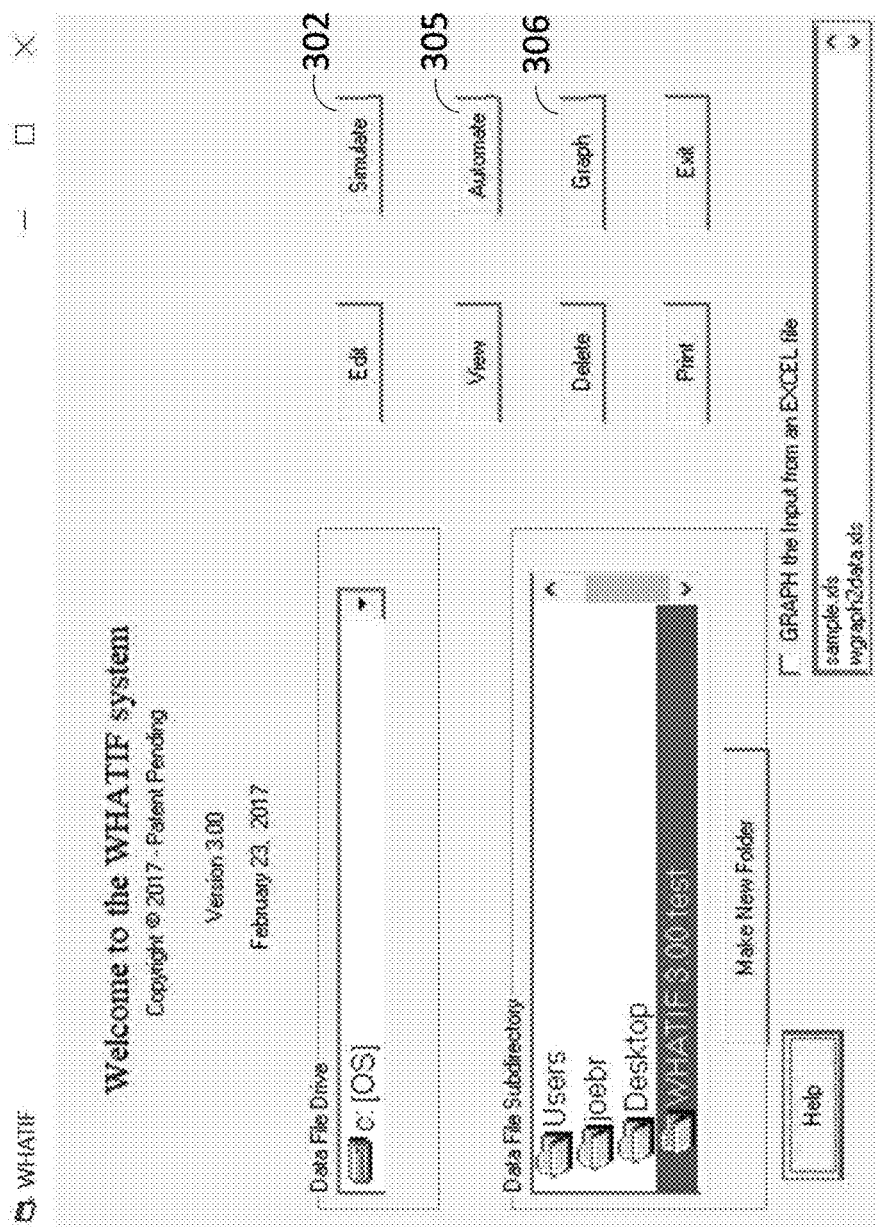
FIG. 3 illustrates the user interface of one embodiment of the WHATIF SYSTEM main menu.
Figure 25A:
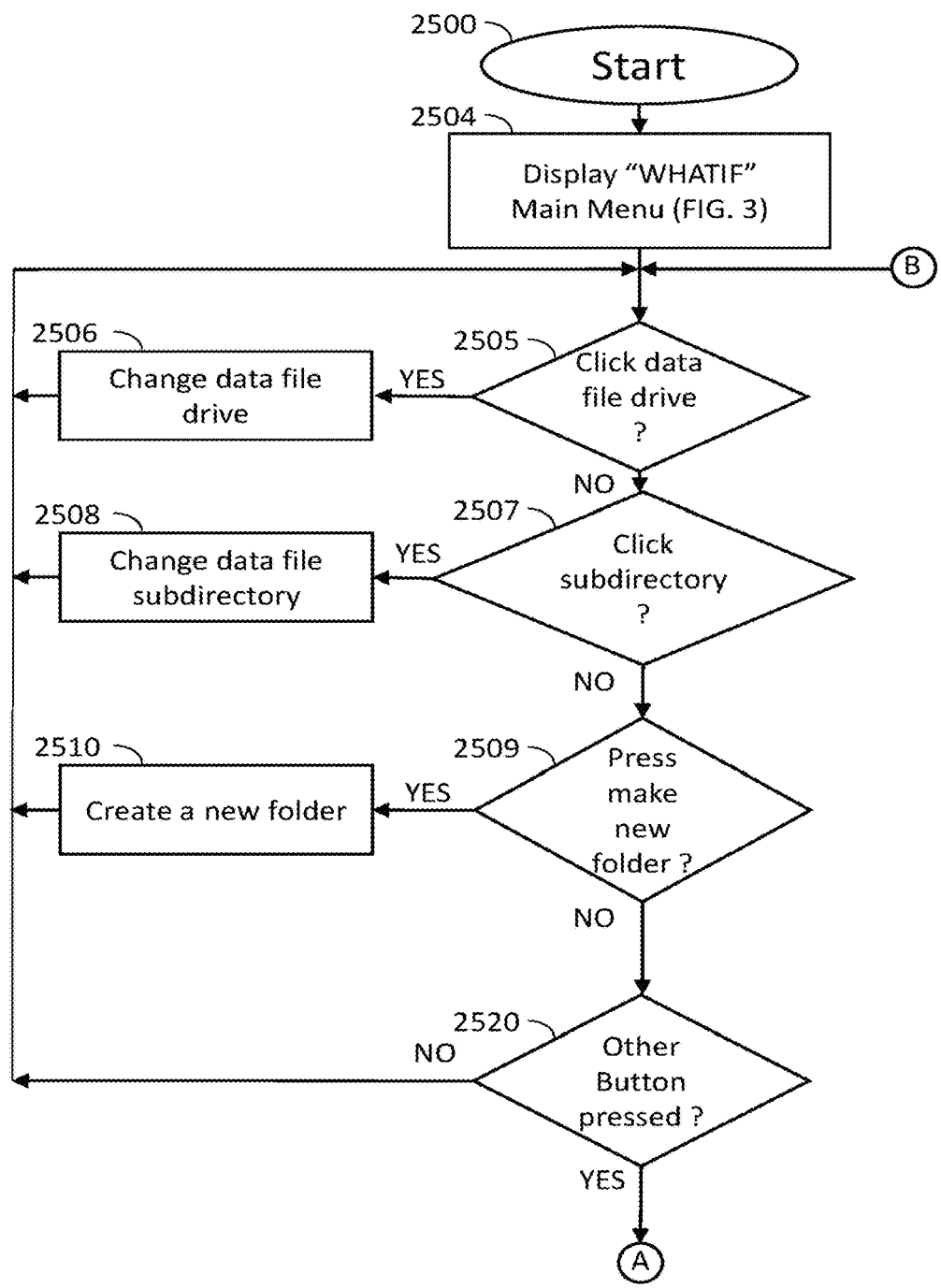
FIGS. 25A-25B is a logic flowchart illustrating a software routine for the WHATIF SYSTEM main menu.
Figure 25B:
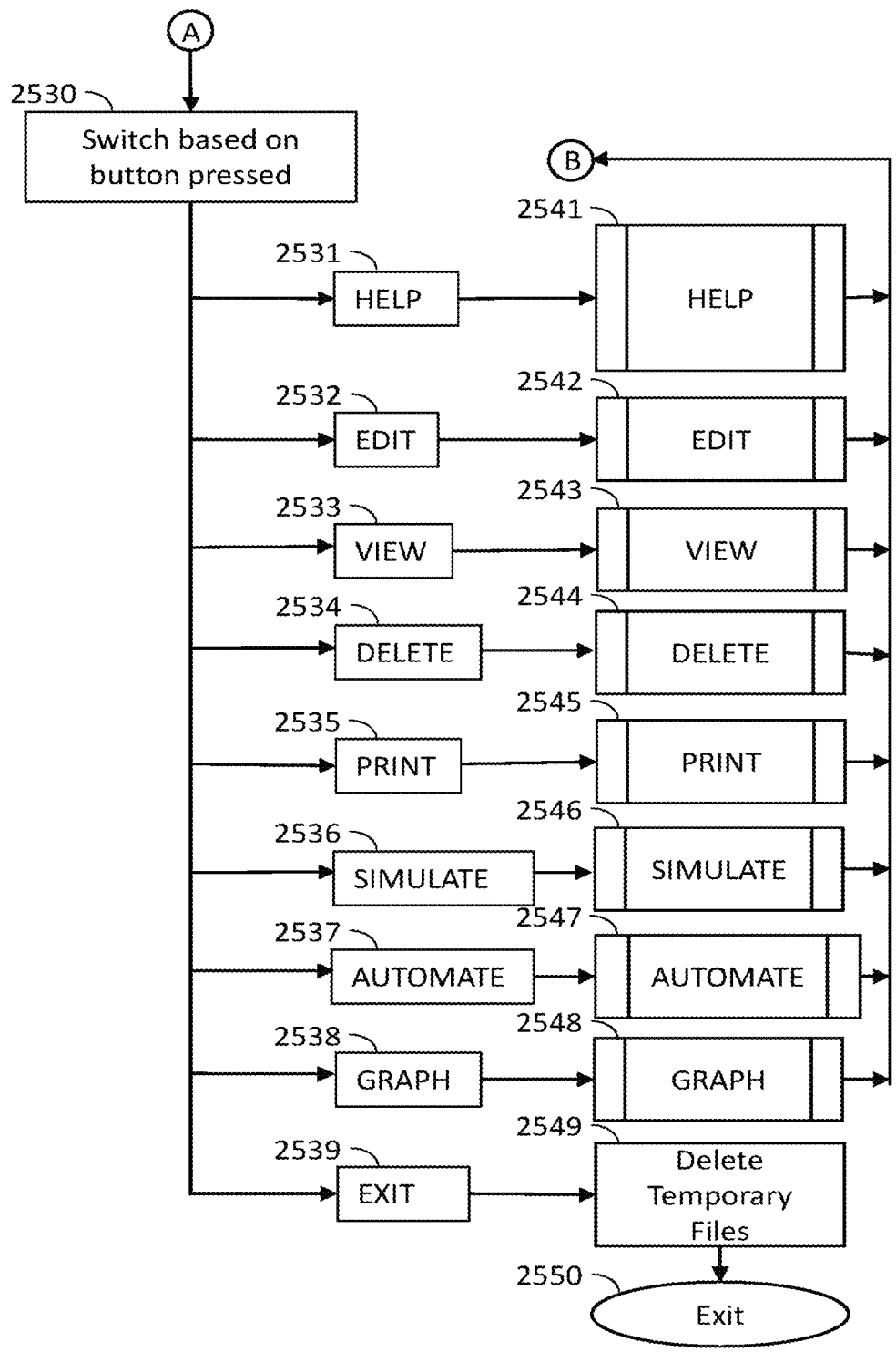
Figure 26:
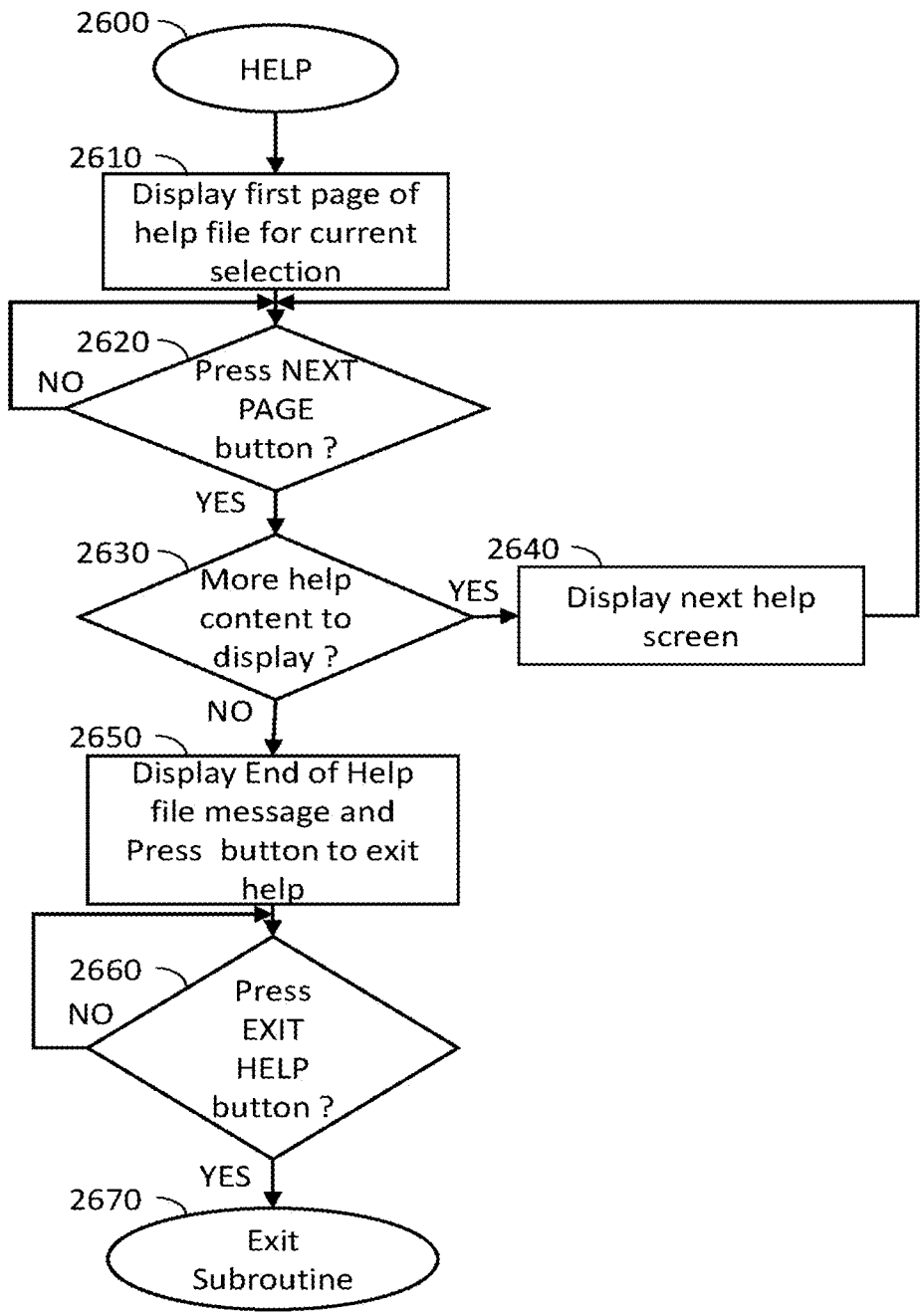
FIG. 26 is a logic flowchart illustrating a software routine for displaying context sensitive help screens.
Figure 27:
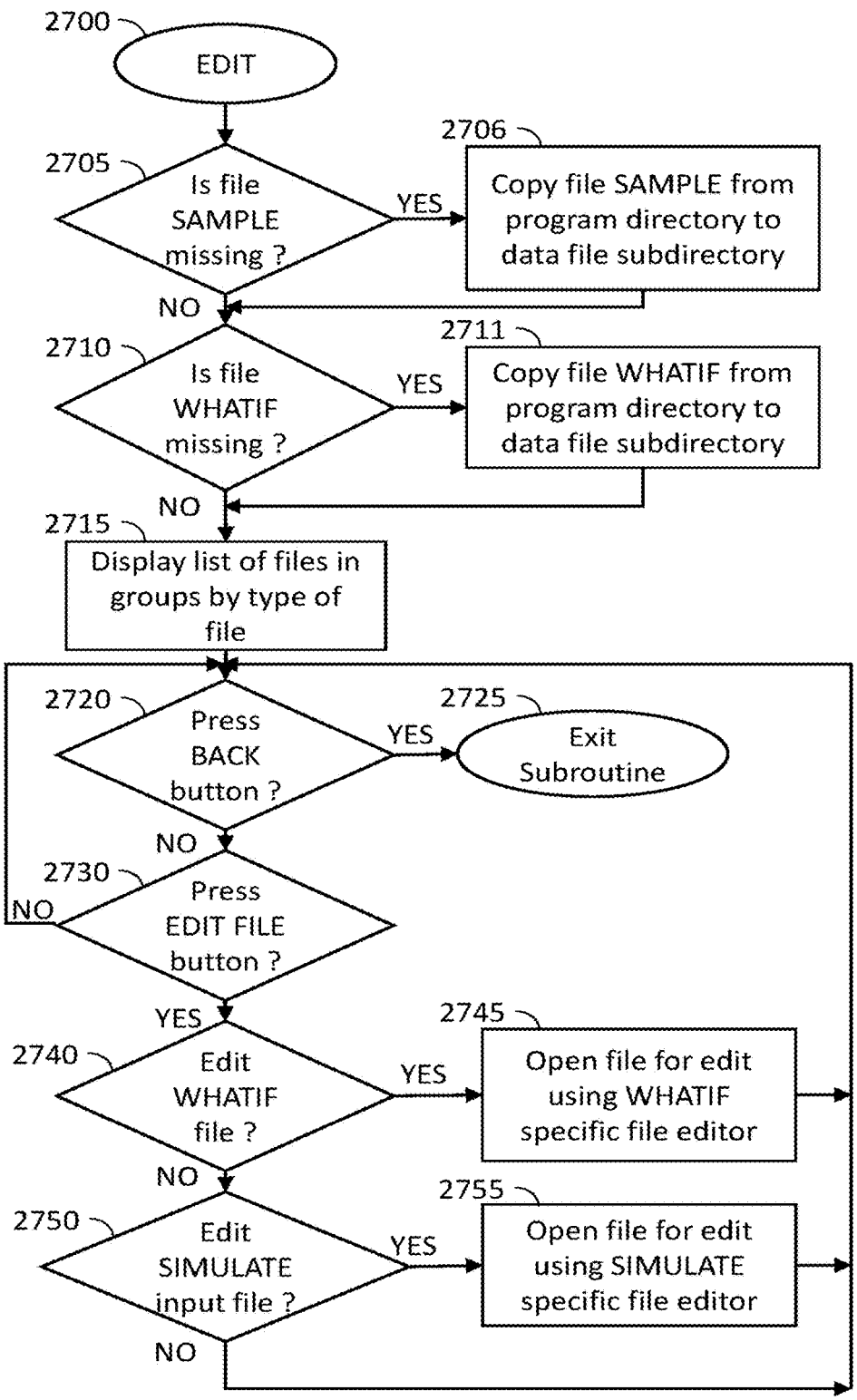
FIG. 27 is a logic flowchart illustrating a software routine for customized editing of input files.
Figure 28:
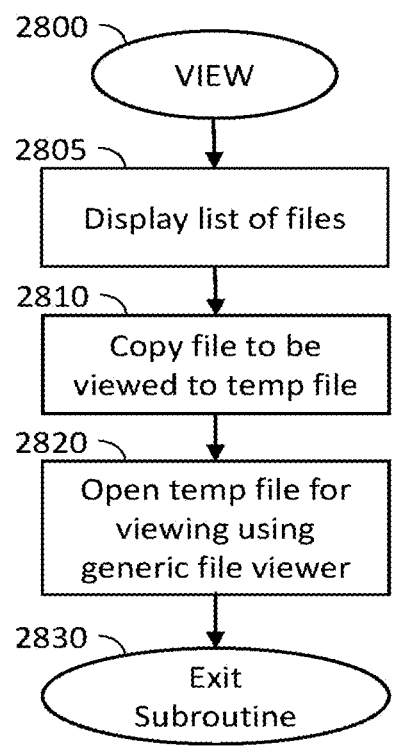
FIG. 28 is a logic flowchart illustrating a software routine for viewing data files.
Figure 29:
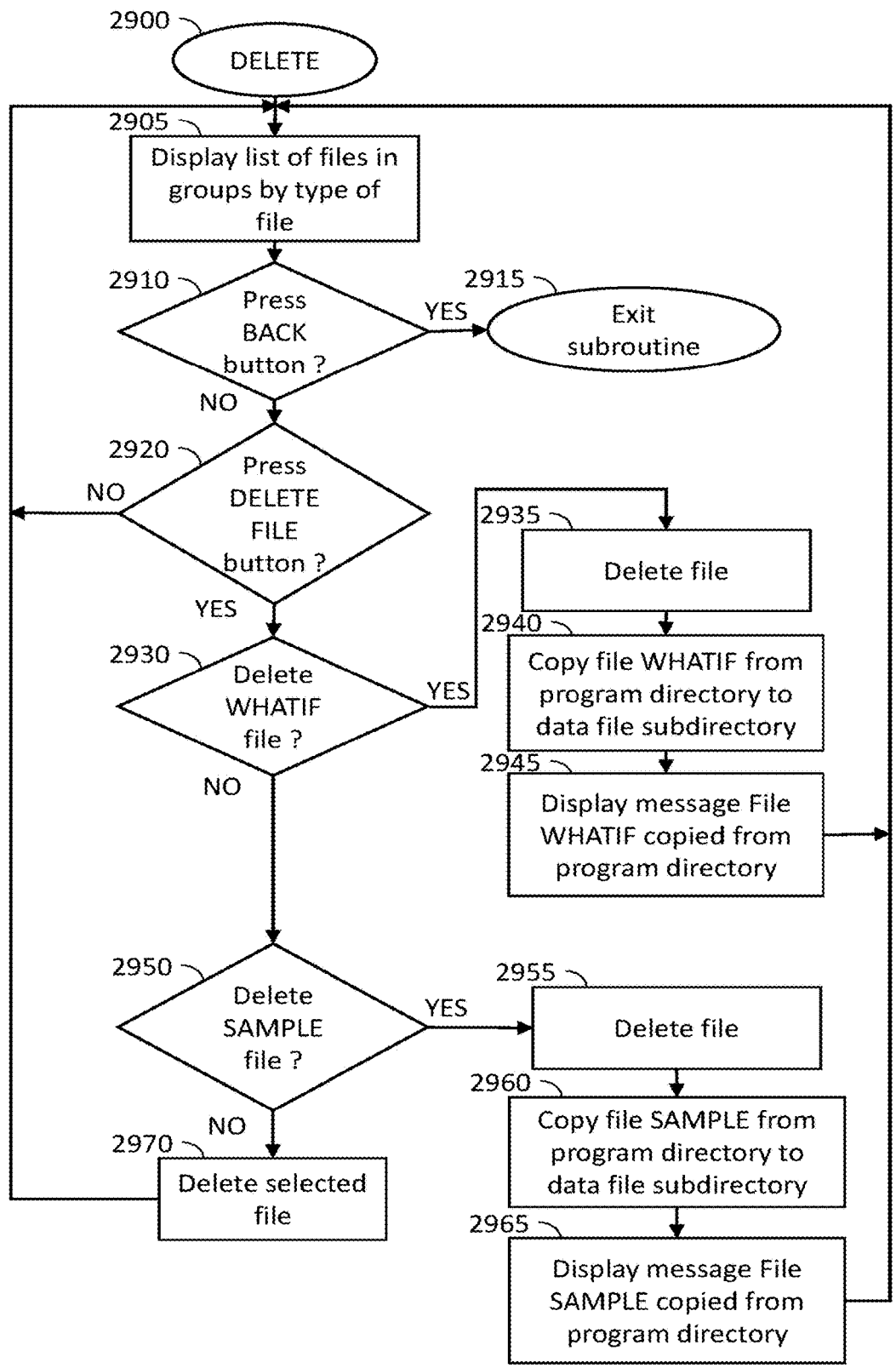
FIG. 29 is a logic flowchart illustrating a software routine for deleting data files.
Figure 30:
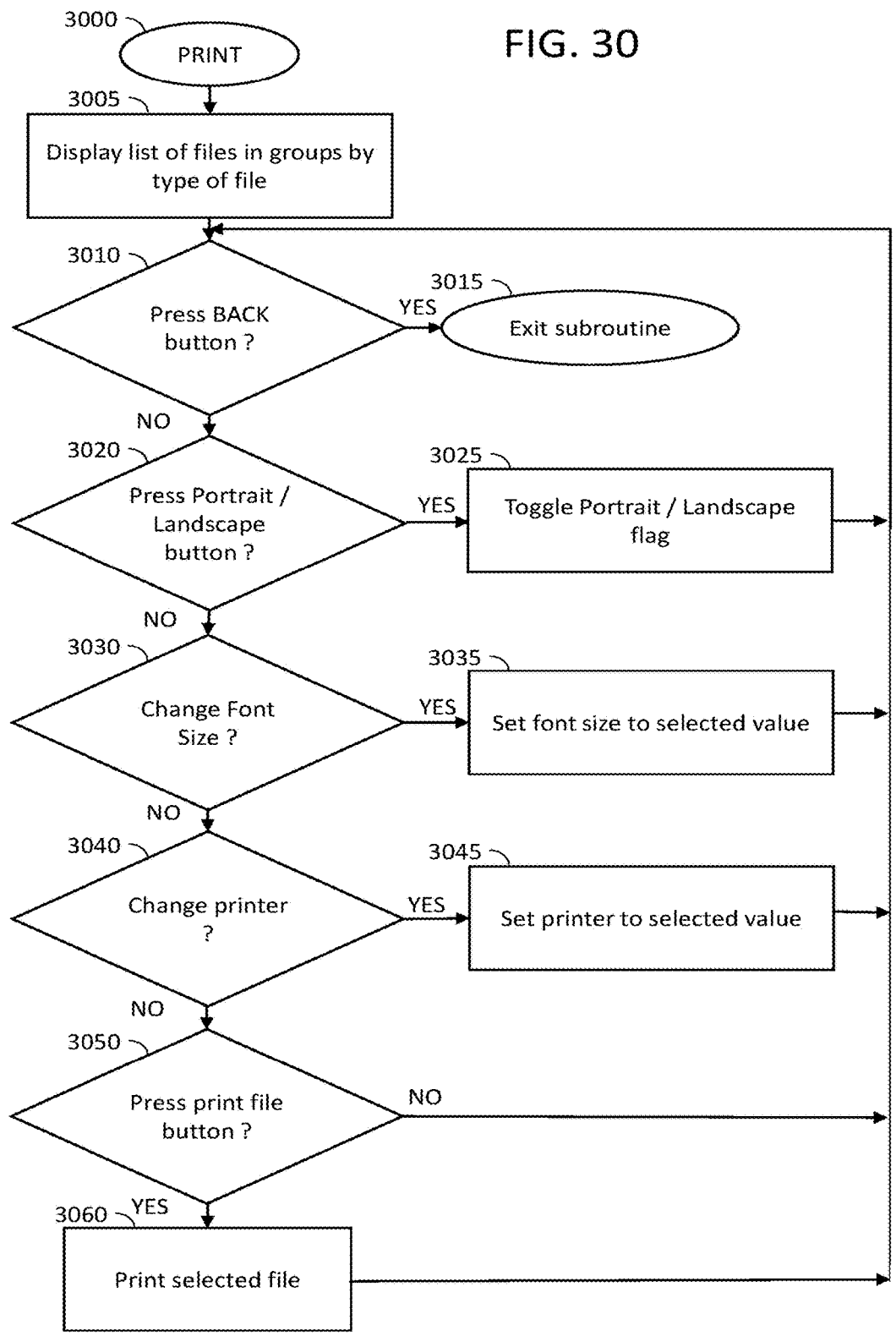
FIG. 30 is a logic flowchart illustrating a software routine for printing project related text files.

One embodiment of the WHATIF SYSTEM 200 is depicted in FIG. 2. The logic of this embodiment of the WHATIF SYSTEM begins with the WHATIF SYSTEM start block 2500 (FIG. 25A). The MAIN MENU user interface FIG. 3 is displayed by task 2504. The default data file drive is displayed on the user interface. The data file drive can be changed by clicking the data file drive 2505 and selecting any listed drive 2506. The current subdirectory can be changed by clicking the subdirectory 2507 and selecting any listed subdirectory 2508. The user can create a new folder 2510 in the current subdirectory by pressing the Make New Folder button 2509. If any other button is pressed 2520 then continue to task 2530 in FIG. 25B. When the user presses the EXIT button 2539 the system deletes all temporary files 2549 and exits the WHATIF SYSTEM 2550. Pressing another button; HELP 2531, EDIT 2532, VIEW 2533, DELETE 2534, PRINT 2535, SIMULATE 2536, AUTOMATE 2537, or GRAPH 2538 will branch to the corresponding function (2541, 2542, 2543, 2544, 2545, 2546, 2547, or 2548 respectively) and then return to the MAIN MENU. Thus the SIMULATE button 2536 constitutes a means to choose financial simulation as the method to create a graphable data set.

A HELP button appears on several pages of the WHATIF SYSTEM user interface. Pressing the HELP button will launch the HELP function (FIG. 26) and then return to the current page when the HELP screen is closed.

The logic of the HELP function 2600 starts with displaying the first page of the help file 2610 that is appropriate for the current user location within the WHATIF SYSTEM. For example, when editing the project life value in a base case file, pressing the HELP button will display context sensitive help for the project life FIG. 37. A button is displayed for NEXT PAGE. Pressing the NEXT PAGE button 2620 will check if there is more help context to display 2630. The next screen of help is displayed 2640 if a next screen is available. An END OF HELP message appears along with an EXIT HELP button when no more help pages are available 2650. When the user presses the EXIT HELP button 2660 the HELP function will close the help screen and leave the HELP function 2670.

The logic of the EDIT function 2700 (FIG. 27) starts with checking if the file SAMPLE is missing in the current data file subdirectory 2705. If file SAMPLE is missing then it is copied from the program directory to the data file subdirectory 2706. If file WHATIF is missing in the current data file subdirectory 2710 then it is copied from the program directory to the data file subdirectory 2711. Files available for editing are listed 2715 on the user interface in two columns FIG. 38. One column lists the AUTOMATE adjustments file named WHATIF and the other column lists all of the SIMULATE input file names. When the user presses the BACK button 2720 the function closes the EDIT screen and leaves the EDIT function 2725. When the user presses the EDIT button 2730 the function checks what type of file is being edited 2740. If we are editing the WHATIF file then the function opens a screen 2745 that is customized for the WHATIF file FIG. 4. All files other than the WHATIF file 2750 are edited with a screen 2755 that is customized for editing a SIMULATE input file like the one shown in FIGS. 5A-5B.

Figure 39:
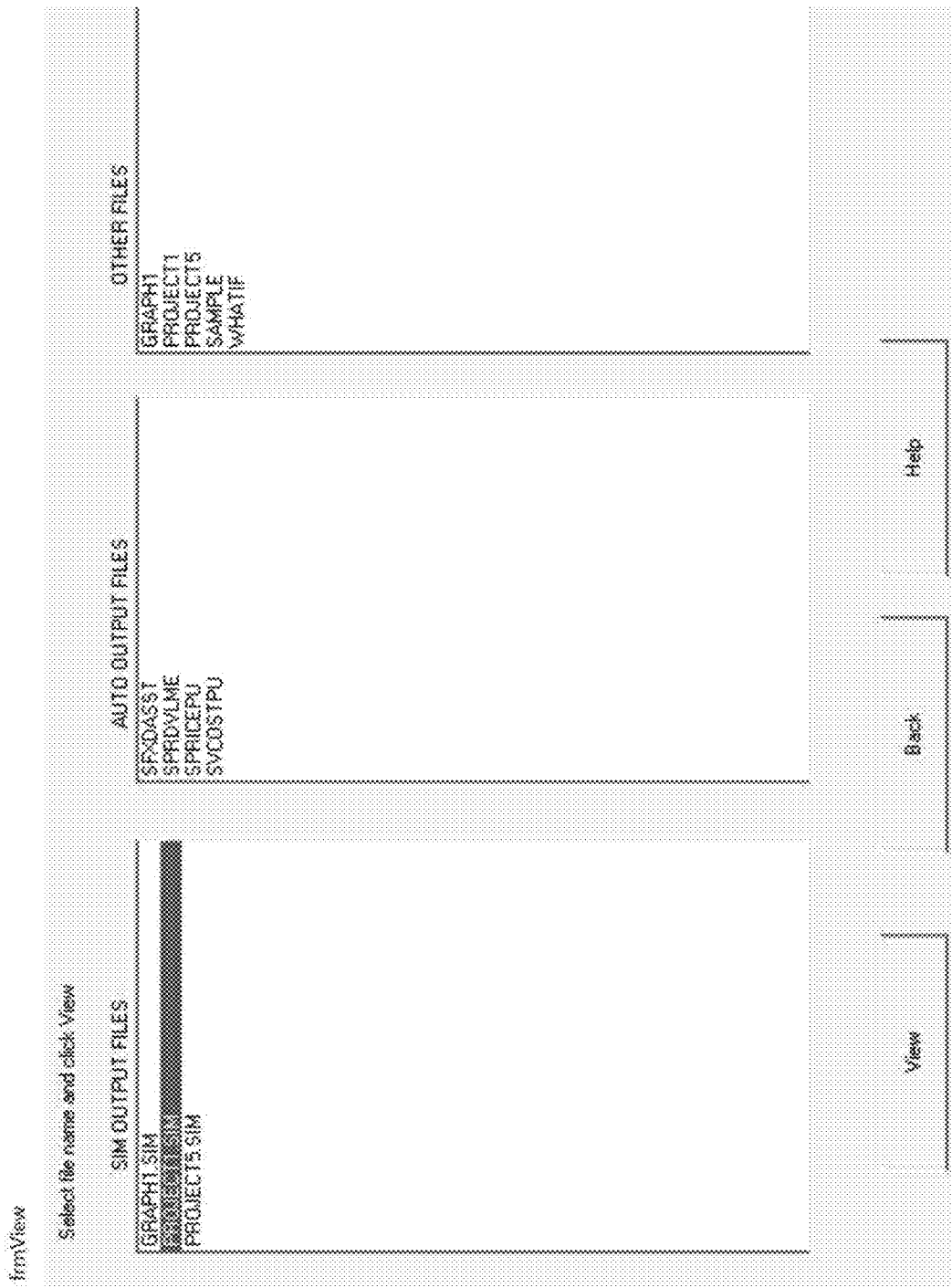
FIG. 39 illustrates the user interface listing available files for input to the VIEW function.

The logic of the VIEW function 2800 (FIG. 28) displays the files available for viewing 2805 (FIG. 39). The function copies the file to be viewed into a temporary file 2810. The function uses a temporary file so that the user cannot accidently modify the contents of the file while it is being viewed 2820. When the user closes the generic file viewer the function closes the view screen and leaves the VIEW function 2830.

Figure 40:
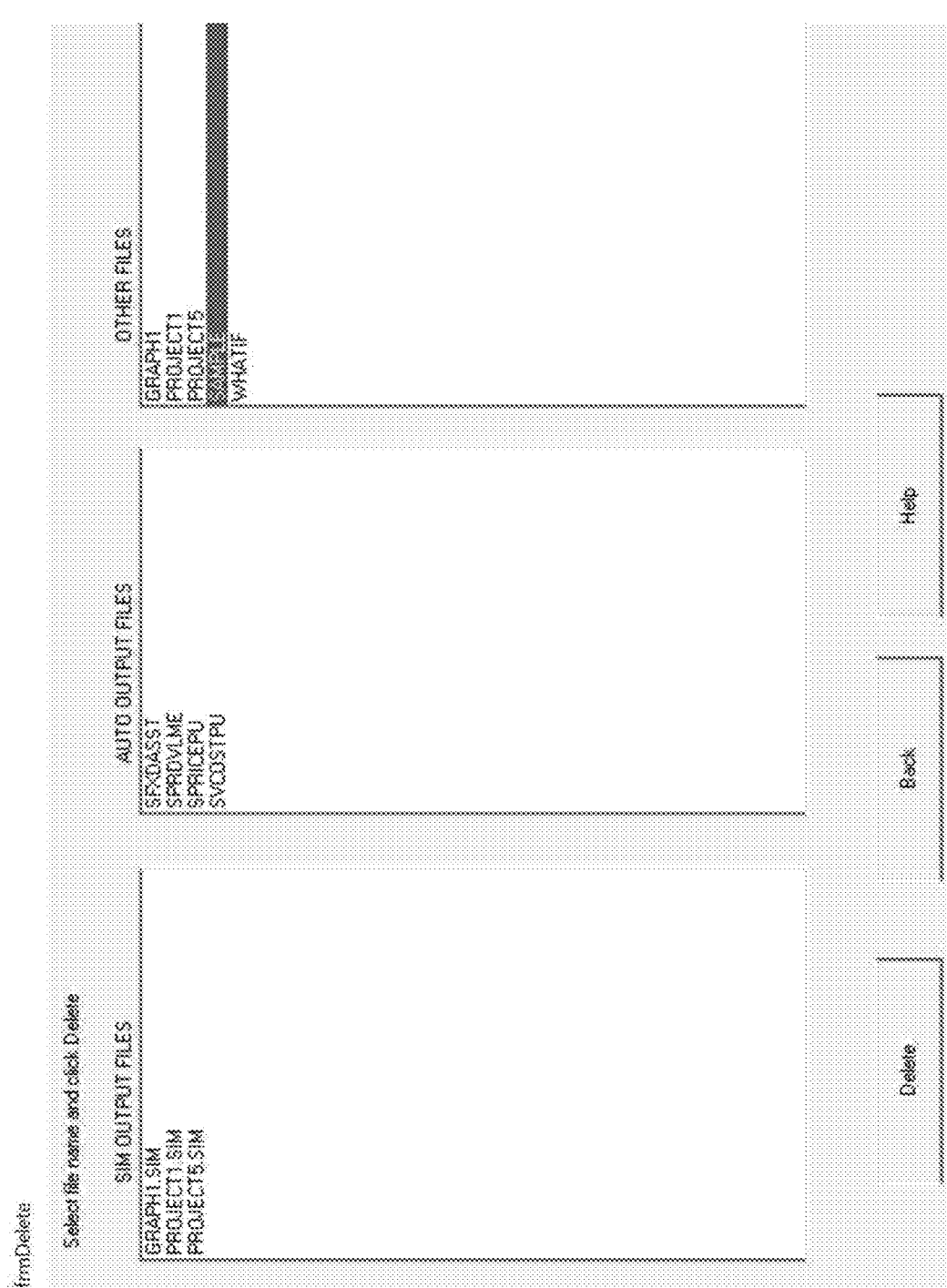
FIG. 40 illustrates the user interface listing available files for input to the DELETE function.

The logic of the DELETE function 2900 (FIG. 29) starts with displaying a screen of files 2905 (FIG. 40). The screen of files is shown displayed as three lists of files. The files are listed in three columns. The first column lists all of the SIMULATE output files. The second column lists all of the AUTOMATE output files. The third column lists all other files. When the user presses the BACK button 2910 the function will close the DELETE screen and leave the DELETE function 2915. When the user presses the DELETE file button, 'YES' to test 2920 the function then checks what file name is selected for deletion. If the user selected to delete the WHATIF file 2930 then the function will delete the WHATIF file 2935, copy the default WHATIF file from the program directory to the data file subdirectory 2940, display a message saying the WHATIF file has been copied from the program directory 2945, and return to display the list of files 2905. If the user selected to delete the SAMPLE file 2950 then the function will delete the SAMPLE file 2955, copy the default SAMPLE file from the program directory to the data file subdirectory 2960, display a message saying the SAMPLE file has been copied from the program directory 2965, and return to display the list of files 2905. If the file selected to be deleted is not the WHATIF file and is not the SAMPLE file then the function will delete the selected file 2970 and return to display the list of files 2905.

Figure 41:
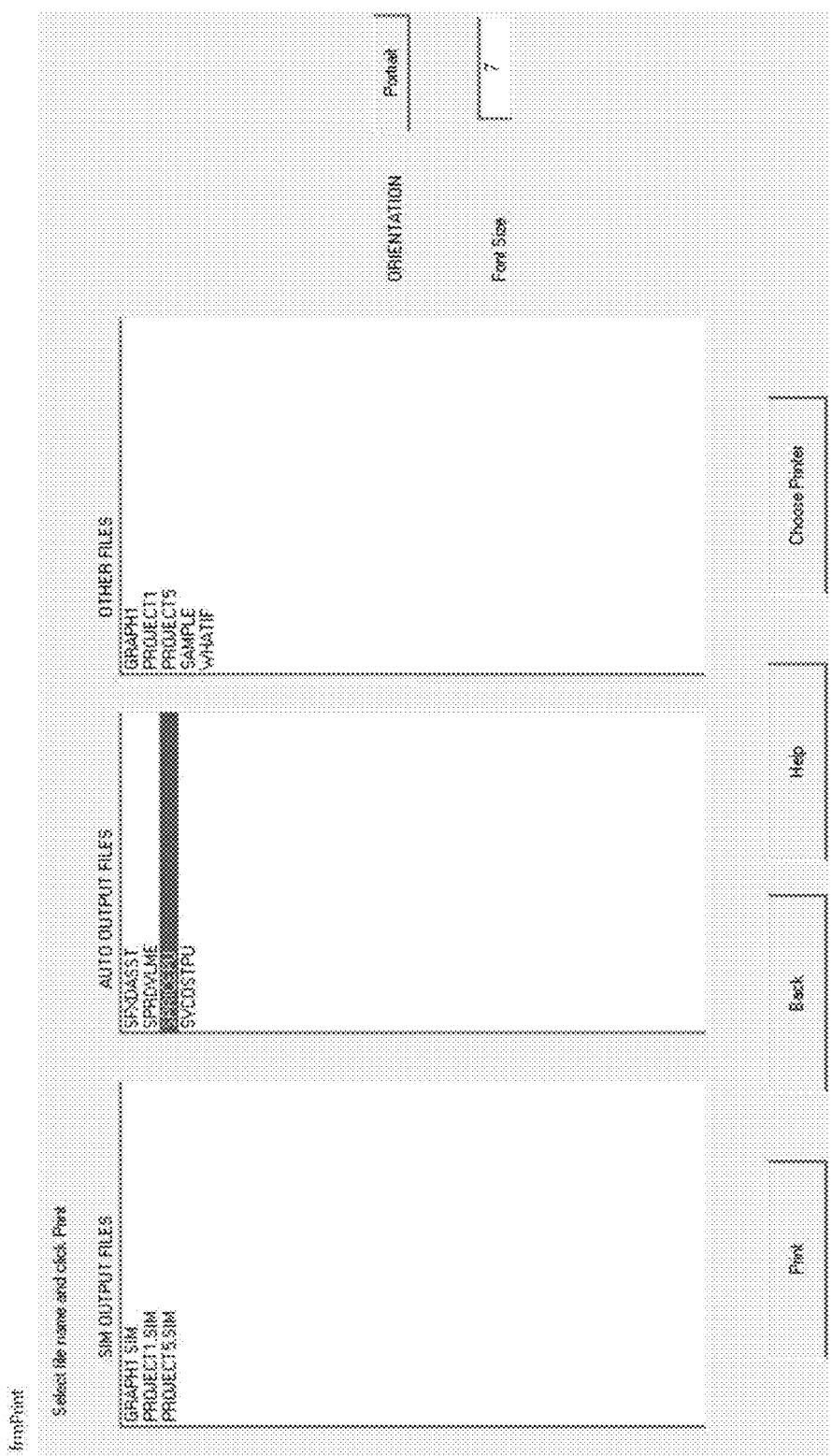
FIG. 41 illustrates the user interface listing available files for input to the PRINT function.

The logic of the PRINT function 3000 (FIG. 30) starts with displaying a screen of files 3005 (FIG. 41). The screen of files is shown displayed as three lists of files. The files are listed in three columns. The first column lists all of the SIMULATE output files. The second column lists all of the AUTOMATE output files. The third column lists all other files. When the user presses the BACK button 3010 the function will close the PRINT screen and leave the PRINT function 3015. When the user presses the PORTRAIT/LANDSCAPE button 3020 then the portrait flag or the landscape flag is set in the function 3025 to indicate the current printing page orientation. The current font size is displayed in a user editable field on the screen FIG. 41. If the user changes the font size 3030 then the font size is set to the new value 3035. If the user presses the Choose printer button 3040 then the printer is changed to the selected printer 3045. If the user presses the print button 3050 then the selected file is printed 3060 and the function returns to wait for the next user action 3010.

Figure 42:
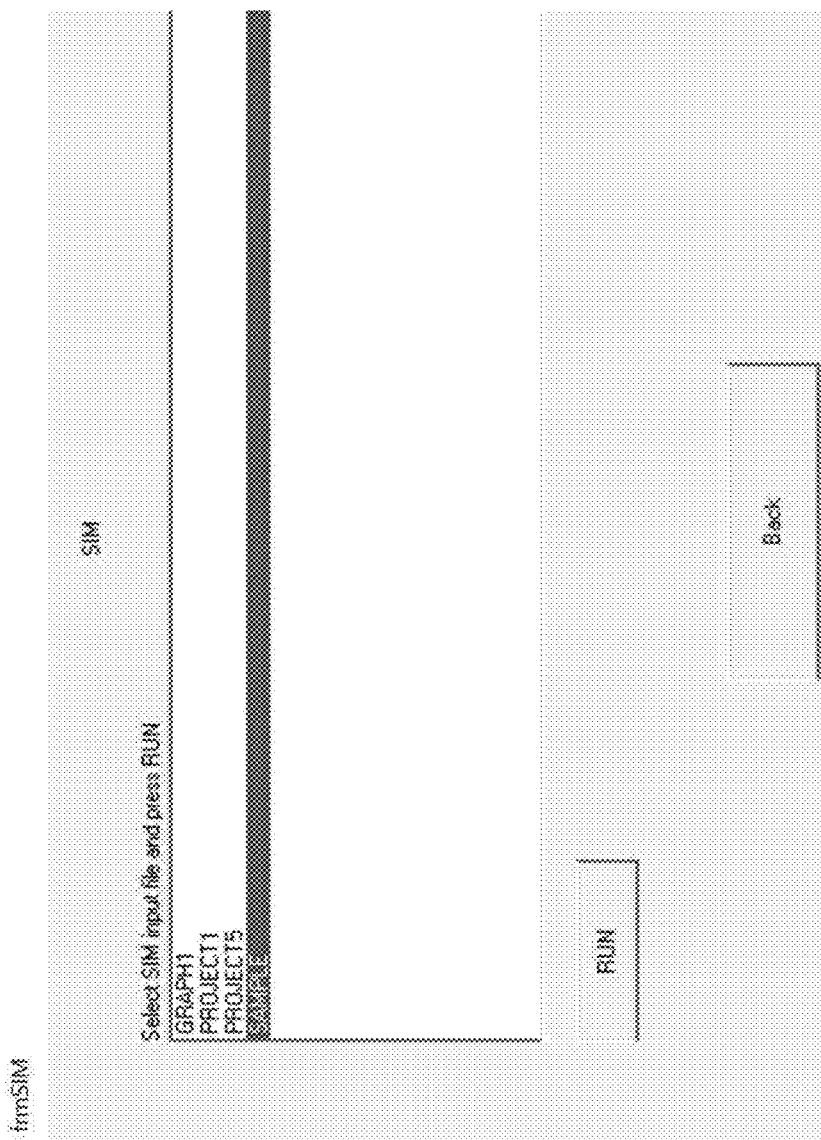
FIG. 42 illustrates the user interface listing available files for input to the SIMULATE function.

The logic of the SIMULATE function 3100 (FIG. 31) starts with selecting an input file to SIMULATE 3105 (FIG. 42). If the user pressed the SIMULATE button 302 then the user will select the input file to SIMULATE 3105. If the user pressed the AUTOMATE button 305 then the AUTOMATE function 3200 will provide an 'adjusted' input file 3105 to simulate. The input file is checked for errors 3110. If errors are detected in the input file, in task 3120, then an error message is displayed 3160 and the system will leave the SIMULATE function 3170. If no errors are detected, in task 3120, then calculate any needed loan and equity amounts 3125, calculate profitability measures 3130, generate financial reports 3135 (FIGS. 35A-35F), generate a SENIOR/JUNIOR FINANCING DATA report 3135 (FIG. 36) if required, and save the reports in the data file subdirectory 3140. If the user is running AUTOMATE 3150 then calculate a single numeric summary value for this simulation using the SYNOP.DAT file (FIG. 24) and add the summary value and all profitability measures to the appropriate sensitivity report file 3155, then leave the SIMULATE function 3170. Thus the EDIT function and the SIMULATE function constitute a user input means which a human operator can use to create a graphable data set. Thus the SIMULATE function constitutes a user input means which a human operator can choose financial simulation as the method to create a graphable data set.

Figure 9:
FIG. 9 illustrates the user interface to choose sensitivity codes to be run through the automate function.
Figure 43:
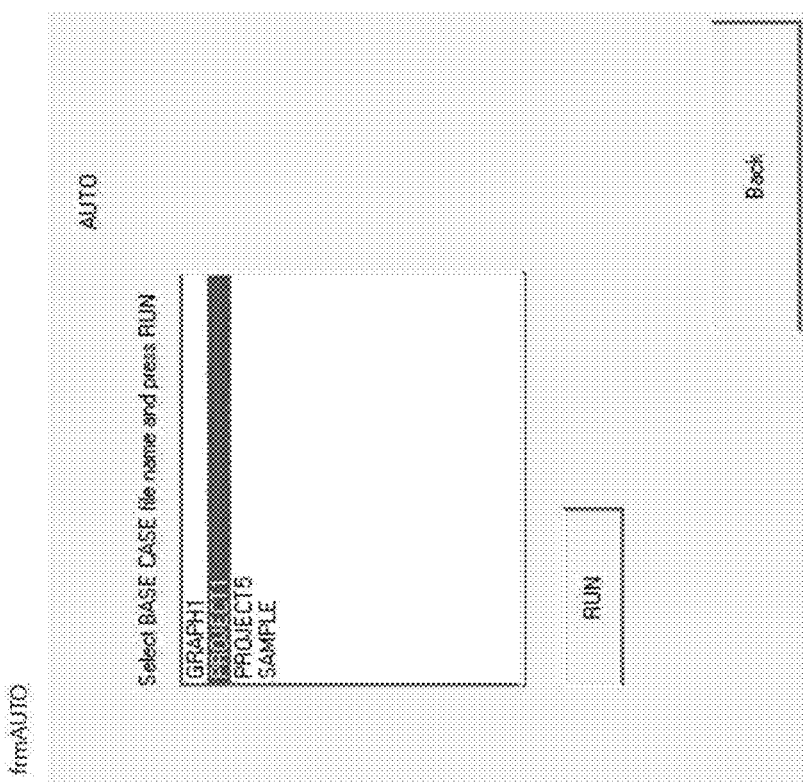
FIG. 43 illustrates the user interface listing available files for input to the AUTOMATE function.

The logic of the AUTOMATE function 3200 (FIG. 32) starts with the user selecting an input file to AUTOMATE 3205 (FIG. 43). The function displays a list of financial metrics, sensitivity variables, which are used (not blank) in the chosen input file 3210 (FIG. 9). The user selects one or more financial metrics to AUTOMATE 3215. If the user presses the BACK button then the system will close the screen and leave the AUTOMATE function 3270. If the user presses the RUN button then the function will read inflations and percent adjustments 3220 from the WHATIF file 3225, replace inflation 3230 in the input file 3235 if requested, and output the adjusted input file 3245. The function will then multiply the sensitivity variable 3240 in the adjusted input file 3245 with the next percentage read from the WHATIF file 3225 and replace the adjusted input file 3245. The AUTOMATE function will then launch the SIMULATE function 3250 (FIG. 31). After the SIMULATE function finishes then processing returns to the AUTOMATE function task 3260. The AUTOMATE function tests if all the inflations and adjustment percentages have been completed 3260. If completed, 'YES' to test 3260, then close the screen and leave the AUTOMATE function 3270, otherwise continue to task 3230 for the next inflation and adjustment. Thus the AUTOMATE function constitutes a user input means which a human operator can use to create a plurality of graphable data sets. Thus the AUTOMATE function constitutes a means to create one or more graphable data sets by automating changes in a base case project description file, performing financial simulation of the changed base case project description file, and storing profitability measures results of the financial simulation in a graphable data set.

The logic of the GRAPH function 3300 (FIGS. 33A-33B) starts with displaying a list of all sensitivity reports in the current data disk subdirectory 3305 (FIG. 10). If the user presses the BACK button 3310 then the screen will close and leave the GRAPH function 3315. The user selects one or more sensitivity reports to graph 3320. Each sensitivity report will produce one Y-axis. The GRAPH function will calculate all of the plottable curves 3325. In the case of non-spreadsheet input, the plottable curves are profitability measures. For a curve to be plottable it must have a base case and have at least two ascending or descending numeric values. Next the function will calculate which curves are plottable after combining all the selected sensitivity reports 3330. A curve must be plottable in all the selected sensitivity reports in order to be graphed on one multi-Y axis page. If no curves are plottable 3335 then display a message 3340 that says No curves are plottable from the combination of selected sensitivity reports. If one or more curves are plottable 3335 then display a list of all the plottable curves 3345 (FIG. 11). The user selects one or more curves to plot 3350 (FIG. 11). The function displays a page of plotting defaults 3355 (FIG. 12). When the user presses the Preview Screen File button or the Preview Word File button the function draws the one-page multi-Y axis X-Y grid, adds the customer name, and adds the graph title 3360. The GRAPH function next determines the lead curve 3365. The choice of the lead curve is necessary because all of the arrows on all of the Y-axis are placed based upon the X-Y values from the lead curve. The function next determines the max X-axis value that needs to be plotted from the maximum of all of the curve X values or from the users input on the option to set the "max plottable value for the X-axis" FIG. 12. The GRAPH function uses the maximum X-axis value to calculate a new maximum X-axis value such that all of the X-axis numeric labels are whole integers 3370. Thus task 3370 constitutes a means to scale the X-axis consistent with the maximum value such that all X-axis labels are integers. The function next determines the scale of the Y-axis in order to maximize the spread of values across the Y-axis graph area 3375. The lead sensitivity report is identified 3380. The lead sensitivity report is the report that will occupy the largest spread across the Y-axis. Thus task 3375 constitutes a means to scale the Y-axis to maximize the vertical spread of the independent variable values on the multi-Y axis graph. The function now plots the Y-axis arrows and associated numeric labels for the lead sensitivity report 3382. All curves are now drawn 3384 from the lead sensitivity report and the X-axis labels are added to the graph. The GRAPH function now launches the LABEL each CURVE function 3386 (FIG. 34) to place a label on each curve. After the LABEL each CURVE function finishes then the GRAPH function tests if there are more sensitivity reports to plot 3388. If there are no more sensitivity reports to plot then leave the GRAPH function 3389. If there is another sensitivity report to plot then the GRAPH function will plot the Y-axis arrows and value labels 3390. If the user did not request optional tick marks 3392 then the function goes to task 3388 to check for an additional sensitivity report to plot. If the user did request optional tick marks, 'yes' to the test in task 3392, then we plot tick marks to the right of the Y-axis arrows for the current sensitivity report. A set of tick marks is drawn for each curve in the same color as the curve is drawn. A tick mark is drawn for each arrow value and for each Y-axis 3394. The altitude for the tick marks are calculated as if the curve were being treated as the lead curve. The function now goes to task 3388 to check for the next sensitivity report to plot. Thus task 3394 constitutes a means to display optional tick marks on Y-axis when graphing more than one curve.

The logic of the LABEL each CURVE function 3400 (FIG. 34) starts with selecting one of the drawn curves 3410. The function selects the largest text label for this curve 3420. If the GRAPH input is from a spreadsheet, 'YES' to test 3425, then the current text label is drawn attached to the current curve 3470. If the GRAPH input is not from a spreadsheet, 'NO' to test 3425, then a check is made to see if the size of the current text label will overlap any other curve or any other plotted text label 3430. If no overlap then proceed to task 3470 to draw the current text label. If overlap, 'YES' to test 3430, then select a medium size text label 3440. If no overlap then draw the label 3470. If overlap, 'YES' to test 3450, then select the smallest text label for the current curve 3460 and draw the text label 3470. If there are no more curves to label, 'NO' to test 3480, then leave the LABEL each CURVE function 3485. If there are more curves to label, 'YES' to test 3480, then select the next curve to process 3490 and proceed to task 3420 to select the largest text label for this curve. Thus tasks 3420 to 3470 constitute a means to label each curve with a label sized to minimize overlap among all labels and curves.

Example 1

Referring to the graph for PROJECT1 (FIG. 15), if the financial metric Volume (15V) was increased from 500 (15A) to 750 (15B), an increase of 7 grid lines, this would change the Payback value from 0.87 (15D) to approximately 0.58 (15E). What change in the variable cost of labor (15U) would bring us back to the original PAYBACK profitability measure value? Since the volume changed up by 7 grid lines, changing the variable cost down by 7 grid lines (15C) would bring the PAYBACK value back to the base case line. Changing the volume to 750, up 7 grid lines, and changing the variable cost to 10, down 7 grid lines, would result to no net change in the PAYBACK value.

Example 2

Referring to the graph for PROJECT1 (FIG. 15), we can make multiple changes using the GRAPH without needing to go back to the computer. From the initial starting point of our base case, we change the investment to 1200 which is down 2 grid lines. We change the price to 11 which is down 2 grid lines. We change the unit variable cost to 8.9 which is down 2 grid lines. The total change so far is down 2 grid lines+down 2 grid lines+down 2 grid lines for a total change of down 6 grid lines from the base case. What change in volume will cause no net change in the PAYBACK value from the base case? The change in volume up 6 grid lines to a new value of approximately 710 will offset the combined changes in the other 3 sensitivity variables and cause no net change in PAYBACK from the base case.

Example 3

Referring to FIG. 16, the base case value for PAYBACK is 0.87 and the base case value for MINIMUM LOAN TERM is 0.53. If the only change we make from the base case is to increase volume from 500 to 600, what change will this make to the PAYBACK and MINIMUM LOAN TERM? Changing the VOLUME from 500 to 600 changes our position up almost 3 grid lines from the base case. Reading from the X-axis we can see that the PAYBACK will change from 0.87 to 0.73 and the MINIMUM LOAN TERM will change from 0.53 to 0.43.

Example 4

Each curve can be drawn in a different color. Tick marks are optional. Tick marks provide accurate Y-axis independent variable positions for all curves. Tick marks are not needed if there is only one curve on the graph. Tick marks can be drawn if there are two or more curves on one graph. Tick marks are drawn in the same color as the curve they represent. The Y value of tick marks is the same Y value as the labels on the Y axis arrows. Tick marks for the base case independent variable positions will be on the base case line. Tick marks above or below the base case line may be above, below, or at the same grid height as the labeled arrow for that Y axis. For each arrow above the base case there will be a tick mark. For each arrow below the base case there will be a tick mark. Note that arrows placed close to each other may be too close to draw the arrow and its numeric label. In FIG. 17 the values of INVESTMENT of 1450 and 1550 are too close to other arrows so they are drawn as dash marks and they are to be treated as if they were arrows. Optional tick marks, when requested, are drawn to the immediate right of the column of arrows for each Y axis 1710.

Referring to FIG. 17, the base case value for PAYBACK is 0.87 and the base case value for MINIMUM LOAN TERM is 0.53. If the only change we make from the base case is to increase INVESTMENT from 1000 to 1550, we want to determine what change this will make to the PAYBACK and MINIMUM LOAN TERM. Changing the INVESTMENT from 1000 to 1550 changes our position down 4½ grid lines from the base case for the PAYBACK curve. Reading from the X-axis we can see that the PAYBACK will change from 0.87 to 1.30. Changing the INVESTMENT from 1000 to 1550 changes our position down 6 grid lines from the base case for the MINIMUM LOAN TERM curve. The MINIMUM LOAN TERM curve is not the lead curve so we read more accurate values by using the optional tick marks instead of the arrows. The MINIMUM LOAN TERM will change from 0.53 to 1.08.

Example 5

The loan repayment method is controlled by parameter B in the base case file. The SIMULATE program will propose a financing package for your project. Repaying the loan can influence the outcome of the project. The loan repayments, calculated by the WHATIF SYSTEM are staggered. The loan repayments are not the same for every period. They will only be the same for a given number of periods, as indicated by the input in parameter B, and then the repayments will change but stay again the same for the time indicated in parameter B. If the parameter B is set to "1" the repayments may change for every successive period. If the parameter B is set to the "project life" then the periodic loan repayments will never change. Parameter B can be a positive number or a negative number. A positive number will create a simple interest loan. A negative number will cause the last set of equal loan repayments to be shortened where possible. By adding 100 to parameter B, the simple interest loan becomes an amortized loan. By making this parameter negative such as −102 or −105 then this will make the loan repayments for a shortened amortized loan repayment as illustrated in FIG. 36. FIG. 36 shows the result of parameter B set to −106 for both a senior loan and a junior loan. The result is shortened amortized loan repayments for both a senior loan 361 and also for a junior loan 362. The −106 value for parameter B in FIG. 36 tells the WHATIF SYSTEM to make equal loan repayments for every 6 consecutive periods and shorten the last set if possible. The senior loan amortized payments are $230 (loan repayment+finance & interest expense) for the first 6 loan repayments 363 and $207 for the remaining 3 repayments 364. The junior loan amortized payments are $13 (loan repayment+finance & interest expense) for the first 6 loan repayments 365 and $134 for the remaining 1 repayment 366.

SUMMARY

The graph produced by the WHATIF one-page multi-Y axis graphing system allows a human operator to visualize the effect on a project when multiple simultaneous changes occur in the financial assumptions of the project. The resultant one-page graph is a tool usable to visualize the changes in one or more dependent variables caused by changes in one or more independent variables.

Glossary

BASE CASE (201)—the base case is the list of the most likely financial metrics of your project, such as Production Volume and Price per Unit. The base case is considered to be the most likely scenario of all the possible variations in project alternatives. The base case for a financial project is a list of periodic, yearly or monthly, values for each financial metric being studied.

FINANCIAL METRICS—the SIMULATE program allows the user to define the base case of their project by filling in periodic, yearly or monthly, values for the following financial metric categories:
  Fixed assets
  Replacements
  Other investments
  Working capitol
  Minimum cash
  Loan drawdowns
  Capitalized interest
  Loan repayments
  Percent interest
  Percent commitment fee
  Percent loan fee
  Percent equity
  Equity in currency
  Production volume
  Total revenue
  Unit price
  Total variable cost
  Variable cost per unit
  Fixed costs
  Depreciation of assets
  Amortized capitalized interest
  Amortized financing fees
  Percent tax rate
  Tax in currency
  Inflation
  Dividends GRAPHABLE DATA SET—a collection of data values having one base case independent variable value and a series of independent variable values, each independent variable value having a collection of one or more dependent variable values. For a curve to be plottable it must have a base case and have at least two ascending or descending dependent variable values.

INDEX MARKER—an arrow or a dash placed on the Y-axis to indicate the vertical position of an independent variable value. An arrow with a numeric label is used on the Y-axis in some cases. A dash without a numeric label is used on the Y-axis in other cases.

PARAMETERS—the SIMULATE function tailors its financial simulation process based on 19 parameters, labeled parameter A thru parameter S, which are adjustable by the user. If there is a Junior Loan then the user can set the junior loan parameters 3502 independently from the senior borrowing parameters 3501.
  1. Parameter A: Pre-operating periods
  2. Parameter B: loan repayment method
  3. Parameter C: period of tax loss carry forward
  4, Parameter D: print comments yes/no
  5. Parameter E: depreciation method
  6. Parameter F: average life of all assets
  7. Parameter G: amortization of capitalized interest
  8. Parameter H: life of capitalized interest
  9. Parameter I: amortization of commitment fees
  10. Parameter J: life of total of commitment fees
  11. Parameter K: amortization of loan initiation fee
  12. Parameter L: life of loan initiation fee
  13. Parameter M: print synopsis report yes/no
  14. Parameter N: print funds flow report yes/no
  15. Parameter O: print income report yes/no
  16. Parameter P: print balance sheet report yes/no
  17. Parameter Q: print detail report yes/no
  18. Parameter R: percent IRR search range
  19. Parameter S: number of loan repayments per period PROFITABILTY MEASURES (203)—the SIMULATE function reads an input file of financial metrics describing a project and calculates the following seven profitability measures of the project:
1. The PAYBACK period
2. The Internal Rate of Return on Investment before taxes (IRROI BT)
3. The Internal Rate of Return on Investment after taxes (IRROI AT)
4. The Internal Rate of Return on Equity after taxes (IRROE AT)
5. The MINIMUM EQUITY
6. The MINIMUM LOAN
7. and the MINIMUM PERIODS NEEDED TO REPAY DEBT PROJECT LIFE—the project life is a number from 1 to 50 indicating the number of periods, in years or months, to be used for the lifespan covered by the study of your project.

SCENARIO—one collection of independent variable values, financial metrics, from a project configuration or one collection of independent variable values from a spreadsheet graphable data set.

SENSITIVITY REPORTS—the AUTOMATE function produces a single sensitivity report file, such as FIG. 20, for each financial metric that was run through the AUTOMATE function. The sensitivity reports can be printed. The GRAPH function can produce one-page multi-Y axis graphs from a spreadsheet or from one or more sensitivity reports.

| Financial metric | Sensitivity report file name |
| --- | --- |
| Investment | SFXDASST |
| Replacements | SREPLACM |
| Other investments | SOTHINVS |
| Working capital | SWORKCAP |
| Minimum cash | SMINCASH |
| Interest rate % | S%INTRST |
| Commitment Fee % | SCOMMITF |
| Loan fee % | SLOANFEE |
| Equity in % | S%EQUITY |
| Equity in currency | S$EQU1TY |
| Volume | SPRDVLME |
| Total revenue | STTLREVN |
| Unit price | SPRICEPU |
| Total variable cost | STTLVCST |
| Unit variable cost | SVCOSTPU |
| Fixed costs | SFIXDCST |
| Tax in % | S%TAXRTE |
| Tax in currency | STAXIN$$ |

The objects of the invention have been fully realized through the embodiments disclosed herein. Those skilled in the art will realize that the above described invention may be embodied in a computer program product stored on a computer readable medium. Those skilled in the art will appreciate that the various aspects of the invention may be achieved through different embodiments without departing from the function of the invention. The particular embodiments are illustrative and not meant to limit the scope of the invention as set forth in the following claims.

What is claimed is:
1. A computer, having one or more processor, implemented method for generating a one-page multi-Y axis graph for strategic planning and optimization, the method comprising the steps of:
 a) calculating more than one profitability measures that are dependent variables, wherein the dependent variables are outcomes from a set of independent variables;
 b) user selecting a plurality of profitability measures to be examined;
 c) user selecting a plurality of sensitivity reports each comprising one independent variable and selected dependent variables from step a);
 d) automatically calculating a lead curve from the selected plurality of profitability measures, where the lead curve comprises the widest spread of y-axis data which is the profitability measures from the selected sensitivity reports;
 e) displaying the one-page multi-Y axis graph for strategic planning and optimization for each of the selected of the plurality of sensitivity reports:
  i) associating a first column of independent variables and determine a base case of the plurality of profitability measures with a Y-axis;
  ii) drawing a bold line across a Y-axis of the graph showing the base case value;
  iii) associating changed assumptions from the selected sensitivity report with the X-axis on the one-page multi-Y axis graph, where the lead curve is determined from a maximum X-axis value that needs to be plotted from the maximum of all of the curve X values such that all of the X-axis numeric labels are whole integers and is used to scale the X-axis consistent with the maximum value such that all X-axis labels are integers;
  iv) determining an equal range of profitability and plotting the equal steps on a horizontal X-axis;
  v) distributing different sensitivity values shown on the sensitivity report on a left side of the vertical Y-axis;
  vi) plotting a curve using the coordination points between the values on the Y-axis and on the X-axis for each of the selected dependent values as scaled to the lead curve from the sensitivity report;
  vii) plotting an additional Y-axis on the graph for each of the dependent variable values, positioned based on one common curve, the lead curve;
  viii) adding a label for the curve and placing tick marks on Y-axis when graphing; and
  viii) repeating step i) through viii) until all data is plotted.

2. The method of claim 1, further comprising a financial simulation of a base case project description file and storing results of the simulation in a database.

3. The method of claim 1, further comprising creating one or more graphable data sets by automating changes in a base case project description file, performing financial simulation of the changed base case project description file, and storing profitability measures results of the financial simulation in a database.

4. The method of claim 1, further comprising scaling the Y-axis corresponding to the lead curve to maximize the vertical spread of the independent variable values on the one-page multi-Y axis graph.

5. The method of claim 1, further comprising labeling each curve with a label sized to minimize overlap among all labels and curves.

6. A system for formatting and displaying data in a one-page multi-Y axis graph, comprising instructions operable on a processor for:
 a) calculating more than one profitability measures that are dependent variables, wherein the dependent variables are outcomes from a set of independent variables;
 b) user selecting a plurality of profitability measures to be examined;

c) user selecting a plurality of sensitivity reports each comprising one independent variable and selected dependent variables from step a);
d) automatically calculating a lead curve from the selected plurality of profitability measures, where the lead curve comprises the widest spread of y-axis data which is the profitability measures from the selected sensitivity reports;
e) displaying the one-page multi-Y axis graph for strategic planning and optimization for each of the selected of the plurality of sensitivity reports:
  i) associating a first column of independent variables and determine a base case of the plurality of profitability measures with a Y-axis;
  ii) drawing a bold line across a Y-axis of the graph showing the base case value;
  iii) associating changed assumptions from the selected sensitivity report with the X-axis on the one-page multi-Y axis graph, where the lead curve is determined from a maximum X-axis value that needs to be plotted from the maximum of all of the curve X values such that all of the X-axis numeric labels are whole integers and is used to scale the X-axis consistent with the maximum value such that all X-axis labels are integers;
  iv) determining an equal range of profitability and plotting the equal steps on a horizontal X-axis;
  v) distributing different sensitivity values shown on the sensitivity report on a left side of the vertical Y-axis;
  vi) plotting a curve using the coordination points between the values on the Y-axis and on the X-axis for each of the selected dependent values as scaled to the lead curve from the sensitivity report;
  vii) plotting an additional Y-axis on the graph for each of the dependent variable values, positioned based on one common curve, the lead curve;
  viii) adding a label for the curve and placing tick marks on Y-axis when graphing; and
  viii) repeating step i) through viii) until all data is plotted.

7. The system of claim 6, further comprising instructions operable on a processor for:
  a) creating financial simulation graphable data sets by automating changes in a base case project description file;
  b) calculating financial simulations of the changed base case project description file; and
  c) storing the results of the financial simulation as profitability measures in the storage.

8. The system of claim 6, wherein the Y-axis corresponding to the lead curve is scaled to maximize the vertical spread of the independent variable values on the one-page multi-Y axis graph.

9. The system of claim 6, wherein each curve is labeled with a label that is sized to minimize overlap among all labels and curves.

* * * * *